United States Patent
Shen et al.

(10) Patent No.: US 12,540,334 B2
(45) Date of Patent: Feb. 3, 2026

(54) GENE THERAPY FOR ALZHEIMER'S DISEASE

(71) Applicants: The Brigham and Women's Hospital, Inc., Boston, MA (US); The General Hospital Corporation, Boston, MA (US)

(72) Inventors: Jie Shen, Brookline, MA (US); Raymond J. Kelleher, III, Brookline, MA (US)

(73) Assignees: The Brigham and Women's Hospital, Inc., Boston, MA (US); The General Hospital Corporation, Boston, MA (US)

( * ) Notice: Subject to any disclaimer, the term of this patent is extended or adjusted under 35 U.S.C. 154(b) by 1022 days.

(21) Appl. No.: 17/613,612

(22) PCT Filed: May 21, 2020

(86) PCT No.: PCT/US2020/034040
§ 371 (c)(1),
(2) Date: Nov. 23, 2021

(87) PCT Pub. No.: WO2020/242892
PCT Pub. Date: Dec. 3, 2020

(65) Prior Publication Data
US 2022/0235374 A1 Jul. 28, 2022

Related U.S. Application Data

(60) Provisional application No. 62/852,716, filed on May 24, 2019.

(51) Int. Cl.
*C12N 15/86* (2006.01)
*A61P 25/28* (2006.01)
*C07K 14/47* (2006.01)
*A61K 48/00* (2006.01)

(52) U.S. Cl.
CPC .............. *C12N 15/86* (2013.01); *A61P 25/28* (2018.01); *C07K 14/4711* (2013.01); *A61K 48/00* (2013.01); *C12N 2750/14143* (2013.01); *C12N 2750/14171* (2013.01)

(58) Field of Classification Search
CPC .................................. C12N 15/86; A61P 25/28
See application file for complete search history.

(56) References Cited

U.S. PATENT DOCUMENTS

| | | | |
|---|---|---|---|
| 5,328,470 A | 7/1994 | Nabel et al. | |
| 5,658,776 A | 8/1997 | Flotte et al. | |
| 6,020,143 A | 2/2000 | St. George-Hyslop et al. | |
| 6,180,613 B1 | 1/2001 | Kaplitt et al. | |
| 6,395,960 B1 | 5/2002 | St. George-Hyslop et al. | |
| 6,503,888 B1 | 1/2003 | Kaplitt et al. | |
| 6,686,449 B2 | 2/2004 | Carter et al. | |
| 6,783,955 B2 | 8/2004 | Arvizu | |
| 6,979,537 B2 | 12/2005 | McCarthy et al. | |
| 7,271,313 B2 | 9/2007 | Shen | |
| 7,498,316 B2 | 3/2009 | Xu et al. | |
| 7,709,616 B2 | 5/2010 | Bentwich et al. | |
| 8,129,334 B2 | 3/2012 | Dewji et al. | |
| 9,512,191 B2 | 12/2016 | Dewji et al. | |
| 9,956,271 B2 | 5/2018 | Guild et al. | |
| 10,221,223 B2 | 3/2019 | Dewji et al. | |
| 2002/0015939 A1 | 2/2002 | McCarthy et al. | |
| 2002/0082211 A1 | 6/2002 | Arvizu et al. | |
| 2003/0065141 A1 | 4/2003 | Carter et al. | |
| 2005/0288243 A1 | 12/2005 | Xu et al. | |
| 2007/0134761 A1 | 6/2007 | Charellard | |
| 2009/0305946 A1 | 12/2009 | Dewji et al. | |
| 2011/0201052 A1 | 8/2011 | Raitano et al. | |
| 2017/0073384 A1* | 3/2017 | Dewji et al. | C07K 14/47 |
| 2018/0094280 A1 | 4/2018 | Kutner et al. | |
| 2018/0169148 A1* | 6/2018 | Adair et al. | |
| 2019/0134155 A1 | 5/2019 | Kaetzel et al. | |
| 2021/0108186 A1 | 4/2021 | Shen et al. | |
| 2023/0068087 A1 | 3/2023 | Gannon et al. | |
| 2023/0136245 A1 | 5/2023 | Gannon et al. | |

FOREIGN PATENT DOCUMENTS

| | | |
|---|---|---|
| CN | 103282374 A | 9/2013 |
| CN | 103816540 A | 5/2014 |
| CN | 106604988 A | 4/2017 |
| CN | 107614008 A | 1/2018 |
| EP | 0826042 B1 | 8/2008 |

(Continued)

OTHER PUBLICATIONS

Yang Ge, Yu Kun, Kaitatzi Christina-Symina, Singh Abhilasha, Labahn Jorg. Influence of solubilization and AD mutations on stability and structure of human presenilins. Nature: Scientific Reports, 7:17970 (Year: 2017).*
Sun Linfeng, Zhou Rui, Yang Guanghui, Shi Yigong. Analysis of 138 pathogenic mutations in presenilin-1 on the in vitro production of ABeta42 and ABeta40 peptides by gamma-secretase. Proceedings of the National Academy of Sciences. E476-E485 (Year: 2016).*
Dittgen Tanjew, Nimmerjahn Axel, Komai Shoji, Licnerski Pawel, Waters Jack, Margrie Troy W, Helmchen Fritjof, Denk Winfried, Brecht Michael, Osten Pavel. Lentivirus-based genetic manipulations of cortical neurons and their optical and electrophysiological monitoring in vivo. PNAS. vol. 101 No. 52. (Year: 2004).*
Honda Makota, Minami Itsunari, Tooi Norie, Morone Nobuhiro, Nishioka Hisae, Uemura Kengo, Kinoshita Ayae, Heuser John E, Nakatsuji Norio, Kazuhiro Aiba. The modeling of Alzheimer's disease by the overexpression of mutant Presenilin 1 in human embryonic stem cells. Biochemical and Biophysical Research (Year: 2016).*

(Continued)

Primary Examiner — James D Schultz
(74) Attorney, Agent, or Firm — Fish & Richardson P.C.

(57) ABSTRACT

The present disclosure provides, among other things, human codon-optimized sequences encoding presenilin 1, and methods for using the sequences in gene therapy to treat neurodegenerative diseases including, but not limited to Alzheimer's disease, frontotemporal dementia, frontotemporal lobar degeneration, Pick's disease, Lewy body dementia, memory loss, and cognitive impairment including mild cognitive impairment (MCI).

21 Claims, 5 Drawing Sheets

Specification includes a Sequence Listing.

(56) References Cited

FOREIGN PATENT DOCUMENTS

| | | |
|---|---|---|
| EP | 2010663 | 1/2009 |
| JP | H11504214 A | 4/1999 |
| JP | 2013509890 | 3/2013 |
| JP | 2013107890 | 6/2013 |
| JP | 2016523835 | 8/2016 |
| JP | 2018510615 A | 4/2018 |
| JP | 2021525245 A | 9/2021 |
| WO | WO 1995/00655 | 1/1995 |
| WO | WO 1995/11984 | 5/1995 |
| WO | WO 1995/27071 | 10/1995 |
| WO | WO 2000/003248 A1 | 1/2000 |
| WO | WO 2001/051671 | 7/2001 |
| WO | WO 2005/003350 A2 | 1/2005 |
| WO | WO 2005/037226 A2 | 4/2005 |
| WO | WO 2005/116250 A2 | 12/2005 |
| WO | WO 2009/042727 | 4/2009 |
| WO | WO 2015/006743 A1 | 1/2015 |
| WO | WO 2016/209654 A1 | 12/2016 |
| WO | WO 2017/191274 | 11/2017 |
| WO | WO 2017/205767 A1 | 11/2017 |
| WO | WO 2018/045022 A1 | 3/2018 |
| WO | WO 2018/140532 | 8/2018 |
| WO | WO 2018/175443 A1 | 9/2018 |
| WO | WO 2018/222890 | 12/2018 |
| WO | WO 2019/028306 | 2/2019 |
| WO | WO 2019/028306 A2 * 2/2019 ............... C12N 7/00 |
| WO | WO 2019/226832 | 11/2019 |
| WO | WO 2021/155296 | 8/2021 |

OTHER PUBLICATIONS

Rumiana Tenchov, Robert Bird, Allison E. Curtze and Qiongqiong Zhou. Lipid Nanoparticles-From Liposomes to mRNA Vaccine Delivery, a Landscape of Research Diversity and Advancement. ACSNano, 15, 16982-17015 (Year: 2021).*

Honda et al. The modeling of Alzheimer's disease by the overexpression of mutant Presenilin 1 in human embryonic stem cells (Year: 2016).*

Bryan et al., "Implications of protein fold switching," Current Opinion in Structural Biology, 2013, 2(23):314-6.

Bulcha et al., "Viral vector platforms within the gene therapy landscape," Signal Transduction and Targeted Therapy, Feb. 2021, 6(1):53, 24 pages.

Chávez-Gutiérrez et al., "Mechanisms of neurodegeneration—Insights from familial Alzheimer's disease," Seminars in Cell & Developmental Biology, Sep. 2020, (105):75-85.

Cruz et al., "Protein function prediction," Functional Genomics: Methods and Protocols, 3rd edition, Aug. 2018, 55, 22 pages.

Hur, "γ-Secretase in Alzheimer's disease," Experimental & Molecular Medicine, Apr. 2022, 54(4):433, 14 pages.

Ingusci et al., "Gene therapy tools for brain diseases," Frontiers in Pharmacology, Jul. 2019, 10:724, 19 pages.

Kabir et al., "Exploring the role of PSEN mutations in the pathogenesis of Alzheimer's disease," Neurotoxicity Research, Dec. 2020, 38:833-49.

Kotterman et al., "Engineering adeno-associated viruses for clinical gene therapy," Nature Reviews Genetics, Jul. 2014, 15(7):445, 18 pages.

Lenzi et al., Gene Transfer Research: The Evolution of Clinical Science, NCBI Bookshelf, A Service of the National Library of Medicine, National Institute of Health, Oversight and Review of Clinical Gene Transfer Protocols: Assessing the Role of the Recombinant DNA Advisory Committee, National Academies Press, Mar. 2014, 16 pages.

Maqbool et al., "The substrate-binding protein in bacterial ABC transporters: dissecting roles in the evolution of substrate specificity," Biochemical Society Transactions, Oct. 2015, 43(5):1011-7.

Shim et al., "Nonviral delivery systems for cancer gene therapy: strategies and challenges," Current Gene Therapy, Feb. 2018, 18(1):3-20.

Stepanichev, "Gene editing and Alzheimer's disease: is there light at the end of the tunnel?," Frontiers in Genome Editing, Jun. 2020, 2:4, 10 pages.

Sudhakar et al., Gene therapy for neurodegenerative diseases, Neurotherapeutics, Jan. 2019, 16(1):166-75.

AU Office Action in Australian Appln. No. 2020285638, mailed on May 1, 2025, 4 pages.

Diss et al., "The genetic landscape of a physical interaction," Elife, Apr. 2018, 7:e32472, 31 pages.

Dryja et al., "Mutations within the rhodopsin gene in patients with autosomal dominant retinitis pigmentosa," New England Journal of Medicine, Nov. 1990, 323(19):1302-7.

EP Office Action in European Appln. No. 19808081.4, mailed on Apr. 23, 2025, 6 pages.

Felsenstein et al., "Nov. 1, 2003: Endogenous cholesterol metabolites as potential Alzheimer's therapeutics," Alzheimer's & Dementia, Jul. 2012, 8(4S Part 3):P104-5.

GenBank Accession No. NM 000021.3, "*Homo sapiens* presenilin 1 (PSEN1), transcript variant 1, mRNA," dated Aug. 7, 2008, 5 pages.

GenBank Accession No. NM 000447.2, "*Homo sapiens* presenilin 2 (Alzheimer disease 4) (PSEN2), transcript variant 1, mRNA," dated Aug. 17, 2007, 4 pages.

GenBank Accession No. NM 007318.2, "*Homo sapiens* presenilin 1 (PSEN1), transcript variant 2, mRNA," dated Aug. 7, 2008, 5 pages.

GenBank Accession No. NM_012486.2, "*Homo sapiens* presenilin 2 (PSEN2), transcript variant 2, mRNA," dated Aug. 17, 2007, 6 pages.

JP Japanese Office Action in Japanese Appln. No. 2020-565341, Apr. 4, 2023, 11 pages (with English translation).

Wang et al., "Wild-type presenilin 1 protects against Alzheimer disease mutation-induced amyloid pathology," Journal of Biological Chemistry, Jun. 2006, 281(22):15330-6.

CN Office Action in Chinese Appln. No. 201980049127.3, mailed on Oct. 30, 2023, 26 pages (with English translation).

EP Partial European Search Report in European Appln. No. 20893982.7, mailed on Nov. 15, 2023, 14 pages.

NCBI sequence NM_000021.3, "*Homo sapiens* presenilin 1 (PSEN1), transcript variant 1, mRNA," dated Dec. 18, 2017, 7 pages.

NCBI reference sequence : NM_007318.2, "*Homo sapiens* presenilin 1 (PSEN1), transcript variant 2, mRNA," dated Jun. 18, 2017, 7 pages.

Wang et al., "Visualization of Alzheimer's disease related α-/β-/γ-secretase ternary complex by bimolecular fluorescence complementation based fluorescence resonance energy transfer," Frontiers in Molecular Neuroscience, Nov. 2018, 11:431, 9 pages.

CN Office Action in Chinese Appln. No. 201980049127.3, mailed on Apr. 25, 2024, 9 pages (with English translation).

D'Argenio et al., "New insights into the molecular bases of familial Alzheimer's disease," Journal of Personalized Medicine, Apr. 2020, 10(2):26, 14 pages.

Deaton et al., "Presenilin 1 regulates membrane homeostatic pathways that are dysregulated in Alzheimer's disease," Journal of Alzheimer's Disease, Jan. 2020, 77(3):961, 25 pages.

EP Extended European Search Report in European Appln. No. 20893982.7, mailed on May 2, 2024, 14 pages.

Götz et al., "Rodent models for Alzheimer disease," Nature Reviews Neuroscience, Oct. 2018, 19(10):583-98.

Hudry et al., "Therapeutic AAV gene transfer to the nervous system: a clinical reality," Neuron, Mar. 2019, 101(5):839, 26 pages.

John et al., "Synaptic basis of Alzheimer's disease: Focus on synaptic amyloid beta, P-tau and mitochondria," Ageing Research Reviews, Jan. 2021, 65:101208, 35 pages.

Yang et al., "Presenilin-1 (PSEN1) mutations: clinical phenotypes beyond Alzheimer's disease," International Journal of Molecular Sciences, May 2023, 24(9):8417, 21 pages.

CN Office Action in Chinese Appln. No. 202080052274.9, mailed on Mar. 12, 2024, 9 pages (with English translation).

EP Extended European Search Report in European Appln. No. 21747911.2, mailed on Mar. 14, 2024, 11 pages.

GenBank Accession No. NM_000021.4, "*Homo sapiens* presenilin 1 (PSEN1), transcript variant 1, mRNA," Nov. 20, 2018, 7 pages.

(56) References Cited

OTHER PUBLICATIONS

JP Office Action in Japanese Appln. No. 2020-565341, mailed on Jan. 9, 2024, 14 pages (with English translation).
Millington-Ward et al., "Suppression and replacement gene therapy for autosomal dominant disease in a murine model of dominant retinitis pigmentosa," Molecular Therapy, Apr. 2011, 19(4):642-9.
Montenegro et al., "Human Presenilin-1 delivered by AAV9 rescues impaired γ-secretase activity, memory deficits, and neurodegeneration in Psen mutant mice," Proceedings of the National Academy of Sciences, Oct. 2023, 120(42):e2306714120, 8 pages.
Pelletier et al., "RNA based gene therapy for dominantly inherited diseases," Current Gene Therapy, Feb. 2006, 6(1):131-46.
Pimenova et al., "Novel presenilin 1 and 2 double knock-out cell line for in vitro validation of PSEN1 and PSEN2 mutations," Neurobiology of Disease, Feb. 2020, 138, 24 pages.
Sierant et al., "Specific silencing of L392V PSEN1 mutant allele by RNA interference," International Journal of Alzheimer's Disease, Jan. 2011, vol. 2011, 14 pages.
Trochet et al., "Therapy for dominant inherited diseases by allele-specific RNA interference: successes and pitfalls," Current Gene Therapy, Oct. 2015, 15(5):503, 27 pages.
Uniprot Accession No. P49768.1, "Presenilin-1," Oct. 1, 1996, 55 pages.
Uniprot Accession No. P49810.1, "Presenilin-2," Oct. 1, 1996, 14 pages.
Castle et al., "Controlling AAV tropism in the nervous system with natural and engineered capsids," Gene Therapy for Neurological Disorders: Methods and Protocols, Jan. 2016, 133-49.
CN Office Action in Chinese Appln. No. 201980049127.3, mailed on Jul. 16, 2024, 14 pages (with English translation).
Haery et al., Adeno-associated virus technologies and methods for targeted neuronal manipulation. Frontiers in Neuroanatomy, Nov. 2019, 13:493120, 16 pages.
IL Office Action in Israeli Appln. No. 278813, mailed on Jul. 21, 2024, 4 pages (English translation).
JP Office Action in Japanese Appln. No. 2021-569550, mailed on May 28, 2024, 8 pages (with English translation).
Bird et al., "Wide range in age of onset for chromosome 1-related familial Alzheimer's disease," Annals of Neurology, Dec. 1996, 40(6):932-936.
Cai et al., "Mutations in presenilin 2 and its implications in Alzheimer's disease and other dementia-associated disorders," Clinical Interventions in Aging, Jul. 2015, 10:1163-1172.
Chen et al., "Enhancing the Utility of Adeno-Associated Virus Gene Transfer through Inducible Tissue-Specific Expression," Human Gene Therapy Methods, Aug. 2013, 24(4):270-278.
Colin et al., "Engineered lentiviral vector targeting astrocytes in vivo," Glia, Apr. 2009, 57(6):667-79.
Dana et al., "Molecular mechanisms and biological functions of siRNA," International Journal of Biomedical Science, Jun. 2017, 13(2):48-57.
Elbashir et al., "Duplexes of 21±nucleotide RNAs mediate RNA interference in cultured mammalian cells," Nature, May 2001, 411:494-498.
Gray et al., "Optimizing promoters for recombinant adeno-associated virus-mediated gene expression in the peripheral and central nervous system using self-complementary vectors," Human Gene Therapy, Sep. 2011, 22:1143-1153.
Karabinos et al., "Essential roles for four cytoplasmic intermediate filament proteins in Caenorhabditis elegans development," Proceedings of the National Academy of Sciences of the United States of America, Jul. 2001, 98(14):7863-7868.
Lanoiselée et al., "APP, PSEN1, and PSEN2 mutations in early onset Alzheimer disease: A genetic screening study of familial and sporadic cases," PLOS Medicine, Mar. 2017, 14(3):e102270, 16 pages.
Ling et al., "Enhanced transgene expression from recombinant single-stranded D-sequence-substituted adeno-associated virus vectors in human cell lines in vitro and in murine hepatocytes in vivo," Journal of Virology, Jan. 2015, 89(2):952-61.

Matsushita et al., "Adeno-associated virus vectors can be efficiently produced without helper virus," Gene Therapy, Jul. 1998, 5:938-945.
PCT International Preliminary Report on Patentability in International Appln. No. PCT/US2020/062394, mailed on May 17, 2022, 7 pages.
PCT International Preliminary Report on Patentability in International Appln. No. PCT/US2021/015911, mailed on Jul. 28, 2022, 9 pages.
PCT International Search Report and Written Opinion in International Appln. No. PCT/US2021/015911, mailed on Jun. 30, 2021, 14 pages.
PCT International Search Report and Written Opinion in International Appln. No. PCT/US2020/062394, mailed on Apr. 28, 2021, 15 pages.
Perez-Pinera et al., "RNA-guided gene activation by CRISPR-Cas9-based transcription factors," Oct. 2013, Nature Methods, 2013, 10(10):973-976. doi: 10.1038/nmeth.2600.
Sen et al., "Improved adeno-associated virus (AAV) serotype 1 and 5 vectors for gene therapy," Scientific Reports, May 2013, 3:1832, DOI:10.1038/srep01832, 1-6.
Sherrington et al., "Alzheimer's disease associated with mutations in presenilin 2 is rare and variably penetrant," Jul. 1996, 5(7):985-988.
Wang et al., "Rescue and replication of adeno-associated virus type 2 as well as vector DNA sequences from recombinant plasmids containing deletions in the viral inverted terminal repeats: Selective encapsidation of viral genomes in progeny virions," Journal of Virology, Mar. 1996, 70(3):1668-1677.
Wang et al., "Rescue and replication signals of the adeno-associated virus 2 genome," Journal of Molecular Biology, Jul. 1995, 250(5):573-580.
Xia et al., "Presenilin-1 knockin mice reveal loss-of-function mechanism for familial Alzheimer's disease," Neuron, Mar. 2015, 85(5):967-981.
Xiao et al., "Production of high-titer recombinant adeno-associated virus vectors in the absence of helper adenovirus," Journal of Virology, Mar. 1998, 72(3):2224-2232.
Acosta-Baena et al., "Pre-dementia clinical stages in presenilin 1 E280A familial early-onset Alzheimer's disease: a retrospective cohort study," The Lancet Neurology, Mar. 1, 2011, 10(3):213-20.
Amtul et al., "A presenilin 1 mutation associated with familial frontotemporal dementia inhibits γ-secretase cleavage of APP and notch," Neurobiology of Disease, Mar. 1, 2002, 9(2):269-73.
Asokan et al., "The AAV vector toolkit: poised at the clinical crossroads," Molecular Therapy, Apr. 1, 2012, 20(4):699-708.
Ausubel et al., "Current Protocols in Molecular Biology, Sections 9.10-9.14," Greene Publishing Associates, 1989, 51 pages.
Beglopoulos et al., "Reduced β-amyloid production and increased inflammatory responses in presenilin conditional knock-out mice," Journal of Biological Chemistry, Nov. 5, 2004, 279(45):46907-14.
Bentahir et al., "Presenilin clinical mutations can affect γ-secretase activity by different mechanisms," Journal of Neurochemistry, Feb. 2006, 96(3):732-42.
Bessis et al., "Immune responses to gene therapy vectors: influence on vector function and effector mechanisms," Gene Therapy, Oct. 2004, 11(1):S10-7.
Bose et al., "Role of nucleolin in human parainfluenza virus type 3 infection of human lung epithelial cells," Journal of Virology, Aug. 1, 2004, 78(15):8146-58.
Brouwers et al., "Molecular genetics of Alzheimer's disease: an update," Annals of Medicine, Jan. 1, 2008, 40(8):562-83.
Brunkan et al., "Two domains within the first putative transmembrane domain of presenilin 1 differentially influence presenilinase and γ-secretase activity," Journal of Neurochemistry, Sep. 2005, 94(5):1315-28.
Chen et al., "Gene therapy for brain tumors: regression of experimental gliomas by adenovirus-mediated gene transfer in vivo," Proceedings of the National Academy of Sciences, Apr. 12, 1994, 91(8):3054-7.
Chen et al., "Presenilin 1 mutations activate γ42-secretase but reciprocally inhibit ε-secretase cleavage of amyloid precursor pro-

(56) References Cited

OTHER PUBLICATIONS tein (APP) and S3-cleavage of notch," Journal of Biological Chemistry, Sep. 27, 2002, 277(39):36521-6.
Cressant et al., "Improved behavior and neuropathology in the mouse model of Sanfilippo type IIIB disease after adeno-associated virus-mediated gene transfer in the striatum," Journal of Neuroscience, Nov. 10, 2004, 24(45):10229-39.
Crook et al., "A variant of Alzheimer's disease with spastic paraparesis and unusual plaques due to deletion of exon 9 of presenilin 1," Nature Medicine, Apr. 1998, 4(4):452-5.
De Jonghe et al., "Aberrant splicing in the presenilin-1 intron 4 mutation causes presenile Alzheimer's disease by increased Aβ42 secretion," Human Molecular Genetics, Aug. 1, 1999, 8(8):1529-40.
De Strooper, "Loss-of-function presenilin mutations in Alzheimer disease: Talking Point on the role of presenilin mutations in Alzheimer disease," EMBO Reports, Feb. 2007, 8(2):141-6.
Deyle et al., "Adeno-associated virus vector integration," Current Opinion in Molecular Therapeutics, Aug. 2009, 11(4):442, 11 pages.
Dittgen et al., "Lentivirus-based genetic manipulations of cortical neurons and their optical and electrophysiological monitoring in vivo," Proceedings of the National Academy of Sciences, Dec. 28, 2004, 101(52):18206-11.
Doll et al., "Comparison of promoter strengths on gene delivery into mammalian brain cells using AAV vectors," Gene Therapy, May 1, 1996, 3(5):437-47.
Dong et al., "Poly (d, 1-lactide-co-glycolide)/montmorillonite nanoparticles for oral delivery of anticancer drugs," Biomaterials, Oct. 1, 2005, 26(30):6068-76.
Duff et al., "Increased amyloid-β42 (43) in brains of mice expressing mutant presenilin 1," Nature, Oct. 1996, 383(6602):710-3.
EP Extended Search Report in European Appln. No. 19808081.4, dated Feb. 21, 2022, 7 pages.
EP Supplementary European Search Report in European Appln. No. 19808081.4, dated Mar. 11, 2022, 8 pages.
Feng et al., "Forebrain degeneration and ventricle enlargement caused by double knockout of Alzheimer's presenilin-1 and presenilin-2," Proceedings of the National Academy of Sciences, May 25, 2004, 101(21):8162-7.
Flotte et al., "Gene expression from adeno-associated virus vectors in airway epithelial cells," Am J Respir Cell Mol Biol, Sep. 1, 1992, 7(3):349-56.
Foley et al., "Intra-arterial delivery of AAV vectors to the mouse brain after mannitol mediated blood brain barrier disruption," Journal of Controlled Release, Dec. 28, 2014, 196:71-8.
GenBank Accession No. NP 000438.2, "presenilin-2 isoform 1 [Homo sapiens]," May 14, 2018, 4 pages.
Gholizadeh et al., "Reduced phenotypic severity following adeno-associated virus-mediated Fmr1 gene delivery in fragile X mice," Neuropsychopharmacology, Dec. 2014, 39(13):3100-11.
Gonçalves et al., "Adeno-associated virus: from defective virus to effective vector," Virology Journal, Dec. 2005, 2(1):1-7.
Haberman et al., "Inducible long-term gene expression in brain with adeno-associated virus gene transfer," Gene Therapy, Dec. 1998, 5(12):1604-11.
Handler et al., "Presenilin-1 regulates neuronal differentiation during neurogenesis," Development, Jun. 15, 2000, 127(12):2593-606.
Heilig et al., "A presenilin-1 mutation identified in familial Alzheimer disease with cotton wool plaques causes a nearly complete loss of γ-secretase activity," Journal of Biological Chemistry, Jul. 16, 2010, 285(29):22350-9.
Heilig et al., "Trans-dominant negative effects of pathogenic PSEN1 mutations on γ-secretase activity and Aβ production," Journal of Neuroscience, Jul. 10, 2013, 33(28):11606-17.
Henikoff et al., "Amino acid substitution matrices from protein blocks," Proceedings of the National Academy of Sciences, Nov. 15, 1992, 89(22):10915-9.
Hermonat et al., "Use of adeno-associated virus as a mammalian DNA cloning vector: transduction of neomycin resistance into mammalian tissue culture cells," Proceedings of the National Academy of Sciences, Oct. 1, 1984, 81(20):6466-70.

Herreman et al., "γ-Secretase activity requires the presenilin-dependent trafficking of nicastrin through the Golgi apparatus but not its complex glycosylation," Journal of Cell Science, Mar. 15, 2003, 116(6):1127-36.
Herskowitz, "Functional inactivation of genes by dominant negative mutations," Nature, Sep. 1987, 329(6136):219-22.
Hester et al., "AAV as a gene transfer vector for the treatment of neurological disorders: novel treatment thoughts for ALS," Current Gene Therapy, Oct. 1, 2009, 9(5):428-33.
Hiltunen et al., "Identification of a novel 4.6-kb genomic deletion in presenilin-1 gene which results in exclusion of exon 9 in a Finnish early onset Alzheimer's disease family: an Alu core sequence-stimulated recombination?," European Journal of Human Genetics, Apr. 2000, 8(4):259-66.
Hitoshi Niwa et al., "Efficient selection for high-expression transfectants with a novel eukaryotic vector," Gene, Dec. 15, 1991, 108(2):193-9.
Hsu et al., "Discovery and validation of autosomal dominant Alzheimer's disease mutations," Alzheimer's Research & Therapy, Dec. 2018, 10(1):1-8.
Iwata et al., "Global brain delivery of neprilysin gene by intravascular administration of AAV vector in mice," Scientific Reports, Mar. 18, 2013, 3(1):1-8.
Jackson et al., "AAV9 supports wide-scale transduction of the CNS and TDP-43 disease modeling in adult rats," Molecular Therapy—Methods & Clinical Development, Jan. 1, 2015, 2:15036, 8 pages.
Kang et al., "An evolutionarily conserved role of presenilin in neuronal protection in the aging Drosophila brain," Genetics, Jul. 1, 2017, 206(3):1479-93.
Kelleher et al., "Presenilin-1 mutations and Alzheimer's disease," Proceedings of the National Academy of Sciences, Jan. 24, 2017, 114(4):629-31.
Kim et al., "Presenilins are required for maintenance of neural stem cells in the developing brain," Molecular Neurodegeneration, Dec. 2008, 3(1):1-3.
Kim et al., "Viral transduction of the neonatal brain delivers controllable genetic mosaicism for visualising and manipulating neuronal circuits in vivo," European Journal of Neuroscience, Apr. 2013, 37(8):1203-20.
Klein et al., "Dose and promoter effects of adeno-associated viral vector for green fluorescent protein expression in the rat brain," Experimental Neurology, Jul. 1, 2002, 176(1):66-74.
Kosik et al., "Homozygosity of the autosomal dominant Alzheimer disease presenilin 1 E280A mutation," Neurology, Jan. 13, 2015, 84(2):206-8.
Kumar-Singh et al., "Mean age-of-onset of familial alzheimer disease caused by presenilin mutations correlates with both increased Aβ42 and decreased Aβ40," Human Mutation, Jul. 2006, 27(7):686-95.
Lalli et al., "Origin of the PSEN1 E280A mutation causing early-onset Alzheimer's disease," Alzheimer's & Dementia, Oct. 2014, 10:S277-83.
Langer et al., "New methods of drug delivery," Science, Sep. 28, 1990, 249(4976):1527-33.
Lebkowski et al., "Adeno-associated virus: a vector system for efficient introduction and integration of DNA into a variety of mammalian cell types,". Molecular and Cellular Biology, Oct. 1, 1988, 8(10):3988-96.
Lee et al., "Presenilins regulate synaptic plasticity and mitochondrial calcium homeostasis in the hippocampal mossy fiber pathway," Molecular Neurodegeneration, Dec. 2017, 12(1):1-5.
Lee et al., "Synaptic function of nicastrin in hippocampal neurons," Proceedings of the National Academy of Sciences, Jun. 17, 2014, 111(24):8973-8.
Lei et al., "Structure-function analysis of human glucose-6-phosphatase, the enzyme deficient in glycogen storage disease type 1a," Journal of Biological Chemistry, May 19, 1995, 270(20):11882-6.
Lemere et al., "The E280A presenilin 1 Alzheimer mutation produces increased Aβ42 deposition and severe cerebellar pathology," Nature Medicine, Oct. 1996, 2(10):1146-50.
Levitan et al., "Assessment of normal and mutant human presenilin function in Caenorhabditis elegans," Proceedings of the National Academy of Sciences, Dec. 10, 1996, 93(25):14940-4.

(56) References Cited

OTHER PUBLICATIONS

Levy-Lahad et al., "Candidate gene for the chromosome 1 familial Alzheimer's disease locus," Science, Aug. 18, 1995, 269(5226):973-7.

Liu et al., "Systematic comparison of 2A peptides for cloning multi-genes in a polycistronic vector," Scientific Reports, May 19, 2017, 7(1):1-9.

Löbenberg et al., "Improved body distribution of 14C-labelled AZT bound to nanoparticles in rats determined by radioluminography," Journal of Drug Targeting, Jan. 1, 1998. 5(3):171-9.

Lopera et al., "Clinical features of early-onset Alzheimer disease in a large kindred with an E280A presenilin-1 mutation," Jama, Mar. 12, 1997, 277(10):793-9.

Marambaud et al., "A presenilin-1/γ-secretase cleavage releases the E-cadherin intracellular domain and regulates disassembly of adherens junctions," The EMBO Journal, Apr. 15, 2002, 21(8):1948-56.

Mauro et al., "A critical analysis of codon optimization in human therapeutics," Trends in Molecular Medicine, Nov. 1, 2014, 20(11):604-13.

Mayford et al., "Control of memory formation through regulated expression of a CaMKII transgene," Science, Dec. 6, 1996, 274(5293):1678-83.

McLaughlin et al., "Adeno-associated virus general transduction vectors: analysis of proviral structures," Journal of Virology, Jun. 1, 1988, 62(6):1963-73.

McLean et al., "Widespread neuron-specific transgene expression in brain and spinal cord following synapsin promoter-driven AAV9 neonatal intracerebroventricular injection," Neuroscience Letters, Jul. 25, 2014, 576:73-8.

Mingozzi et al., "Therapeutic in vivo gene transfer for genetic disease using AAV: progress and challenges," Nature Reviews Genetics, May 2011, 12(5):341-55.

Moehlmann et al., "Presenilin-1 mutations of leucine 166 equally affect the generation of the Notch and APP intracellular domains independent of their effect on Aβ42 production," Proceedings of the National Academy of Sciences, Jun. 11, 2002, 99(12):8025-30.

Mucke et al., "High-level neuronal expression of Aβ1-42 in wild-type human amyloid protein precursor transgenic mice: synaptotoxicity without plaque formation," Journal of Neuroscience, Jun. 1, 2000, 20(11):4050-8.

Muzyczka, "Use of adeno-associated virus as a general transduction vector for mammalian cells," Viral Expression Vectors, 1992, vol. 1992:97-129.

Palmisano et al., "Characterization of membrane-shed microvesicles from cytokine-stimulated β-cells using proteomics strategies," Molecular & Cellular Proteomics, Aug. 1, 2012, 11(8):230-43.

Parra et al., "Memory binding and white matter integrity in familial Alzheimer's disease, " Brain, May 1, 2015, 138(5):1355-69.

PCT International Preliminary Report on Patentability in International Appln. No. PCT/US2019/033616, dated Nov. 24, 2020, 12 pages.

PCT International Preliminary Report on Patentability in International Appln. No. PCT/US2020/034040, dated Nov. 16, 2021, 7 pages.

PCT International Search Report and Written Opinion in International Appln. No. PCT/US2019/033616, dated Oct. 28, 2019, 18 pages.

PCT International Search Report and Written Opinion in International Appln. No. PCT/US2020/034040, dated Sep. 17, 2020, 10 pages.

Podlisny et al., "Presenilin proteins undergo heterogeneous endoproteolysis between Thr291and Ala299and occur as stable N-and C-terminal fragments in normal and Alzheimer brain tissue," Neurobiology of Disease, Jan. 1, 1997, 3(4):325-37.

Qi et al., "Distinct mechanisms by mutant presenilin 1 and 2 leading to increased intracellular levels of amyloid β-protein 42 in Chinese hamster ovary cells," Biochemistry, Feb. 4, 2003, 42(4):1042-52.

Qian et al., "Mutant human presenilin 1 protects presenilin 1 null mouse against embryonic lethality and elevates Aβ1-42/43 expression," Neuron, Mar. 1, 1998, 20(3):611-7.

Reiman et al., "Brain imaging and fluid biomarker analysis in young adults at genetic risk for autosomal dominant Alzheimer's disease in the presenilin 1 E280A kindred: a case-control study," The Lancet Neurology, Dec. 1, 2012, 11(12):1048-56.

Rios-Romenets et al., "The value of pre-screening in the Alzheimer's Prevention Initiative (API) Autosomal Dominant Alzheimer's Disease trial," The Journal of Prevention of Alzheimer's Disease, Jan. 2018, 5(1):49-54.

Robinson et al., "Lipid nanoparticle-delivered chemically modified mRNA restores chloride secretion in cystic fibrosis," Molecular Therapy, Aug. 1, 2018, 26(8):2034-46.

Rogaev et al., "Familial Alzheimer's disease in kindreds with missense mutations in a gene on chromosome 1 related to the Alzheimer's disease type 3 gene," Nature, Aug. 1995, 376(6543):775-8.

Ryan et al., "Correlating familial Alzheimer's disease gene mutations with clinical phenotype," Biomarkers in Medicine, Feb. 2010, 4(1):99-112.

Ryman et al., "Symptom onset in autosomal dominant Alzheimer disease: a systematic review and meta-analysis," Neurology, Jul. 15, 2014, 83(3):253-60.

Saito et al., "Potent amyloidogenicity and pathogenicity of Aβ43," Nature Neuroscience, Aug. 2011, 14(8):1023-32.

Sakuma et al., "Mucoadhesion of polystyrene nanoparticles having surface hydrophilic polymeric chains in the gastrointestinal tract," International Journal of Pharmaceutics, Jan. 25, 1999, 177(2):161-72.

Samulski et al., "Helper-free stocks of recombinant adeno-associated viruses: normal integration does not require viral gene expression," Journal of Virology, Sep. 1, 1989, 63(9):3822-8.

Saura et al., "Conditional inactivation of presenilin 1 prevents amyloid accumulation and temporarily rescues contextual and spatial working memory impairments in amyloid precursor protein transgenic mice," Journal of Neuroscience, Jul. 20, 2005, 25(29):6755-64.

Saura et al., "Loss of presenilin function causes impairments of memory and synaptic plasticity followed by age-dependent neurodegeneration," Neuron, Apr. 8, 2004, 42(1):23-36.

Schroeter et al., "A presenilin dimer at the core of the γ-secretase enzyme: insights from parallel analysis of Notch 1 and APP proteolysis," Proceedings of the National Academy of Sciences, Oct. 28, 2003, 100(22):13075-80.

Sepulveda-Falla et al., "Deposition of hyperphosphorylated tau in cerebellum of PS1 E280A Alzheimer's disease," Brain Pathology, Jul. 2011, 21(4):452-63.

Sepulveda-Falla et al., "Familial Alzheimer's disease-associated presenilin-1 alters cerebellar activity and calcium homeostasis," The Journal of Clinical Investigation, Apr. 1, 2014, 124(4):1552-67.

Shen et al., "Skeletal and CNS defects in Presenilin-1-deficient mice," Cell, May 16, 1997, 89(4):629-39.

Shen et al., "The presenilin hypothesis of Alzheimer's disease: evidence for a loss-of-function pathogenic mechanism," Proceedings of the National Academy of Sciences, Jan. 9, 2007, 104(2):403-9.

Sherrington et al., "Cloning of a gene bearing missense mutations in early-onset familial Alzheimer's disease," Nature, Jun. 1995, 375(6534):754-60.

Siman et al., "Presenilin-1 P264L knock-in mutation: differential effects on Aβ production, amyloid deposition, and neuronal vulnerability," Journal of Neuroscience, Dec. 1, 2000, 20(23):8717-26.

Song et al., "Proteolytic release and nuclear translocation of Notch-1 are induced by presenilin-1 and impaired by pathogenic presenilin-1 mutations," Proceedings of the National Academy of Sciences, Jun. 8, 1999, 96(12):6959-63.

Steiner et al., "A pathogenic presenilin-1 deletion causes aberrant Aβ42 production in the absence of congophilic amyloid plaques," Journal of Biological Chemistry, Mar. 9, 2001, 276(10):7233-9.

Sun et al., "Analysis of 138 pathogenic mutations in presenilin-1 on the in vitro production of Aβ42 and Aβ40 peptides by γ-secretase," Proceedings of the National Academy of Sciences, Jan. 24, 2017, 114(4):E476-85.

(56) References Cited

OTHER PUBLICATIONS

Sun et al., "Hippocampal spatial memory impairments caused by the familial Alzheimer's disease-linked presenilin 1 M146V mutation," Neurodegenerative Diseases, Aug. 2005, 2(1):6-15.
Szymczak et al., "Correction of multi-gene deficiency in vivo using a single 'self-cleaving' 2A peptide-based retroviral vector," Nature Biotechnology, May 2004, 22(5):589-94.
Tabuchi et al., "Conditional forebrain inactivation of nicastrin causes progressive memory impairment and age-related neurodegeneration," Journal of Neuroscience, Jun. 3, 2009, 29(22):7290-301.
Théry et al., "Isolation and characterization of exosomes from cell culture supernatants and biological fluids," Current Protocols in Cell Biology, Mar. 2006, 30(1):3-22.
Trichas et al., "Use of the viral 2A peptide for bicistronic expression in transgenic mice," BMC Biology, Dec. 2008, 6(1):1-3.
Tysoe et al., "A presenilin-1 truncating mutation is present in two cases with autopsy-confirmed early-onset Alzheimer disease," The American Journal of Human Genetics, Jan. 1, 1998, 62(1):70-6.
Virovic et al., "Novel delivery methods for treatment of viral hepatitis: an update," Expert Opinion on Drug Delivery, Jul. 1, 2005, 2(4):707-17.
Waldenström et al., "Cardiomyocyte microvesicles contain DNA/RNA and convey biological messages to target cells," PloS one, Apr. 10, 2012, 7(4):e34653, 7 pages.
Walker et al., "Presenilin 2 familial Alzheimer's disease mutations result in partial loss of function and dramatic changes in Aβ 42/40 ratios," Journal of Neurochemistry, Jan. 2005, 92(2):294-301.
Watanabe et al., "Dominant negative mechanism of Presenilin-1 mutations in FAD," Proceedings of the National Academy of Sciences, Nov. 28, 2017, 114(48):12635-7.
Watanabe et al., "Familial frontotemporal dementia-associated presenilin-1 c. 548G> T mutation causes decreased mRNA expression and reduced presenilin function in knock-in mice," Journal of Neuroscience, Apr. 11, 2012, 32(15):5085-96.
Watanabe et al., "Indirect regulation of presenilins in CREB-mediated transcription," Journal of Biological Chemistry, May 15, 2009, 284(20):13705-13.
Watanabe et al., "Partial loss of presenilin impairs age-dependent neuronal survival in the cerebral cortex," Journal of Neuroscience, Nov. 26, 2014, 34(48):15912-22.
Wiley et al., "Familial Alzheimer's disease mutations inhibit γ-secretase-mediated liberation of β-amyloid precursor protein carboxy-terminal fragment," Journal of Neurochemistry, Sep. 2005, 94(5):1189-201.
Wines-Samuelson et al., "Characterization of age-dependent and progressive cortical neuronal degeneration in presenilin conditional mutant mice," PLoS One, Apr. 15, 2010, 5(4):e10195.
Wines-Samuelson et al., "Presenilins in the developing, adult, and aging cerebral cortex," The Neuroscientist, Oct. 2005, 11(5):441-51.
Wines-Samuelson et al., "Role of presenilin-1 in cortical lamination and survival of Cajal-Retzius neurons," Developmental Biology, Jan. 15, 2005, 277(2):332-46.
Wu et al., "Presenilins regulate calcium homeostasis and presynaptic function via ryanodine receptors in hippocampal neurons," Proceedings of the National Academy of Sciences, Sep. 10, 2013, 110(37):15091-6.
Xia et al., "Loss of Aβ43 production caused by presenilin-1 mutations in the knockin mouse brain," Neuron, Apr. 20, 2016, 90(2):417-22.
Xia et al., "Presenilin-1 knockin mice reveal loss-of-function mechanism for familial Alzheimer's disease," Neuron, Mar. 4, 2015, 85(5):967-81.
Xia, "Relationship between presenilinase and gamma-secretase," Drug News & Perspectives, Mar. 1, 2003, 16(2):69-74.
Yu et al., "APP processing and synaptic plasticity in presenilin-1 conditional knockout mice," Neuron, Sep. 13, 2001, 31(5):713-26.
Zhang et al., "Inactivation of presenilins causes pre-synaptic impairment prior to post-synaptic dysfunction," Journal of Neurochemistry, Dec. 2010, 115(5):1215-21.
Zhang et al., "Mutation of the conserved N-terminal cysteine (Cys92) of human presenilin 1 causes increased Aβ42 secretion in mammalian cells but impaired Notch/lin-I2 signalling in C. elegans," Neuroreport, Sep. 28, 2000, 11(14):3227-30.
Zhang et al., "Presenilins are essential for regulating neurotransmitter release," Nature, Jul. 2009, 460(7255):632-6.
Zhao et al., "Mechanisms of recognition of amyloid-β (Aβ) monomer, oligomer, and fibril by homologous antibodies," Journal of Biological Chemistry, Nov. 3, 2017, 292(44):18325-43.
Zhou et al., "Dominant negative effect of the loss-of-function γ-secretase mutants on the wild-type enzyme through heterooligomerization," Proceedings of the National Academy of Sciences, Nov. 28, 2017, 114(48):12731-6.
Zimmermann et al., "Electrolyte-and pH-stabilities of aqueous solid lipid nanoparticle (SLN™) dispersions in artificial gastrointestinal media," European Journal of Pharmaceutics and Biopharmaceutics, Sep. 1, 2001, 52(2):203-10.
EP Extended Search Report in European Appln. No. 20813435.3. dated Jun. 12, 2023, 6 pages.
GenBank Accession No. AAW01891, "Sequence 12 from U.S. Pat. No. 6,783,955," dated Dec. 14, 2004, 1 page.
GenBank Accession No. AFD46703, "Sequence 2 from U.S. Pat. No. 8,129,334," Mar. 14, 2012, 1 page.
AU Office Action in Australian Appln. No. 2019272848, mailed on Oct. 29, 2024, 5 pages.
CN Office Action in Chinese Appln. No. 201980049127.3, mailed on Dec. 18, 2024, 16 pages (with English translation).
CN Office Action in Chinese Appln. No. 202080052274.9, mailed on Sep. 26, 2024, 7 pages (with English translation).
Bäck et al., "Neuronal activation stimulates cytomegalovirus promoter-driven transgene expression," Molecular Therapy Methods & Clinical Development, Sep. 2019, 14:180, 13 pages.
CA Office Action in Canadian Appln. No. 3,100,946, mailed on Feb. 5, 2025, 5 pages.
Emery, "The use of chromatin insulators to improve the expression and safety of integrating gene transfer vectors," Human Gene Therapy, Jun. 2011, 22(6):761-74.
JP Office Action in Japanese Appln. No. 2021-569550, mailed on Jan. 14, 2025, 3 pages (with English translation).
Kim et al., "Human β-Globin Second Intron Highly Enhances Expression of Foreign Genes from Murine Cytomegalovirus Immediate-Early Promoter," Journal of Microbiology and Biotechnology, Jan. 2005, 15(3):544-50.
Kou et al., "Catalytic immunoglobulin gene delivery in a mouse model of Alzheimer's disease: prophylactic and therapeutic applications," Molecular Neurobiology, Feb. 2015, 51:43, 29 pages.
Leppek et al., "Functional 5' UTR mRNA structures in eukaryotic translation regulation and how to find them," Nature Reviews Molecular Cell Biology, Mar. 2018, 19(3):158, 36 pages.
Naso et al., "Adeno-associated virus (AAV) as a vector for gene therapy," BioDrugs, Aug. 2017, 31(4):317-34.
Ólafsdóttir et al., "In vitro analysis of expression vectors for DNA vaccination of horses: the effect of a Kozak sequence," Acta Veterinaria Scandinavica, Dec. 2008, 50:1-7.
Pesole et al., "UTRdb and UTRsite: specialized databases of sequences and functional elements of 5' and 3' untranslated regions of eukaryotic mRNAs, Update 2002." Nucleic Acids Research, Jan. 2002, 30(1):335-40.
Borel et al., "Recombinant AAV as a platform for translating the therapeutic potential of RNA interference," Molecular Therapy, Apr. 2014, 22(4):692-701.
Kilikevicius et al., "Reexamining assumptions about miRNA-guided gene silencing," Nucleic Acids Research, Jan. 2022, 50(2):617-34.
O'Reilly et al., "RNA interference-mediated suppression and replacement of human rhodopsin in vivo," The American Journal of Human Genetics, Jul. 2007, 81(1): 127-35.
Riolo et al., "miRNA targets: from prediction tools to experimental validation," Methods and Protocols, Dec. 2020, 4(1):1, 20 pages.
Seok et al., "MicroRNA target recognition: insights from transcriptome-wide non-canonical interactions," Molecules and Cells, May 2016, 39(5):375-81.

(56) References Cited

OTHER PUBLICATIONS

SG Office Action in Singaporean Appln. No. 11202205560S, mailed on Jun. 5, 2025, 12 pages.

\* cited by examiner

Optimized human PS1 cDNA (1401 nt): <u>Modified nucleotides in hPS1opti are double underlined</u>
Endogenous human PS1 cDNA
AMINO ACID RESIDUES (467 aa)

```
ATG ACA GAA CTG CCT GCC CCC CTG AGC TAC TTC CAG AAC GCC CAG ATG AGC GAG GAC AAC
ATG ACA GAG TTA CCT GCA CCG TTG TCC TAC TTC CAG AAT GCA CAG ATG TCT GAG GAC AAC
 M   T   E   L   P   A   P   L   S   Y   F   Q   N   A   Q   M   S   E   D   N

CAC CTG AGC AAC ACC GTG CGG AGC CAG AAC GAC AAC AGA GAG CGG CAG GAA CAC AAC
CAC CTG AGC AAT ACT GTA CGT AGC CAG AAT GAC AAT AGA GAA CGG CAG GAG CAC AAC
 H   L   S   N   T   V   R   S   Q   N   D   N   R   E   R   Q   E   H   N

GAC AGG CGG AGC CTG GGA CAC CCT GAG CCC CTG TCT AAT GGC AGA CCC CAG GGC AAC AGC
GAC AGA CGG AGC CTT GGC CAC CCT GAG CCA TTA TCT AAT GGA CGA CCC CAG GGT AAC TCC
 D   R   R   S   L   G   H   P   E   P   L   S   N   G   R   P   Q   G   N   S

AGA CAG GTG GTG GAA CAG GAC GAG GAA GAG GAC GAA GAA CTG ACC CTG AAG TAC GGC
CGG CAG GTG GTG GAG CAA GAT GAG GAA GAA GAT GAG GAG CTG ACA TTG AAA TAT GGC
 R   Q   V   V   E   Q   D   E   E   D   E   E   L   T   L   K   Y   G

GCC AAG CAC GTG ATC ATG CTG TTC GTG CCC GTG ACC CTG TGC ATG GTC GTG GTG GTG GCC
GCC AAG CAT GTG ATC ATG CTC TTT GTC CCT GTG ACT CTC TGC ATG GTG GTG GTC GTG GCT
 A   K   H   V   I   M   L   F   V   P   V   T   L   C   M   V   V   V   V   A

ACA ATC AAG AGC GTG TCC TTC TAC ACC CGG AAG GAC GGC CAG CTG ATC TAC ACC CCC TTC
ACA ATT AAG TCA GTC AGC TTT TAT ACC CGG AAG GAT GGG CAG CTA ATC TAT ACC CCA TTC
 T   I   K   S   V   S   F   Y   T   R   K   D   G   Q   L   I   Y   T   P   F

ACC GAG GAC ACC GAG ACA GTG GGA CAG AGA GCC CTG CAC AGC ATC CTG AAC GCC GCC ATC
ACA GAA GAT ACC GAG ACT GTG GGC CAG AGA GCC CTG CAC TCA ATT CTG AAT GCT GCC ATC
 T   E   D   T   E   T   V   G   Q   R   A   L   H   S   I   L   N   A   A   I

ATG ATC AGC GTG ATC GTC GTG ATG ACC ATC CTG CTG GTG GTG CTG TAC AAG TAC CGG TGC
ATG ATC AGT GTC ATT GTT GTC ATG ACT ATC CTC CTG GTG GTT CTG TAT AAA TAC AGG TGC
 M   I   S   V   I   V   V   M   T   I   L   L   V   V   L   Y   K   Y   R   C

TAC AAA GTG ATC CAC GCC TGG CTG ATC ATC AGC AGC CTG CTG CTG CTG TTC TTC TTT AGC
TAT AAG GTC ATC CAT GCC TGG CTT ATT ATA TCA TCT CTA TTG TTG CTG TTC TTT TTT TCA
 Y   K   V   I   H   A   W   L   I   I   S   S   L   L   L   L   F   F   F   S

TTC ATC TAC CTG GGC GAG GTG TTC AAG ACC TAC AAC GTG GCC GTG GAC TAC ATC ACC GTG
TTC ATT TAC TTG GGG GAA GTG TTT AAA ACC TAT AAC GTT GCT GTG GAC TAC ATT ACT GTT
 F   I   Y   L   G   E   V   F   K   T   Y   N   V   A   V   D   Y   I   T   V

GCC CTG CTG ATC TGG AAC TTC GGC GTC GTG GGC ATG ATC TCC ATC CAC TGG AAG GGC CCC
GCA CTC CTG ATC TGG AAT TTT GGT GTG GTG GGA ATG ATT TCC ATT CAC TGG AAA GGT CCA
 A   L   L   I   W   N   F   G   V   V   G   M   I   S   I   H   W   K   G   P

CTG AGA CTG CAG CAG GCC TAC CTG ATT ATG ATC TCC GCC CTG ATG GCC CTG GTG TTC ATC
CTT CGA CTC CAG CAG GCA TAT CTC ATT ATG ATT AGT GCC CTC ATG GCC CTG  TG TTT ATC
 L   R   L   Q   Q   A   Y   L   I   M   I   S   A   L   M   A   L   V   F   I

AAG TAC CTG CCC GAG TGG ACC GCT TGG CTG ATC CTG GCC GTG ATC TCC GTG TAC GAC CTG
AAG TAC CTC CCT GAA TGG ACT GCG TGG CTC ATC TTG GCT GTG ATT TCA GTA TAT GAT TTA
 K   Y   L   P   E   W   T   A   W   L   I   L   A   V   I   S   V   Y   D   L
```

FIG. 2

```
GTG GCC GTG CTG TGC CCT AAG GGA CCT CTG CGG ATG CTG GTG GAA ACC GCC CAG GAA
GTG GCT GTT TTG TGT CCG AAA GGT CCA CTT CGT ATG CTG GTT GAA ACA GCT CAG GAG
 V   A   V   L   C   P   K   G   P   L   R   M   L   V   E   T   A   Q   E

CGG AAC GAG ACA CTG TTC CCT GCC CTG ATC TAC TCC AGC ACA ATG GTG TGG CTC GTG AAC
AGA AAT GAA ACG CTT TTT CCA GCT CTC ATT TAC TCC TCA ACA ATG GTG TGG TTG GTG AAT
 R   N   E   T   L   F   P   A   L   I   Y   S   S   T   M   V   W   L   V   N

ATG GCC GAG GGC GAT CCT GAG GCC CAG CGG AGA GTG TCC AAG AAC TCC AAG TAC AAC GCC
ATG GCA GAA GGA GAC CCG GAA GCT CAA AGG AGA GTA TCC AAA AAT TCC AAG TAT AAT GCA
 M   A   E   G   D   P   E   A   Q   R   R   V   S   K   N   S   K   Y   N   A

GAG AGC ACC GAG CGC GAG AGC CAG GAT ACA GTG GCC GAG AAT GAC GAC GGC GGC TTC
GAA AGC ACA GAA AGG GAG TCA CAA GAC ACT GTT GCA AG AAT GAT GAT GGC GGG TTC
 E   S   T   E   R   E   S   Q   D   T   V   A   E   N   D   D   G   G   F

AGC GAG GAA TGG GAG GCC CAG AGA GAT AGC CAC CTG GGC CCT CAC AGA AGC ACC CCT
AGT GAG GAA TGG GAA GCC CAG AGG GAC AGT CAT CTA GGG CCT CAT CGC TCT ACA CCT
 S   E   E   W   E   A   Q   R   D   S   H   L   G   P   H   R   S   T   P

GAA TCT AGA GCC GCC GTG CAG GAA CTG AGC AGC TCC ATT CTG GCC GGC GAG GAC CCC GAA
GAG TCA CGA GCT GCT GTC CAG GAA CTT TCC AGC AGT ATC CTC GCT GGT GAA GAC CCA GAG
 E   S   R   A   A   V   Q   E   L   S   S   S   I   L   A   G   E   D   P   E

GAA AGA GGC GTG AAA CTG GGC CTG GGC GAC TTC ATC TTC TAC AGC GTG CTC GTG GGC AAG
GAA AGG GGA GTA AAA CTT GGA TTG GGA GAT TTC ATT TTC TAC AGT GTT CTG GTT GGT AAA
 E   R   G   V   K   L   G   L   G   D   F   I   F   Y   S   V   L   V   G   K

GCC AGC GCC ACA GCT AGC GGC GAC TGG AAC ACC ACA ATC GCC TGC TTC GTG GCC ATC CTG
GCC TCA GCA ACA GCC AGT GGA GAC TGG AAC ACA ACC ATA GCC TGT TTC GTA GCC ATA TTA
 A   S   A   T   A   S   G   D   W   N   T   T   I   A   C   F   V   A   I   L

ATC GGC CTG TGT CTG ACA CTT CTG CTG CTG GCC ATC TTC AAG AAG GCC CTG CCC GCC CTG
ATT GGT TTG TGC CTT ACA TTA TTA CTC CTT GCC ATT TTC AAG AAA GCA TTG CCA GCT CTT
 I   G   L   C   L   T   L   L   L   L   A   I   F   K   K   A   L   P   A   L

CCT ATC AGC ATC ACC TTC GGC CTG GTG TTT TAC TTC GCC ACC GAC TAC CTG GTG CAG CCC
CCA ATC TCC ATC ACC TTT GGG CTT GTT TTC TAC TTT GCC ACA GAT TAT CTT GTA CAG CCT
 P   I   S   I   T   F   G   L   V   F   Y   F   A   T   D   Y   L   V   Q   P

TTC ATG GAC CAG CTG GCC TTC CAC CAG TTC TAC ATC TGA    Opti-hPSEN1 (SEQ ID NO:9)
TTT ATG GAC CAA TTA GCA TTC CAT CAA TTT TAT ATC TAG    hPSEN1 wt   (SEQ ID NO:1)
 F   M   D   Q   L   A   F   H   Q   F   Y   I         hPS1 protein (SEQ ID NO:5)

Human Kozak consensus sequence: gccRccATGG (SEQ ID NO:10)
hPSEN1opti Kozak seq: CGACGCCACCATGACAGAACTGC (SEQ ID NO:11)
```

FIG. 2, continued

SEQUENCE LISTING

<160> NUMBER OF SEQ ID NOS: 11

<210> SEQ ID NO 1
<211> LENGTH: 6107
<212> TYPE: DNA
<213> ORGANISM: Homo sapiens

<400> SEQUENCE: 1

| | | | | | | |
|---|---|---|---|---|---|---|
| aaatgacgac | aacggtgagg | gttctcgggc | ggggcctggg | acaggcagct | ccggggtccg | 60 |
| cggtttcaca | tcggaaacaa | aacagcggct | ggtctggaag | gaacctgagc | tacgagccgc | 120 |
| ggcggcagcg | gggcggcggg | gaagcgtata | cctaatctgg | gagcctgcaa | gtgacaacag | 180 |
| cctttgcggt | ccttagacag | cttggcctgg | aggagaacac | atgaaagaaa | gaacctcaag | 240 |
| aggctttgtt | ttctgtgaaa | cagtatttct | atacagttgc | tccaatgaca | gagttacctg | 300 |
| caccgttgtc | ctacttccag | aatgcacaga | tgtctgagga | caaccacctg | agcaatactg | 360 |
| tacgtagcca | gaatgacaat | agagaacggc | aggagcacaa | cgacagacgg | agccttggcc | 420 |
| accctgagcc | attatctaat | ggacgacccc | agggtaactc | ccggcaggtg | gtggagcaag | 480 |
| atgaggaaga | agatgaggag | ctgacattga | aatatggcgc | caagcatgtg | atcatgctct | 540 |
| ttgtccctgt | gactctctgc | atggtggtgg | tcgtggctac | cattaagtca | gtcagctttt | 600 |
| atacccggaa | ggatgggcag | ctaatctata | ccccattcac | agaagatacc | gagactgtgg | 660 |
| gccagagagc | cctgcactca | attctgaatg | ctgccatcat | gatcagtgtc | attgttgtca | 720 |
| tgactatcct | cctggtggtt | ctgtataaat | acaggtgcta | taaggtcatc | catgcctggc | 780 |
| ttattatatc | atctctattg | ttgctgttct | ttttttcatt | catttacttg | ggggaagtgt | 840 |
| ttaaaaccta | taacgttgct | gtggactaca | ttactgttgc | actcctgatc | tggaattttg | 900 |
| gtgtggtggg | aatgatttcc | attcactgga | aaggtccact | tcgactccag | caggcatatc | 960 |
| tcattatgat | tagtgccctc | atggccctgg | tgtttatcaa | gtacctccct | gaatggactg | 1020 |
| cgtggctcat | cttggctgtg | atttcagtat | atgatttagt | ggctgttttg | tgtccgaaag | 1080 |
| gtccacttcg | tatgctggtt | gaaacagctc | aggagagaaa | tgaaacgctt | tttccagctc | 1140 |
| tcatttactc | ctcaacaatg | gtgtggttgg | tgaatatggc | agaaggagac | ccggaagctc | 1200 |
| aaaggagagt | atccaaaaat | tccaagtata | atgcagaaag | cacagaaagg | gagtcacaag | 1260 |
| acactgttgc | agagaatgat | gatggcgggt | tcagtgagga | atgggaagcc | agagggaca | 1320 |
| gtcatctagg | gcctcatcgc | tctacacctg | agtcacgagc | tgctgtccag | gaactttcca | 1380 |
| gcagtatcct | cgctggtgaa | gacccagagg | aaagggagt | aaaacttgga | ttgggagatt | 1440 |
| tcatttctta | cagtgttctg | gttggtaaag | cctcagcaac | agccagtgga | gactggaaca | 1500 |
| caaccatagc | ctgtttcgta | gccatattaa | ttggtttgtg | ccttacatta | ttactccttg | 1560 |
| ccattttcaa | gaaagcattg | ccagctcttc | caatctccat | cacctttggg | cttgttttct | 1620 |
| actttgccac | agattatctt | gtacagcctt | ttatggacca | attagcattc | catcaatttt | 1680 |
| atatctagca | tatttgcggt | tagaatccca | tggatgtttc | ttctttgact | ataacaaaat | 1740 |
| ctggggagga | caaaggtgat | tttcctgtgt | ccacatctaa | caaagtcaag | attcccggct | 1800 |
| ggacttttgc | agcttccttc | caagtcttcc | tgaccacctt | gcactattgg | actttggaag | 1860 |
| gaggtgccta | tagaaaacga | ttttgaacat | acttcatcgc | agtggactgt | gtccctcggt | 1920 |
| gcagaaacta | ccagatttga | gggacgaggt | caaggagata | tgataggccc | ggaagttgct | 1980 |
| gtgccccatc | agcagcttga | cgcgtggtca | caggacgatt | tcactgacac | tgcgaactct | 2040 |
| caggactacc | gttaccaaga | ggttaggtga | agtggtttaa | accaaacgga | actcttcatc | 2100 |

```
ttaaactaca cgttgaaaat caacccaata attctgtatt aactgaattc tgaactttte   2160 aggaggtact gtgaggaaga gcaggcacca gcagcagaat ggggaatgga gaggtgggca   2220
ggggttccag cttcccttty atttttgct gcagactcat cctttttaaa tgagacttgt   2280
tttcccctct ctttgagtca agtcaaatat gtagattgcc tttggcaatt cttcttctca   2340
agcactgaca ctcattaccg tctgtgattg ccatttcttc ccaaggccag tctgaacctg   2400
aggttgcttt atcctaaaag ttttaacctc aggttccaaa ttcagtaaat tttgaaaaca   2460
gtacagctat ttctcatcaa ttctctatca tgttgaagtc aaatttggat tttccaccaa   2520
attctgaatt tgtagacata cttgtacgct cacttgcccc agatgcctcc tctgtcctca   2580
ttcttctctc ccacacaagc agtcttttc tacagccagt aaggcagctc tgtcgtggta   2640
gcagatggtc ccattattct agggtcttac tctttgtatg atgaaaagaa tgtgttatga   2700
atcggtgctg tcagccctgc tgtcagacct tcttccacag caaatgagat gtatgcccaa   2760
agacggtaga attaaagaag agtaaaatgg ctgttgaagc actttctgtc ctggtatttt   2820
gtttttgctt ttgccacaca gtagctcaga atttgaacaa atagccaaaa gctggtggtt   2880
gatgaattat gaactagttg tatcaacaca aagcaagagt tggggaaagc catatttaac   2940
ttggtgagct gtgggagaac ctggtggcag aaggagaacc aactgccaag ggaaagaga   3000 aggggcctcc agcagcgaag gggatacagt gagctaatga tgtcaaggag gagtttcagg   3060
ttattctcgt cagctccaca aatgggtgct ttgtggtctc tgcccgcgtt accttcctc   3120 tcaatgtacc tttgtgtgaa ctgggcagtg gaggtgcctg ctgcagttac catggagttc   3180
aggctctggg cagctcagtc aggcaaaaca cacaaacagc catcagcctg tgtgggctca   3240
gggcacctct ggacaaaggc ttgtggggca taaccttctt taccacagag agcccttagc   3300
tatgctgatc agaccgtaag cgtttatgag aaacttagtt tcctcctgtg gctgaggagg   3360
ggccagcttt tcttctttt gcctgctgtt ttctctccca atctatgata tgatatgacc   3420
tggtttgggg ctgtctttgg tgtttagaat atttgttttc tgtcccagga tatttcttat   3480
aagaacctaa cttcaagagt agtgtgcgag tactgatctg aatttaaatt aaaattggct   3540
tatattaggc agtcacagac aggaaaaata agagctatgc aaagaaaggg ggatttaaag   3600
tagtaggttc tatcatctca attcattttt ttccatgaaa tcccttcttc caagattcat   3660
tccctctctc agacatgtgc tagcatgggg attatcattg agaaagcaca gctacagcaa   3720
agccacctga atagcaattt gtgattggaa gcattcttga gggatcccta atctagagta   3780
atttatttgt gtaaggatcc caaatgtgtt gcacctttca tgatacattt cttctctgaa   3840
gagggtacgt ggggtgtgtg tatttaaatc catcctatgt attactgatt gtcctgtgta   3900
gaaagatggc aattattctg tctctttctc caagtttgag ccacatctca gccacattgt   3960
tagacagtgt acagagaacc tatctttcct ttttttttt ttaaaggaca ggattttgct   4020
gtgttgccca ggctagactt gaactcctgg gctcaagtaa tccacctcag cctgagtagc   4080
tgagactaca gcccatctta tttctttaaa tcattcatct caggcagaga acttttccct   4140
caaacattct ttttgaaatt agttcagtca ttcctaaaac atccaaatgc tagtcttcca   4200
ccatgaaaaa tagattgtca ctggaaagaa cagtagcaat ttccataagg atgtgccttc   4260
actcacacgg gacaggcggt ggttatagag tcgggcaaaa ccagcagtag agtatgacca   4320
gccaagccaa tctgcttaat aaaaagatgg aagacagtaa ggaaggaaag tagccactaa   4380
gagtctgagt ctgactgggc tacagaataa agggtattta tggacagaat gtcattacat   4440
```

-continued

```
gcctatggga ataccaatca tatttggaag atttgcagat ttttttttcag agaggaaaga    4500 ctcaccttcc tgtttttggt tctcagtagg ttcgtgtgtg ttcctagaat cacagctctg    4560
actccaaatg actcaatttc tcaattagaa aaagtagaag ctttctaagc aacttggaag    4620
aaaacagtca taagtaagca atttgttgat tttactacag aagcaacaac tgaagaggca    4680 gtgttttac tttcagactc cgggattccc attctgtagt ctctctgctt ttaaaaaccc    4740
tccttttgca atagatgccc aaacagatga tgtttattac tgttatttta cgtggcctca    4800
gacagtgtat gtattctcga tataacttgt agagtgtgaa atataagttt aactaccaaa    4860
taaggtctcc cagggttaga tgactgcggg aagcctttga tcccaacccc caaggctttg    4920
tatatttgat catttgtgat ctaaccctgg aagaaaaaga gctcagaaac cactatgaaa    4980
aaatttgttc agtgttttct gtgttcccgt aggttctgga gtctgaggat gcaaagatga    5040
ataagataaa ttctcagaat gtagttataa tctcttgttt tctggtatat gccatctttc    5100
tttaacttct ctaaaatatt gggtatttgt caaataacca cttttaacag ttaccattac    5160
tgagggctta tacattggtg ttataaaagt gacttgattc agaaatcaat ccattcagta    5220
aagtactcct tctctaaatt tgctgttatg tctataagga acagtttgac ctgcccttct    5280
cctcacctcc tcacctgcct tccaacattg aatttggaag gagacgtgaa aattggacat    5340
ttggttttgc ccttgggctg gaaactatca tataatcata agtttgagcc tagaagtgat    5400
ccttgtgatc ttctcacctc tttaaattcc cacaacacaa gagattaaaa acagaggttt    5460
cagctcttca tagtgcgttg tgaaatggct ggccagagtg taccaacaaa gctgtcatcg    5520
ggctcacagc tcagagacat ctgcatgtga tcatctgcat agtcctctcc tctaacggga    5580
aacacctcag atttgcatat aaaaaagcac cctggtgctg aaatgaaccc ctttcttgaa    5640
catcaaagct gtctcccaca gccttgggca gcagggtgcc tcttagtgga tgtgctgggt    5700
ccaccctgag ccctgacatg tggtggcagc attgccagtt ggtctgtgtg tctgtgtagc    5760
agggacgatt tcccagaaag caattttcct tttgaaatac gtaattgttg agactaggca    5820
gtttcaaagt cagctgcata tagtagcaag tacaggactg tcttgttttt ggtgtccttg    5880
gaggtgctgg ggtgagggtt tcagtgggat catttactct cacatgttgt ctgccttctg    5940
cttctgtgga cactgctttg tacttaattc agacagactg tgaatacacc ttttttataa    6000 ataccttca aattcttggt aagatataat tttgatagct gattgcagat tttctgtatt    6060
tgtcagatta ataaagactg catgaatcca aaaaaaaaaa aaaaaa                   6107
```

<210> SEQ ID NO 2
<211> LENGTH: 6095
<212> TYPE: DNA
<213> ORGANISM: Homo sapiens

<400> SEQUENCE: 2

```
aaatgacgac aacggtgagg gttctcgggc ggggcctggg acaggcagct ccggggtccg      60
cggtttcaca tcggaaacaa aacagcggct ggtctggaag gaacctgagc tacgagccgc     120
ggcggcagcg gggcggcggg gaagcgtata cctaatctgg gagcctgcaa gtgacaacag     180
cctttgcggt ccttagacag cttggcctgg aggagaacac atgaaagaaa gaacctcaag     240
aggctttgtt ttctgtgaaa cagtatttct atacagttgc tccaatgaca gagttacctg     300
caccgttgtc ctacttccag aatgcacaga tgtctgagga caaccacctg agcaatacta     360
atgacaaata gagaacggcag gagcacaacg acagacggaa ccttggccac cctgagccat     420
tatctaatgg acgaccccag ggtaactccc ggcaggtggt ggagcaagat gaggaagaag     480
```

```
atgaggagct gacattgaaa tatggcgcca agcatgtgat catgctcttt gtccctgtga      540
ctctctgcat ggtggtggtc gtggctacca ttaagtcagt cagcttttat acccggaagg      600
atgggcagct aatctatacc ccattcacag aagataccga gactgtgggc cagagagccc      660
tgcactcaat tctgaatgct gccatcatga tcagtgtcat tgttgtcatg actatcctcc      720
tggtggttct gtataaatac aggtgctata aggtcatcca tgcctggctt attatatcat      780
ctctattgtt gctgttcttt ttttcattca tttacttggg ggaagtgttt aaaacctata      840
acgttgctgt ggactacatt actgttgcac tcctgatctg gaattttggt gtggtgggaa      900
tgatttccat tcactggaaa ggtccacttc gactccagca ggcatatctc attatgatta      960
gtgccctcat ggccctggtg tttatcaagt acctccctga atggactgcg tggctcatct     1020
tggctgtgat ttcagtatat gatttagtgg ctgttttgtg tccgaaaggt ccacttcgta     1080
tgctggttga aacagctcag gagagaaatg aaacgctttt tccagctctc atttactcct     1140
caacaatggt gtggttggtg aatatggcag aaggagaccc ggaagctcaa aggagagtat     1200
ccaaaaattc caagtataat gcagaaagca cagaaaggga gtcacaagac actgttgcag     1260
agaatgatga tggcgggttc agtgaggaat gggaagccca gagggacagt catctagggc     1320
ctcatcgctc tacacctgag tcacgagctg ctgtccagga actttccagc agtatcctcg     1380
ctggtgaaga cccagaggaa aggggagtaa aacttggatt gggagatttc attttctaca     1440
gtgttctggt tggtaaagcc tcagcaacag ccagtggaga ctggaacaca accatagcct     1500
gtttcgtagc catattaatt ggtttgtgcc ttacattatt actccttgcc attttcaaga     1560
aagcattgcc agctcttcca atctccatca cctttgggct tgttttctac tttgccacag     1620
attatcttgt acagcctttt atggaccaat tagcattcca tcaattttat atctagcata     1680
tttgcggtta gaatcccatg gatgtttctt ctttgactat aacaaaatct ggggaggaca     1740
aaggtgattt tcctgtgtcc acatctaaca aagtcaagat tcccggctgg acttttgcag     1800
cttccttcca agtcttcctg accaccttgc actattggac tttggaagga ggtgcctata     1860
gaaaacgatt ttgaacatac ttcatcgcag tggactgtgt ccctcggtgc agaaactacc     1920
agatttgagg gacgaggtca aggagatatg ataggcccgg aagttgctgt gccccatcag     1980
cagcttgacg cgtggtcaca ggacgatttc actgacactg cgaactctca ggactaccgt     2040
taccaagagg ttaggtgaag tggtttaaac caaacggaac tcttcatctt aaactacacg     2100
ttgaaaatca acccaataat tctgtattaa ctgaattctg aacttttcag gaggtactgt     2160
gaggaagagc aggcaccagc agcagaatgg ggaatggaga ggtgggcagg ggttccagct     2220 tcccttttgat tttttgctgc agactcatcc ttttaaatg agacttgttt tcccctctct     2280
ttgagtcaag tcaaatatgt agattgcctt tggcaattct tcttctcaag cactgacact     2340
cattaccgtc tgtgattgcc atttcttccc aaggccagtc tgaacctgag gttgctttat     2400
cctaaaagtt ttaacctcag gttccaaatt cagtaaattt tggaaacagt acagctattt     2460
ctcatcaatt ctctatcatg ttgaagtcaa atttggattt tccaccaaat tctgaatttg     2520
tagacatact tgtacgctca cttgccccag atgcctcctc tgtcctcatt cttctctccc     2580
acacaagcag tcttttttcta cagccagtaa ggcagctctg tcgtggtagc agatggtccc     2640
attattctag ggtcttactc tttgtatgat gaaagaatg tgttatgaat cggtgctgtc     2700
agccctgctg tcagaccttc ttccacagca aatgagatgt atgcccaaag acggtagaat     2760
taaagaagag taaaatggct gttgaagcac tttctgtcct ggtattttgt ttttgctttt     2820
```

```
gccacacagt agctcagaat ttgaacaaat agccaaaagc tggtggttga tgaattatga    2880
actagttgta tcaacacaaa gcaagagttg gggaaagcca tatttaactt ggtgagctgt    2940
gggagaacct ggtggcagaa ggagaaccaa ctgccaaggg gaaagagaag gggcctccag    3000
cagcgaaggg gatacagtga gctaatgatg tcaaggagga gtttcaggtt attctcgtca    3060
gctccacaaa tgggtgcttt gtggtctctg cccgcgttac ctttcctctc aatgtacctt    3120
tgtgtgaact gggcagtgga ggtgcctgct gcagttacca tggagttcag gctctgggca    3180
gctcagtcag gcaaaacaca caaacagcca tcagcctgtg tgggctcagg gcacctctgg    3240
acaaaggctt gtggggcata accttcttta ccacagagag cccttagcta tgctgatcag    3300
accgtaagcg tttatgagaa acttagtttc ctcctgtggc tgaggagggg ccagcttttt    3360
cttcttttgc ctgctgtttt ctctcccaat ctatgatatg atatgacctg gtttggggct    3420
gtctttggtg tttagaatat ttgttttctg tcccaggata tttcttataa gaacctaact    3480
tcaagagtag tgtgcgagta ctgatctgaa tttaaattaa aattggctta tattaggcag    3540
tcacagacag gaaaaataag agctatgcaa agaaaggggg atttaaagta gtaggttcta    3600
tcatctcaat tcattttttt ccatgaaatc ccttcttcca agattcattc cctctctcag    3660
acatgtgcta gcatgggtat tatcattgag aaagcacagc tacagcaaag ccacctgaat    3720
agcaatttgt gattggaagc attcttgagg gatccctaat ctagagtaat ttatttgtgt    3780
aaggatccca aatgtgttgc acctttcatg atacatttct tctctgaaga gggtacgtgg    3840
ggtgtgtgta tttaaatcca tcctatgtat tactgattgt cctgtgtaga aagatggcaa    3900
ttattctgtc tctttctcca agtttgagcc acatctcagc cacattgtta gacagtgtac    3960
agagaaccta tctttccttt tttttttttt aaaggacagg attttgctgt gttgcccagg    4020
ctagacttga actcctgggc tcaagtaatc cacctcagcc tgagtagctg agactacagc    4080
ccatcttatt tctttaaatc attcatctca ggcagagaac ttttccctca acattctttt    4140
ttagaattag ttcagtcatt cctaaaacat ccaaatgcta gtcttccacc atgaaaaata    4200
gattgtcact ggaaagaaca gtagcaattt ccataaggat gtgccttcac tcacacggga    4260
caggcggtgg ttatagagtc gggcaaaacc agcagtagag tatgaccagc caagccaatc    4320
tgcttaataa aaagatggaa gacagtaagg aaggaaagta gccactaaga gtctgagtct    4380
gactgggcta cagaataaag ggtatttatg gacagaatgt cattacatgc ctatgggaat    4440
accaatcata tttggaagat ttgcagattt ttttccagag aggaaagact caccttcctg    4500
tttttggttc tcagtaggtt cgtgtgtgtt cctagaatca cagctctgac tccaaatgac    4560
tcaatttctc aattagaaaa agtagaagct ttctaagcaa cttggaagaa aacagtcata    4620
agtaagcaat ttgttgattt tactacagaa gcaacaactg aagaggcagt gttttttactt    4680 tcagactccg ggattcccat tctgtagtct ctctgctttt aaaaaccctc cttttgcaat    4740
agatgcccaa acagatgatg tttattactt gttatttacg tggcctcaga cagtgtatgt    4800
attctcgata taacttgtag agtgtgaaat ataagtttaa ctaccaaata aggtctccca    4860
gggttagatg actgcgggaa gcctttgatc ccaaccccca aggctttgta tatttgatca    4920
tttgtgatct aaccctggaa gaaaagagc tcagaaacca ctatgaaaaa atttgttcag    4980
tgttttctgt gttcccgtag gttctggagt ctgaggatgc aaagatgaat aagataaatt    5040
ctcagaatgt agttataatc tcttgttttc tggtatatgc catctttctt taacttctct    5100
aaaatattgg gtatttgtca aataaccact tttaacagtt accattactg agggcttata    5160
cattggtgtt ataaaagtga cttgattcag aaatcaatcc attcagtaaa gtactccttc    5220
```

```
tctaaatttg ctgttatgtc tataaggaac agtttgacct gcccttctcc tcacctcctc    5280
acctgccttc aacattgaa tttggaagga dacgtgaaaa ttggacattt ggttttgccc    5340
ttgggctgga aactatcata taatcataag tttgagccta aagtgatcc ttgtgatctt    5400 ctcacctctt taaattccca caacacaaga gattaaaaac agaggtttca gctcttcata    5460
gtgcgttgtg aaatggctgg ccagagtgta ccaacaaagc tgtcatcggg ctcacagctc    5520
agagacatct gcatgtgatc atctgcatag tcctctcctc taacgggaaa cacctcagat    5580
ttgcatataa aaaagcaccc tggtgctgaa atgaaccct ttcttgaaca tcaaagctgt    5640
ctcccacagc cttgggcagc agggtgcctc ttagtggatg tgctgggtcc accctgagcc    5700
ctgacatgtg gtggcagcat tgccagttgg tctgtgtgtc tgtgtagcag ggacgatttc    5760
ccagaaagca attttccttt tgaaatacgt aattgttgag actaggcagt ttcaaagtca    5820
gctgcatata gtagcaagta caggactgtc ttgttttttgg tgtccttgga ggtgctgggg    5880
tgagggtttc agtgggatca tttactctca catgttgtct gccttctgct tctgtggaca    5940
ctgctttgta cttaattcag acagactgtg aatacacctt ttttataaat accttttcaaa    6000 ttcttggtaa gatataattt tgatagctga ttgcagattt tctgtatttg tcagattaat    6060
aaagactgca tgaatccaaa aaaaaaaaaa aaaaa                               6095
```

<210> SEQ ID NO 3
<211> LENGTH: 2302
<212> TYPE: DNA
<213> ORGANISM: Homo sapiens

<400> SEQUENCE: 3

```
ggggcctggg ccggcgccgg gtccggccgg gcgctcagcc agctgcgtaa actccgctgg      60
agcgcggcgg cagagcaggc atttccagca gtgaggagac agccagaagc aagcttttgg     120
agctgaagga acctgagaca gaagctagtc cccctctga attttactga tgaagaaact     180
gaggccacag agctaaagtg actttttccca aggtcgccca gcgaggacgt gggacttctc     240
agacgtcagg agagtgatgt gagggagctg tgtgaccata aaaagtgacg tgttaaaaac     300
cagcgctgcc ctctttgaaa gccagggagc atcattcatt tagcctgctg agaagaagaa     360
accaagtgtc cgggattcag acctctctgc ggcccaagt gttcgtggtg cttccagagg     420
cagggctatg ctcacattca tggcctctga cagcgaggaa gaagtgtgtg atgagcggac     480
gtccctaatg tcggctgaga gccccacgcc gcgctcctgc caggagggca ggcagggccc     540
agaggatgga gagaacactg cccagtggag aagccaggag aacgaggagg acggtgagga     600
ggaccctgac cgctatgtct gtagtggggt tcccgggcgg ccgccaggcc tggaggaaga     660
gctgaccctc aaatacggag cgaagcacgt gatcatgctg tttgtgcctg tcactctgtg     720
catgatcgtg gtggtagcca ccatcaagtc tgtgcgcttc tacacagaga agaatggaca     780
gctcatctac acgccattca ctgaggacac ccctcggtg ggccagcgcc tcctcaactc     840
cgtgctgaac accctcatca tgatcagcgt catcgtggtt atgaccatct tcttggtggt     900
gctctacaag taccgctgct acaagttcat ccatggctgg ttgatcatgt cttcactgat     960
gctgctgttc ctcttcacct atatctacct tgggaagtg ctcaagacct acaatgtggc    1020
catggactac cccacccctct tgctgactgt ctggaacttc ggggcagtgg gcatggtgtg    1080
catccactgg aaggggccct ctggtgctgca gcaggcctac ctcatcatga tcagtgcgct    1140
catggcccta gtgttcatca agtacctccc agagtggtcc gcgtgggtca tcctgggcgc    1200
```

| | |
|---|---|
| catctctgtg tatgatctcg tggctgtgct gtgtcccaaa gggcctctga gaatgctggt | 1260 |
| agaaactgcc caggagagaa atgagcccat attccctgcc ctgatatact catctgccat | 1320 |
| ggtgtggacg gttggcatgg cgaagctgga cccctcctct cagggtgccc tccagctccc | 1380 |
| ctacgacccg gagatggaag aagactccta tgacagtttt ggggagcctt catacccga | 1440 |
| agtctttgag cctcccttga ctggctaccc aggggaggag ctggaggaag aggaggaaag | 1500 |
| gggcgtgaag cttggcctcg ggacttcat cttctacagt gtgctggtgg gcaaggcggc | 1560 |
| tgccacgggc agcggggact ggaataccac gctggcctgc ttcgtggcca tcctcattgg | 1620 |
| cttgtgtctg accctcctgc tgcttgctgt gttcaagaag gcgctgcccg ccctccccat | 1680 |
| ctccatcacg ttcgggctca tcttttactt ctccacggac aacctggtgc ggccgttcat | 1740 |
| ggacaccctg gcctcccatc agctctacat ctgaggaca tggtgtgcca caggctgcaa | 1800 |
| gctgcaggga attttcattg gatgcagttg tatagtttta cactctagtg ccatatattt | 1860 |
| ttaagacttt tctttcctta aaaaataaag tacgtgttta cttggtgagg aggaggcaga | 1920 |
| accagctctt tggtgccagc tgtttcatca ccagactttg gctcccgctt tggggagcgc | 1980 |
| ctcgcttcac ggacaggaag cacagcaggt ttatccagat gaactgagaa ggtcagatta | 2040 |
| gggcggggag aagagcatcc ggcatgaggg ctgagatgcg caaagagtgt gctcgggagt | 2100 |
| ggcccctggc acctgggtgc tctggctgga gaggaaaagc cagttcccta cgaggagtgt | 2160 |
| tcccaatgct ttgtccatga tgtccttgtt attttattgc ctttagaaac tgagtcctgt | 2220 |
| tcttgttacg gcagtcacac tgctgggaag tggcttaata gtaatatcaa taaatagatg | 2280 |
| agtcctgtta gaatcttgaa aa | 2302 |

<210> SEQ ID NO 4
<211> LENGTH: 2299
<212> TYPE: DNA
<213> ORGANISM: Homo sapiens

<400> SEQUENCE: 4

| | |
|---|---|
| ggggcctggg ccggcgccgg gtccggccgg gcgctcagcc agctgcgtaa actccgctgg | 60 |
| agcgcggcgg cagagcaggc atttccagca gtgaggagac agccagaagc aagcttttgg | 120 |
| agctgaagga acctgagaca gaagctagtc cccctctga attttactga tgaagaaact | 180 |
| gaggccacag agctaaagtg acttttccca aggtcgccca gcgaggacgt gggacttctc | 240 |
| agacgtcagg agagtgatgt gagggagctg tgtgaccata gaaagtgacg tgttaaaaac | 300 |
| cagcgctgcc ctctttgaaa gccagggagc atcattcatt tagcctgctg agaagaagaa | 360 |
| accaagtgtc cgggattcag acctctctgc ggccccaagt gttcgtggtg cttccagagg | 420 |
| cagggctatg ctcacattca tggcctctga cagcgaggaa gaagtgtgtg atgagcggac | 480 |
| gtccctaatg tcggctgaga gccccacgcc gcgctcctgc caggagggca ggcagggccc | 540 |
| agaggatgga gagaacactg cccagtggag aagccaggag aacgaggagg acggtgagga | 600 |
| ggaccctgac cgctatgtct gtagtggggt tcccgggcgg ccgccaggcc tggaggaaga | 660 |
| gctgaccctc aaatacggag cgaagcacgt gatcatgctg tttgtgcctg tcactctgtg | 720 |
| catgatcgtg gtggtagcca ccatcaagtc tgtgcgcttc tacacagaga agaatggaca | 780 |
| gctcatctac acgccattca ctgaggacac acccctcggtg ggccagcgcc tcctcaactc | 840 |
| cgtgctgaac accctcatca tgatcagcgt catcgtggtt atgaccatct tcttggtggt | 900 |
| gctctacaag taccgctgct acaagttcat ccatggctgg ttgatcatgt cttcactgat | 960 |
| gctgctgttc ctcttcaccct atatctacct tgggaagtg ctcaagacct acaatgtggc | 1020 |

```
catggactac cccaccctct tgctgactgt ctggaacttc ggggcagtgg gcatggtgtg    1080
catccactgg aagggccctc tggtgctgca gcaggcctac ctcatcatga tcagtgcgct    1140
catggcccta gtgttcatca agtacctccc agagtggtcc gcgtgggtca tcctgggcgc    1200
catctctgtg tatgatctcg tggctgtgct gtgtcccaaa gggcctctga aatgctggt    1260 agaaactgcc caggagagaa atgagcccat attccctgcc ctgatatact catctgccat    1320
ggtgtggacg gttggcatgg cgaagctgga cccctcctct cagggtgccc tccagctccc    1380
ctacgacccg gagatggaag actcctatga cagttttggg gagccttcat accccgaagt    1440
ctttgagcct cccttgactg ctacccaggg gaggagctg gaggaagagg aggaaagggg    1500
cgtgaagctt ggcctcgggg acttcatctt ctacagtgtg ctggtgggca aggcggctgc    1560
cacgggcagc ggggactgga ataccacgct ggcctgcttc gtggccatcc tcattggctt    1620
gtgtctgacc ctcctgctgc ttgctgtgtt caagaaggcg ctgcccgccc tccccatctc    1680
catcacgttc gggctcatct tttacttctc cacggacaac ctggtgcggc cgttcatgga    1740
caccctggcc tcccatcagc tctacatctg agggacatgg tgtgccacag gctgcaagct    1800
gcagggaatt ttcattggat gcagttgtat agttttacac tctagtgcca tatatttta    1860 agactttttct ttccttaaaa aataaagtac gtgtttactt ggtgaggagg aggcagaacc    1920
agctctttgg tgccagctgt ttcatcacca gactttggct cccgctttgg ggagcgcctc    1980
gcttcacgga caggaagcac agcaggttta tccagatgaa ctgagaaggt cagattaggg    2040
cggggagaag agcatccggc atgagggctg agatgcgcaa agagtgtgct cgggagtggc    2100
ccctggcacc tgggtgctct ggctggagag gaaaagccag ttccctacga ggagtgttcc    2160
caatgctttg tccatgatgt ccttgttatt ttattgcctt tagaaactga gtcctgttct    2220
tgttacggca gtcacactgc tgggaagtgg cttaatagta atatcaataa atagatgagt    2280
cctgttagaa tcttgaaaa                                                 2299
```

<210> SEQ ID NO 5
<211> LENGTH: 467
<212> TYPE: PRT
<213> ORGANISM: Homo sapiens

<400> SEQUENCE: 5

```
Met Thr Glu Leu Pro Ala Pro Leu Ser Tyr Phe Gln Asn Ala Gln Met
1               5                   10                  15

Ser Glu Asp Asn His Leu Ser Asn Thr Val Arg Ser Gln Asn Asp Asn
            20                  25                  30

Arg Glu Arg Gln Glu His Asn Asp Arg Arg Ser Leu Gly His Pro Glu
        35                  40                  45

Pro Leu Ser Asn Gly Arg Pro Gln Gly Asn Ser Arg Gln Val Val Glu
    50                  55                  60

Gln Asp Glu Glu Glu Asp Glu Glu Leu Thr Leu Lys Tyr Gly Ala Lys
65                  70                  75                  80

His Val Ile Met Leu Phe Val Pro Val Thr Leu Cys Met Val Val Val
                85                  90                  95

Val Ala Thr Ile Lys Ser Val Ser Phe Tyr Thr Arg Lys Asp Gly Gln
            100                 105                 110

Leu Ile Tyr Thr Pro Phe Thr Glu Asp Thr Glu Thr Val Gly Gln Arg
        115                 120                 125

Ala Leu His Ser Ile Leu Asn Ala Ala Ile Met Ile Ser Val Ile Val
    130                 135                 140
```

```
Val Met Thr Ile Leu Leu Val Leu Tyr Lys Tyr Arg Cys Tyr Lys
145                 150                 155                 160

Val Ile His Ala Trp Leu Ile Ile Ser Ser Leu Leu Leu Phe Phe
                165                 170                 175

Phe Ser Phe Ile Tyr Leu Gly Glu Val Phe Lys Thr Tyr Asn Val Ala
            180                 185                 190

Val Asp Tyr Ile Thr Val Ala Leu Leu Ile Trp Asn Phe Gly Val Val
                195                 200                 205

Gly Met Ile Ser Ile His Trp Lys Gly Pro Leu Arg Leu Gln Gln Ala
        210                 215                 220

Tyr Leu Ile Met Ile Ser Ala Leu Met Ala Leu Val Phe Ile Lys Tyr
225                 230                 235                 240

Leu Pro Glu Trp Thr Ala Trp Leu Ile Leu Ala Val Ile Ser Val Tyr
                245                 250                 255

Asp Leu Val Ala Val Leu Cys Pro Lys Gly Pro Leu Arg Met Leu Val
            260                 265                 270

Glu Thr Ala Gln Glu Arg Asn Glu Thr Leu Phe Pro Ala Leu Ile Tyr
        275                 280                 285

Ser Ser Thr Met Val Trp Leu Val Asn Met Ala Glu Gly Asp Pro Glu
290                 295                 300

Ala Gln Arg Arg Val Ser Lys Asn Ser Lys Tyr Asn Ala Glu Ser Thr
305                 310                 315                 320

Glu Arg Glu Ser Gln Asp Thr Val Ala Glu Asn Asp Asp Gly Gly Phe
                325                 330                 335

Ser Glu Glu Trp Glu Ala Gln Arg Asp Ser His Leu Gly Pro His Arg
            340                 345                 350

Ser Thr Pro Glu Ser Arg Ala Ala Val Gln Glu Leu Ser Ser Ser Ile
        355                 360                 365

Leu Ala Gly Glu Asp Pro Glu Glu Arg Gly Val Lys Leu Gly Leu Gly
        370                 375                 380

Asp Phe Ile Phe Tyr Ser Val Leu Val Gly Lys Ala Ser Ala Thr Ala
385                 390                 395                 400

Ser Gly Asp Trp Asn Thr Thr Ile Ala Cys Phe Val Ala Ile Leu Ile
                405                 410                 415

Gly Leu Cys Leu Thr Leu Leu Leu Ala Ile Phe Lys Lys Ala Leu
            420                 425                 430

Pro Ala Leu Pro Ile Ser Ile Thr Phe Gly Leu Val Phe Tyr Phe Ala
                435                 440                 445

Thr Asp Tyr Leu Val Gln Pro Phe Met Asp Gln Leu Ala Phe His Gln
        450                 455                 460

Phe Tyr Ile
465

<210> SEQ ID NO 6
<211> LENGTH: 463
<212> TYPE: PRT
<213> ORGANISM: Homo sapiens

<400> SEQUENCE: 6

Met Thr Glu Leu Pro Ala Pro Leu Ser Tyr Phe Gln Asn Ala Gln Met
1               5                   10                  15

Ser Glu Asp Asn His Leu Ser Asn Thr Asn Asp Asn Arg Glu Arg Gln
            20                  25                  30
```

```
Glu His Asn Asp Arg Arg Ser Leu Gly His Pro Pro Leu Ser Asn
        35                  40                  45

Gly Arg Pro Gln Gly Asn Ser Arg Gln Val Val Gln Asp Glu Glu
    50                  55                  60

Glu Asp Glu Glu Leu Thr Leu Lys Tyr Gly Ala Lys His Val Ile Met
65                  70                  75                  80

Leu Phe Val Pro Val Thr Leu Cys Met Val Val Val Ala Thr Ile
                85                  90                  95

Lys Ser Val Ser Phe Tyr Thr Arg Lys Asp Gly Gln Leu Ile Tyr Thr
                100                 105                 110

Pro Phe Thr Glu Asp Thr Glu Thr Val Gly Gln Arg Ala Leu His Ser
            115                 120                 125

Ile Leu Asn Ala Ala Ile Met Ile Ser Val Ile Val Met Thr Ile
        130                 135                 140

Leu Leu Val Val Leu Tyr Lys Tyr Arg Cys Tyr Lys Val Ile His Ala
145                 150                 155                 160

Trp Leu Ile Ile Ser Ser Leu Leu Leu Phe Phe Ser Phe Ile
                165                 170                 175

Tyr Leu Gly Glu Val Phe Lys Thr Tyr Asn Val Ala Val Asp Tyr Ile
            180                 185                 190

Thr Val Ala Leu Leu Ile Trp Asn Phe Gly Val Gly Met Ile Ser
        195                 200                 205

Ile His Trp Lys Gly Pro Leu Arg Leu Gln Gln Ala Tyr Leu Ile Met
        210                 215                 220

Ile Ser Ala Leu Met Ala Leu Val Phe Ile Lys Tyr Leu Pro Glu Trp
225                 230                 235                 240

Thr Ala Trp Leu Ile Leu Ala Val Ile Ser Val Tyr Asp Leu Val Ala
                245                 250                 255

Val Leu Cys Pro Lys Gly Pro Leu Arg Met Leu Val Glu Thr Ala Gln
            260                 265                 270

Glu Arg Asn Glu Thr Leu Phe Pro Ala Leu Ile Tyr Ser Ser Thr Met
        275                 280                 285

Val Trp Leu Val Asn Met Ala Glu Gly Asp Pro Glu Ala Gln Arg Arg
        290                 295                 300

Val Ser Lys Asn Ser Lys Tyr Asn Ala Glu Ser Thr Glu Arg Glu Ser
305                 310                 315                 320

Gln Asp Thr Val Ala Glu Asn Asp Asp Gly Gly Phe Ser Glu Glu Trp
                325                 330                 335

Glu Ala Gln Arg Asp Ser His Leu Gly Pro His Arg Ser Thr Pro Glu
            340                 345                 350

Ser Arg Ala Ala Val Gln Glu Leu Ser Ser Ile Leu Ala Gly Glu
        355                 360                 365

Asp Pro Glu Glu Arg Gly Val Lys Leu Gly Leu Gly Asp Phe Ile Phe
370                 375                 380

Tyr Ser Val Leu Val Gly Lys Ala Ser Ala Thr Ala Ser Gly Asp Trp
385                 390                 395                 400

Asn Thr Thr Ile Ala Cys Phe Val Ala Ile Leu Ile Gly Leu Cys Leu
                405                 410                 415

Thr Leu Leu Leu Leu Ala Ile Phe Lys Lys Ala Leu Pro Ala Leu Pro
            420                 425                 430

Ile Ser Ile Thr Phe Gly Leu Val Phe Tyr Phe Ala Thr Asp Tyr Leu
            435                 440                 445
```

```
Val Gln Pro Phe Met Asp Gln Leu Ala Phe His Gln Phe Tyr Ile
    450                 455                 460

<210> SEQ ID NO 7
<211> LENGTH: 448
<212> TYPE: PRT
<213> ORGANISM: Homo sapiens

<400> SEQUENCE: 7

Met Leu Thr Phe Met Ala Ser Asp Ser Glu Glu Val Cys Asp Glu
1               5                   10                  15

Arg Thr Ser Leu Met Ser Ala Glu Ser Pro Thr Pro Arg Ser Cys Gln
                20                  25                  30

Glu Gly Arg Gln Gly Pro Glu Asp Gly Glu Asn Thr Ala Gln Trp Arg
            35                  40                  45

Ser Gln Glu Asn Glu Glu Asp Gly Glu Asp Pro Asp Arg Tyr Val
    50                  55                  60

Cys Ser Gly Val Pro Gly Arg Pro Pro Gly Leu Glu Glu Glu Leu Thr
65                  70                  75                  80

Leu Lys Tyr Gly Ala Lys His Val Ile Met Leu Phe Val Pro Val Thr
                85                  90                  95

Leu Cys Met Ile Val Val Val Ala Thr Ile Lys Ser Val Arg Phe Tyr
                100                 105                 110

Thr Glu Lys Asn Gly Gln Leu Ile Tyr Thr Pro Phe Thr Glu Asp Thr
                115                 120                 125

Pro Ser Val Gly Gln Arg Leu Leu Asn Ser Val Leu Asn Thr Leu Ile
    130                 135                 140

Met Ile Ser Val Ile Val Val Met Thr Ile Phe Leu Val Val Leu Tyr
145                 150                 155                 160

Lys Tyr Arg Cys Tyr Lys Phe Ile His Gly Trp Leu Ile Met Ser Ser
                165                 170                 175

Leu Met Leu Leu Phe Leu Phe Thr Tyr Ile Tyr Leu Gly Glu Val Leu
                180                 185                 190

Lys Thr Tyr Asn Val Ala Met Asp Tyr Pro Thr Leu Leu Leu Thr Val
                195                 200                 205

Trp Asn Phe Gly Ala Val Gly Met Val Cys Ile His Trp Lys Gly Pro
    210                 215                 220

Leu Val Leu Gln Gln Ala Tyr Leu Ile Met Ile Ser Ala Leu Met Ala
225                 230                 235                 240

Leu Val Phe Ile Lys Tyr Leu Pro Glu Trp Ser Ala Trp Val Ile Leu
                245                 250                 255

Gly Ala Ile Ser Val Tyr Asp Leu Val Ala Val Leu Cys Pro Lys Gly
                260                 265                 270

Pro Leu Arg Met Leu Val Glu Thr Ala Gln Glu Arg Asn Glu Pro Ile
    275                 280                 285

Phe Pro Ala Leu Ile Tyr Ser Ser Ala Met Val Trp Thr Val Gly Met
290                 295                 300

Ala Lys Leu Asp Pro Ser Ser Gln Gly Ala Leu Gln Leu Pro Tyr Asp
305                 310                 315                 320

Pro Glu Met Glu Glu Asp Ser Tyr Asp Ser Phe Gly Pro Ser Tyr
                325                 330                 335

Pro Glu Val Phe Glu Pro Pro Leu Thr Gly Tyr Pro Gly Glu Glu Leu
                340                 345                 350

Glu Glu Glu Glu Glu Arg Gly Val Lys Leu Gly Leu Gly Asp Phe Ile
                355                 360                 365
```

```
Phe Tyr Ser Val Leu Val Gly Lys Ala Ala Thr Gly Ser Gly Asp
        370                 375                 380

Trp Asn Thr Thr Leu Ala Cys Phe Val Ala Ile Leu Ile Gly Leu Cys
385                 390                 395                 400

Leu Thr Leu Leu Leu Leu Ala Val Phe Lys Lys Ala Leu Pro Ala Leu
                405                 410                 415

Pro Ile Ser Ile Thr Phe Gly Leu Ile Phe Tyr Phe Ser Thr Asp Asn
                420                 425                 430

Leu Val Arg Pro Phe Met Asp Thr Leu Ala Ser His Gln Leu Tyr Ile
                435                 440                 445

<210> SEQ ID NO 8
<211> LENGTH: 447
<212> TYPE: PRT
<213> ORGANISM: Homo sapiens

<400> SEQUENCE: 8

Met Leu Thr Phe Met Ala Ser Asp Ser Glu Glu Val Cys Asp Glu
1               5                   10                  15

Arg Thr Ser Leu Met Ser Ala Glu Ser Pro Thr Pro Arg Ser Cys Gln
                20                  25                  30

Glu Gly Arg Gln Gly Pro Glu Asp Gly Glu Asn Thr Ala Gln Trp Arg
            35                  40                  45

Ser Gln Glu Asn Glu Glu Asp Gly Glu Asp Pro Asp Arg Tyr Val
    50                  55                  60

Cys Ser Gly Val Pro Gly Arg Pro Pro Gly Leu Glu Glu Glu Leu Thr
65                  70                  75                  80

Leu Lys Tyr Gly Ala Lys His Val Ile Met Leu Phe Val Pro Val Thr
                85                  90                  95

Leu Cys Met Ile Val Val Ala Thr Ile Lys Ser Val Arg Phe Tyr
                100                 105                 110

Thr Glu Lys Asn Gly Gln Leu Ile Tyr Thr Pro Phe Thr Glu Asp Thr
            115                 120                 125

Pro Ser Val Gly Gln Arg Leu Leu Asn Ser Val Leu Asn Thr Leu Ile
    130                 135                 140

Met Ile Ser Val Ile Val Val Met Thr Ile Phe Leu Val Val Leu Tyr
145                 150                 155                 160

Lys Tyr Arg Cys Tyr Lys Phe Ile His Gly Trp Leu Ile Met Ser Ser
                165                 170                 175

Leu Met Leu Leu Phe Leu Phe Thr Tyr Ile Tyr Leu Gly Glu Val Leu
                180                 185                 190

Lys Thr Tyr Asn Val Ala Met Asp Tyr Pro Thr Leu Leu Leu Thr Val
            195                 200                 205

Trp Asn Phe Gly Ala Val Gly Met Val Cys Ile His Trp Lys Gly Pro
    210                 215                 220

Leu Val Leu Gln Gln Ala Tyr Leu Ile Met Ile Ser Ala Leu Met Ala
225                 230                 235                 240

Leu Val Phe Ile Lys Tyr Leu Pro Glu Trp Ser Ala Trp Val Ile Leu
                245                 250                 255

Gly Ala Ile Ser Val Tyr Asp Leu Val Ala Val Leu Cys Pro Lys Gly
                260                 265                 270

Pro Leu Arg Met Leu Val Glu Thr Ala Gln Glu Arg Asn Glu Pro Ile
            275                 280                 285
```

```
Phe Pro Ala Leu Ile Tyr Ser Ser Ala Met Val Trp Thr Val Gly Met
    290                 295                 300

Ala Lys Leu Asp Pro Ser Ser Gln Gly Ala Leu Gln Leu Pro Tyr Asp
305                 310                 315                 320

Pro Glu Met Glu Asp Ser Tyr Asp Ser Phe Gly Glu Pro Ser Tyr Pro
                325                 330                 335

Glu Val Phe Glu Pro Pro Leu Thr Gly Tyr Pro Gly Glu Glu Leu Glu
                340                 345                 350

Glu Glu Glu Glu Arg Gly Val Lys Leu Gly Leu Gly Asp Phe Ile Phe
                355                 360                 365

Tyr Ser Val Leu Val Gly Lys Ala Ala Ala Thr Gly Ser Gly Asp Trp
    370                 375                 380

Asn Thr Thr Leu Ala Cys Phe Val Ala Ile Leu Ile Gly Leu Cys Leu
385                 390                 395                 400

Thr Leu Leu Leu Leu Ala Val Phe Lys Lys Ala Leu Pro Ala Leu Pro
                405                 410                 415

Ile Ser Ile Thr Phe Gly Leu Ile Phe Tyr Phe Ser Thr Asp Asn Leu
                420                 425                 430

Val Arg Pro Phe Met Asp Thr Leu Ala Ser His Gln Leu Tyr Ile
            435                 440                 445

<210> SEQ ID NO 9
<211> LENGTH: 1414
<212> TYPE: DNA
<213> ORGANISM: Artificial Sequence
<220> FEATURE:
<223> OTHER INFORMATION: Codon optimized Homo sapiens presenilin 1
      (PSEN1) cDNA

<400> SEQUENCE: 9
cgacgccacc atgacagaac tgcctgcccc cctgagctac ttccagaacg cccagatgag    60
cgaggacaac cacctgagca caccgtgcg gagccagaac gacaacagag agcggcagga   120
acacaacgac aggcggagcc tgggacaccc tgagcccctg tctaatggca gccccaggg    180 caacagcaga caggtggtgg aacaggacga ggaagaggac gaagaactga ccctgaagta   240
cggcgccaag cacgtgatca tgctgttcgt gcccgtgacc ctgtgcatgg tcgtggtggt   300
ggccacaatc aagagcgtgt ccttctacac ccggaaggac ggccagctga tctacacccc   360
cttcaccgag acaccgaga cagtgggaca gagagccctg cacagcatcc tgaacgccgc   420
catcatgatc agcgtgatcg tcgtgatgac catcctgctg gtggtgctgt acaagtaccg   480
gtgctacaaa gtgatccacg cctggctgat catcagcagc ctgctgctgc tgttcttctt   540
tagcttcatc tacctgggcg aggtgttcaa gacctacaac gtggccgtgg actacatcac   600
cgtggccctg ctgatctgga acttcggcgt cgtgggcatg atctccatcc actggaaggg   660 cccccctgaga ctgcagcagg cctacctgat tatgatctcc gccctgatgg ccctggtgtt   720
catcaagtac ctgcccgagt ggaccgcttg gctgatcctg gccgtgatct ccgtgtacga   780
cctggtggcc gtgctgtgcc ctaagggacc tctgcggatg ctggtggaaa ccgcccagga   840
acggaacgag acactgttcc ctgccctgat ctactccagc acaatggtgt ggctcgtgaa   900
catggccgag ggcgatcctg aggcccagcg cgagagtgtcc aagaactcca gtacaacgc   960 cgagagcacc gagcgcgaga gccaggatac agtggccgag aatgacgacg gcggcttcag  1020
```

```
cgaggaatgg gaggcccaga gagatagcca cctgggccct cacagaagca cccctgaatc    1080
tagagccgcc gtgcaggaac tgagcagctc cattctggcc ggcgaggacc ccgaagaaag    1140
aggcgtgaaa ctgggcctgg gcgacttcat cttctacagc gtgctcgtgg gcaaggccag    1200
cgccacagct agcggcgact ggaacaccac aatcgcctgc ttcgtggcca tcctgatcgg    1260
cctgtgtctg acacttctgc tgctggccat cttcaagaag gccctgcccg ccctgcctat    1320
cagcatcacc ttcggcctgg tgttttactt cgccaccgac tacctggtgc agcccttcat    1380
ggaccagctg gccttccacc agttctacat ctga                                1414

<210> SEQ ID NO 10
<211> LENGTH: 10
<212> TYPE: DNA
<213> ORGANISM: Artificial Sequence
<220> FEATURE:
<223> OTHER INFORMATION: Human Kozak consensus sequence
<220> FEATURE:
<221> NAME/KEY: misc_feature
<222> LOCATION: (4)..(4)
<223> OTHER INFORMATION: n=g or a

<400> SEQUENCE: 10 gccnccatgg                                                           10

<210> SEQ ID NO 11
<211> LENGTH: 23
<212> TYPE: DNA
<213> ORGANISM: Artificial Sequence
<220> FEATURE:
<223> OTHER INFORMATION: hPSEN1opti Kozak seq

<400> SEQUENCE: 11
cgacgccacc atgacagaac tgc                                            23
```

GENE THERAPY FOR ALZHEIMER'S DISEASE

SEQUENCE LISTING

This application contains a Sequence Listing that has been submitted electronically as an ASCII text file named '40175_0033US1_Sequence_Listing.txt'. The ASCII text file, created on Nov. 22, 2021, is 39.9 kilobytes in size. The material in the ASCII text filed is hereby incorporated by reference in its entirety.

CLAIM OF PRIORITY

This application is a § 371 National Stage Application of PCT/US2020/034040, filed May 21, 2020, which claims the benefit of U.S. Provisional Patent Application Ser. No. 62/852,716, filed on May 24, 2019. The entire contents of the foregoing are hereby incorporated by reference.

STATEMENT OF FEDERALLY SPONSORED RESEARCH

This invention was made with government support under Grant Nos. NS075346, and NS041783 awarded by the National Institutes of Health. The government has certain rights in the invention.

TECHNICAL FIELD

Described herein are, inter alia, compositions and methods for using presenilin genetic therapy constructs to treat Alzheimer's disease (AD) and other neurodegenerative diseases.

BACKGROUND

Alzheimer's disease, also known as Alzheimer disease, accounts for majority of neurodegenerative dementia and is the fourth leading cause of death in the United States after heart disease, cancer and stroke. It is characterized by a progressive loss of cognitive function, neurodegeneration, neurofibrillary tangles and amyloid plaques in the brains of patients. Although the progression speed varies in different patients, the average life expectancy following diagnosis is three to nine years. Currently, there is no treatment for Alzheimer's disease.

SUMMARY

Described herein are methods and compositions that can be used to treat subjects with Alzheimer's disease (AD) and other neurodegenerative diseases, disorders or conditions. The present disclosure is based, at least in part, on the discovery that providing a codon-optimized wild-type PSEN1 cDNA into cells carrying heterozygous or homozygous dominant negative Psen1 mutations, a well-established familial Alzheimer's disease model, provided unexpectedly high expression levels and rescued the impaired γ-secretase activity in these cells. Thus, the present disclosure provides methods for effective gene therapy based on PSEN1 (to express PS1) and/or PSEN2 (to express PS2) for Alzheimer's disease and other neurodegenerative dementia, representing a significant breakthrough in this disease area.

Provided herein are compositions comprising a human codon-optimized polynucleotide encoding a human presenilin 1 protein (PS1), e.g., a polynucleotide comprising SEQ ID NO:9 or a sequence that is at least 80%, 90%, 95%, or 99% identical to SEQ ID NO:9 (with at least one codon optimized with respect to wild type). Exemplary human PS1 protein sequences include SEQ ID NOs:5 and 6, and can include sequences that are at least comprising a human codon-optimized polynucleotide encoding a human presenilin 1 (PSEN1) thereto. In some embodiments, the composition is associated with (e.g., formulated for delivery using) an exosome or lipid-based nanoparticle (LNP).

Also provided herein are compositions comprising a vector for expression of human PSEN1 in a cell, comprising a human codon-optimized polynucleotide described herein, operably linked to a promoter.

Also provided herein is the use of any of the compositions described herein in a method o treating a neurodegenerative disease, disorder, or condition in a subject.

In some embodiments, the vector is a viral vector, e.g., an adeno-associated viral (AAV) vector (such as AAV9 or AAVrh10); a lentiviral vector; or a retroviral vector.

In some embodiments, the promoter is a pan neuronal promoter, e.g., a synapsin I promoter, or a neuron subtype-specific promoter, e.g., an alpha-calcium/calmodulin kinase 2A promoter.

Also provided herein are methods for treating a neurodegenerative disease, disorder, or condition, the method comprising administering to a human subject in need of treatment a composition described herein, wherein the subject has one or more mutations in at least one allele of PSEN1, preferably a mutation that encodes a dominant negative PSEN1 protein isoform.

In some embodiments, the neurodegenerative disease, disorder or condition is Alzheimer's disease.

In some embodiments, the Alzheimer's disease is familial Alzheimer's disease. In some embodiments, the Alzheimer's disease is late-onset Alzheimer's disease. In some embodiments, the Alzheimer's disease is sporadic Alzheimer's disease. In some embodiments, the Alzheimer's disease is early-onset Alzheimer's disease.

In some embodiments, the subject has a mutation at E280, Y115, L166, C410, Δex9, G548, D257, R278, L435, G384, L392, N141, G206, H163, A79, S290, A260, A426, A431, R269, L271, C1410, E280, P264, E185, L235, M146, e.g., a E280A, Y115H, L166P, C410Y, Δex9, G548, D257A, R278I, L435F, G384A, or L392V mutation in the PSEN1 gene, or a N141I, G206A, H163R, A79V, S290C, A260P, A426P, A431E, R269H, L271V, C1410Y, E280G, P264L, E185D, L235V, or M146V mutation in the PSEN1 gene.

In some embodiments, the neurodegenerative disease, disorder or condition is frontotemporal dementia, memory loss, cognitive decline or impairment. In some embodiments, the cognitive impairment is mild cognitive impairment (MCI).

In some embodiments, the composition is administered to the CNS of the subject in need of treatment.

In some embodiments, the polynucleotide encoding PSEN1 and/or PSEN2 gene or mRNA is administered to the CNS via intravenous delivery, via intrathecal delivery, via intracisternal delivery, via intracerebroventricular delivery, or via stereotactic injection into certain areas of the brain, optionally into the cerebral ventricles, or via direct injection into hippocampus or cortical areas Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used.

The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 2. Sequence comparison of the endogenous human PSEN1 (hPSEN1) cDNA and the codon optimized hPSEN1 cDNA (Opti-hPSEN1)

DEFINITIONS

Figure 1A:
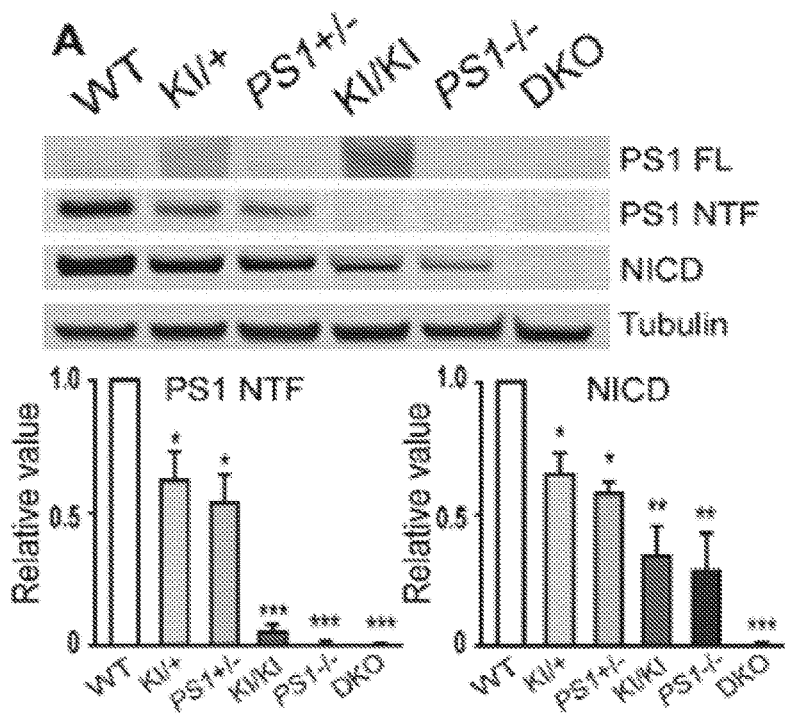
FIGS. 1A-B. Introduction of WT hPS1 rescues impaired γ-secretase activity in mutant MEFs. A, γ-Secretase activity measured by NICD production is reduced in mutant MEF cells in a PS dosage dependent manner (WT>PS1 heterozygous KI or KO>homozygous PS1 KI or KO>DKO). B, Restoring impaired γ-secretase activity by WT hPS1. Increasing amounts of pCI-hPSEN1 plasmid DNA, as indicated, are transfected into MEFs of varying genotypes. Western analysis showed that both PS1 NTF and NICD are restored in various PS mutant MEFs. Heterozygous L435F KI cells are labeled as KI/+ or PS1L435F/+. N=3 independent experiments. Data represent mean±SEM. *$p<0.05$; $p<0.01$; *$p<0.001$ (one-way ANOVA with Tukey's post-hoc analysis).

In order for the present disclosure to be more readily understood, certain terms are first defined below. Additional definitions for the following terms and other terms are set forth throughout the specification.

Administration:

As used herein, the term "administration" refers to the delivery or application of a composition to a subject or system. Administration to an animal subject (e.g., to a human) may be by any appropriate route. For example, in some embodiments, administration may be bronchial (including by bronchial instillation), buccal, enteral, intra-arterial, intradermal, intragastric, intramedullary, intramuscular, intranasal, intraperitoneal, intrathecal, intravenous, intraventricular, mucosal, nasal, oral, rectal, subcutaneous, sublingual, topical, tracheal (including by intratracheal instillation), transdermal, vaginal and vitreal.

Biologically Active:

As used herein, the phrase "biologically active" refers to a characteristic of any substance that has activity in a biological system (e.g., cell culture, organism, etc.). For instance, a substance that, when administered to an organism, has a biological effect on that organism, is considered to be biologically active. Biological activity can also be determined by in vitro assays (for example, in vitro enzymatic assays). In particular embodiments, where a protein or polypeptide is biologically active, a portion of that protein or polypeptide that shares at least one biological activity of the protein or polypeptide is typically referred to as a "biologically active" portion. In some embodiments, a protein is produced and/or purified from a cell culture system, which displays biologically activity when administered to a subject.

Control:

As used herein, the term "control" has its art-understood meaning of being a standard against which results are compared. Typically, controls are used to augment integrity in experiments by isolating variables in order to make a conclusion about such variables. In some embodiments, a control is a reaction or assay that is performed simultaneously with a test reaction or assay to provide a comparator. In one experiment, the "test" (i.e., the variable being tested) is applied. In the second experiment, the "control," the variable being tested is not applied. In some embodiments, a control is a historical control (i.e., of a test or assay performed previously, or an amount or result that is previously known). In some embodiments, a control is or comprises a printed or otherwise saved record. A control may be a positive control or a negative control. In some embodiments, the control may be a "reference control", which is a sample used for comparison with a test sample, to look for differences or for the purposes of characterization.

Gene Therapy:

As used herein, the term "gene therapy" refers to any treatment including the direct or indirect administration of a nucleic acid to a subject. In particular instances, a protein of therapeutic value is expressed from an administered nucleic acid.

Identity:

As used herein, the term "identity" refers to the overall relatedness between polymeric molecules, e.g., between nucleic acid molecules (e.g., DNA molecules and/or RNA molecules) and/or between polypeptide molecules. Calculation of the percent identity of two nucleic acid sequences, for example, can be performed by aligning the two sequences for optimal comparison purposes (e.g., gaps can be introduced in one or both of a first and a second nucleic acid sequences for optimal alignment and non-identical sequences can be disregarded for comparison purposes). In certain embodiments, the length of a sequence aligned for comparison purposes is at least 30%, at least 40%, at least 50%, at least 60%, at least 70%, at least 80%, at least 90%, at least 95%, or substantially 100% of the length of the reference sequence. The nucleotides at corresponding nucleotide positions are then compared. When a position in the first sequence is occupied by the same nucleotide as the corresponding position in the second sequence, then the molecules are identical at that position. The percent identity between the two sequences is a function of the number of identical positions shared by the sequences, taking into account the number of gaps, and the length of each gap, which needs to be introduced for optimal alignment of the two sequences. The comparison of sequences and determination of percent identity between two sequences can be accomplished using a mathematical algorithm. For example, the percent identity between two nucleotide sequences can be determined using the algorithm of Meyers and Miller (CABIOS, 1989, 4: 11-17), which has been incorporated into the ALIGN program (version 2.0) using a PAM120 weight residue table, a gap length penalty of 12 and a gap penalty of 4. The percent identity between two nucleotide sequences can, alternatively, be determined using the GAP program in the GCG software package using an NWSgap-dna.CMP matrix. Various other sequence alignment programs are available and can be used to determine sequence identity such as, for example, Clustal.

Improve, Increase, or Reduce:

As used herein, the terms "improve," "increase" or "reduce," or grammatical equivalents, indicate values that are relative to a baseline measurement, such as a measurement in the same individual prior to initiation of the treatment described herein, or a measurement in a control individual (or multiple control individuals) in the absence of the treatment described herein. A "control individual" is an individual afflicted with the same type and approximately the same severity of, e.g., Alzheimer's disease, as the individual being treated, who is about the same age as the individual being treated (to ensure that the stages of the disease in the treated individual and the control individual(s) are comparable).

Neurodegeneration:

As used herein, the term "neurodegeneration" means a process in which one or more neurons are damaged, decrease in function, become dysfunctional, and/or are lost by cell death. Neurodegeneration encompasses both rapid, gradual, and intermediate forms. Accordingly, a neurodegenerative disease, condition, or symptom is one characterized in that the disease is typically associated with neuronal damage, and/or cell death.

Subject:

As used herein, the term "subject" refers to a human or any non-human animal (e.g., a mammal such as a mouse, rat, rabbit, dog, cat, cattle, swine, sheep, horse or primate). A human includes pre- and post-natal forms. In some embodiments, a subject is a human being. A subject can be a patient, which refers to a human presenting to a medical provider for diagnosis or treatment of a disease. The term "subject" is used herein interchangeably with "individual" or "patient." A subject can be afflicted with or is susceptible to a disease or disorder but may or may not display symptoms of the disease or disorder.

Suffering from:

An individual who is "suffering from" a disease, disorder, and/or condition (e.g., Alzheimer's disease) has been diagnosed with or displays one or more symptoms of the disease, disorder, and/or condition.

Susceptible to:

An individual who is "susceptible to" a disease, disorder, and/or condition has not been diagnosed with and/or may not exhibit symptoms of the disease, disorder, and/or condition. In some embodiments, an individual who is susceptible to a disease, disorder, and/or condition (for example, Alzheimer's disease) may be characterized by one or more of the following: (1) a genetic mutation associated with development of the disease, disorder, and/or condition; (2) a genetic polymorphism associated with development of the disease, disorder, and/or condition; (3) increased and/or decreased expression and/or activity of a protein associated with the disease, disorder, and/or condition; (4) habits and/or lifestyles associated with development of the disease, disorder, and/or condition; (5) a family history of the disease, disorder, and/or condition; (6) reaction to certain bacteria or viruses; (7) exposure to certain chemicals. In some embodiments, an individual who is susceptible to a disease, disorder, and/or condition will develop the disease, disorder, and/or condition. In some embodiments, an individual who is susceptible to a disease, disorder, and/or condition will not develop the disease, disorder, and/or condition.

Therapeutically Effective Amount:

As used herein, the term "therapeutically effective amount" refers to an amount of a therapeutic protein which confers a therapeutic effect on the treated subject, at a reasonable benefit/risk ratio applicable to any medical treatment. The therapeutic effect may be objective (i.e., measurable by some test or marker) or subjective (i.e., subject gives an indication of or feels an effect). In particular, the "therapeutically effective amount" refers to an amount of a therapeutic protein or composition effective to treat, ameliorate, or prevent a desired disease or condition, or to exhibit a detectable therapeutic or preventative effect, such as by ameliorating symptoms associated with the disease, preventing or delaying the onset of the disease, and/or also lessening the severity or frequency of symptoms of the disease. A therapeutically effective amount is commonly administered in a dosing regimen that may comprise multiple unit doses. For any particular therapeutic protein, a therapeutically effective amount (and/or an appropriate unit dose within an effective dosing regimen) may vary, for example, depending on route of administration, on combination with other pharmaceutical agents. Also, the specific therapeutically effective amount (and/or unit dose) for any particular patient may depend upon a variety of factors including the disorder being treated and the severity of the disorder; the activity of the specific pharmaceutical agent employed; the specific composition employed; the age, body weight, general health, sex and diet of the patient; the time of administration, route of administration, and/or rate of excretion or metabolism of the specific fusion protein employed; the duration of the treatment; and like factors as is well known in the medical arts.

Treatment:

As used herein, the term "treatment" (also "treat" or "treating"), in its broadest sense, refers to any administration of a substance (e.g., provided compositions) that partially or completely alleviates, ameliorates, relives, inhibits, delays onset of, reduces severity of, and/or reduces incidence of one or more symptoms, features, and/or causes of a particular disease, disorder, and/or condition. In some embodiments, such treatment may be administered to a subject who does not exhibit signs of the relevant disease, disorder and/or condition and/or of a subject who exhibits only early signs of the disease, disorder, and/or condition. Alternatively or additionally, in some embodiments, treatment may be administered to a subject who exhibits one or more established signs of the relevant disease, disorder and/or condition. In some embodiments, treatment may be of a subject who has been diagnosed as suffering from the relevant disease, disorder, and/or condition. In some embodiments, treatment may be of a subject known to have one or more susceptibility factors that are statistically correlated with increased risk of development of the relevant disease, disorder, and/or condition.

Although generally speaking "PS1" refers to the presenilin-1 protein, and "PS2" refers to the presenilin-2 protein, in some cases PS1 or PS2 is used to refer to mRNA or gene.

DETAILED DESCRIPTION

The present disclosure provides, among other things, compositions and methods for treating subjects with Alzheimer's disease and other neurodegenerative diseases, disorders and conditions based on delivering functional presenilin-1 (PS1) protein to a subject in need thereof. In particular, the present disclosure contemplates gene therapy by providing a human codon-optimized polynucleotide encoding a presenilin-1 (PS1) to a subject in need of treatment who has a PSEN1 or PSEN2 mutation, e.g., a dominant negative mutation, associated with AD, e.g., with early onset Familial Alzheimer's disease (FAD) or with late onset sporadic AD.

Various aspects of the invention are described in detail in the following sections. The use of sections is not meant to limit the invention. Each section can apply to any aspect of the invention. In this application, the use of "or" means "and/or" unless stated otherwise.

Methods of Treatment

As non-limiting examples, the present methods include gene therapy to express wild-type human Presenilin-1 in a subject suffering from or susceptible to a neurodegenerative disease, e.g., associated with a dominant negative mutation in PSEN1 or PSEN2, e.g., Alzheimer's disease (e.g., familial AD patients carrying PSEN1 or PSEN2 mutations or sporadic AD patients). The objective of such a gene therapy is, among other things, to enhance expression of PS1 in the brains of familial or sporadic AD patients in order to correct or overcome a deficit in PS1 or PS2 expression and/or activity. In FAD patients, it is expected that a gene therapy method described herein results in increased expression of wild-type PS1 in the brain, rescuing the impairment of γ-secretase activity associated with PS1 or PS2 mutations.

Mutations in the Presenilin genes—PSEN1 and PSEN2—are highly penetrant and account for ~90% of all mutations identified in familial AD (FAD), highlighting their importance in the pathogenesis of AD. More than 260 distinct mutations in PSEN1 have been reported, and they are dominantly inherited and mostly missense mutations. It is known that dominant negative mutations in the PSEN1 and PSEN2 genes are associated with early onset familial Alzheimer's disease. It was generally believed that the PS1 and presenilin-2 (PS2) proteins are part of □-secretase complex, and that mutations in the PSEN1 and PSEN2 genes contribute to the accumulation of Amyloid beta (Aβ) protein in Alzheimer's disease patients. Pathogenic PSEN1 mutations act in cis to impair mutant PS1 function and act in trans to inhibit wild-type Presently-1 (PS1) function (Heilig et al. J Neurosci 33:11606-717 (2013); Zhou et al. Proc Natl Acad Sci USA 114:12731-12736 (2017). Typically, by their very nature, dominant negative mutations cannot be rescued by expression of wild type protein (Herskowitz, I. Nature, 329:219-222 (1987)). However, surprisingly, as shown herein, transfection of codon-optimized hPSEN1 cDNA into immortalized MEFs carrying heterozygous and homozygous PS1 mutations was able to rescue the impaired γ-secretase activity in these cells even better than the wild-type human sequence (see Examples, below), indicating that expression of wild-type PS1 from a codon-optimized exogenous sequence can overcome the dominant negative effects of the mutant Presenilin protein. Without wishing to be bound by any particular theory, expression of PS1 may accomplish this objective by increasing the total level of wild-type PS1, rescuing the impairment of γ-secretase expression and/or activity in AD patients.

The methods and compositions described herein can equally be used to treat other neurodegenerative diseases, disorders or conditions.

Alzheimer's Disease

The methods described herein may be used to treat or reduce the risk of developing subjects with all types of Alzheimer's disease including, but not limited to, familial and sporadic Alzheimer's disease, early onset or late onset Alzheimer's disease. In some embodiments, the present methods may be used to treat or reduce the risk of development of early onset familial form of Alzheimer's disease (AD) that is associated with mutations in presenilin-1 (PS1) and/or presenilin-2 (PS2) (Sherrington, et al., Nature 375: 754-760 (1995); Rogaev, et al., Nature 376:775-778 (1995); Levy-Lahad, et al., Science 269:970-973 (1995); Hiltunen, et al., Eur. J. Hum. Genet. 8:259-266 (2000); Jonghe, et al., Hum. Mol. Genet. 8:1529-1540 (1999); Tysoe, et al., Am. J. Hum. Genet. 62:70-76 (1998); Crook, et al., Nat. Med. 4:452-455 (1998), all of which are incorporated by reference herein).

In some embodiments, the present methods may be used to treat a subject that has a mutation in the PSEN1 or PSEN2 allele, e.g., a mutation that has a dominant negative effect on wild-type PS proteins. Exemplary mutations include C410Y, Δex9, G548, D257A, L166P, R278I, L435F, G384A, Y115H, and L392V, as well as N141I, G206A, H163R, A79V, S290C, A260P, A426P, A431E, R269H, L271V, C1410Y, E280G, P264L, E185D, L235V, and M146V mutations (see, e.g., Heilig et al., J. Neurosci., 33(28):11606-11617 (2013); Watanabe et al., J. Neurosci. 32(15):5085-5096 (2012); Brouwers et al., 2008 Ann Med 40 (8): 562-83); Watanabe and Shen, PNAS Nov. 28, 2017 114 (48) 12635-12637; Zhou et al., PNAS Nov. 28, 2017 114 (48) 12731-12736; Hsu et al., Alzheimers Res Ther. 2018 Jul. 18; 10(1):67). Additional exemplary mutations that may have a dominant negative effect on wild-type PS proteins can include, but are not limited to, in PSEN-1: N32N; R35Q; D40del (delGAC); D40del (delACG); E69D; A79V; V82L; I83_M84del (DelIM, ΔI83/M84, ΔI83/ΔM84); I83T; M84V; L85P; P88L; V89L (G>T); V89L (G>C); C92S; V94M; V96F; V97L; T99A; F105C; F105I; F105L; F105V; R108Q; L113_I114insT (Intron4, InsTAC, p.113+1delG, splice5); L113P; L113Q; Y115C; Y115D; Y115H; T116I; T116N; T116R; P117A; P117L; P117R; P117S; E120D (A>C); E120D (A>T); E120G; E120K; E123K; Q127_R128del (CAGA); InsG(G) (c.379_382del XXXXinsG); H131R; S132A; L134R; N135D; N135S; N135Y; A136G; M139I (G>C); M139I (G>A); M139K; M139L; M139T; M139V; V142F; I143F; I143M; I143N; I143T; I143V; M146I (G>C); M146I (G>T); M146I (G>A); M146L (A>C); M146L (A>T); M146V; T147I; T147P; L150P; L153V; Y154C; Y154N; Y156F; Y156_R157insIY; R1575; H163P; H163R; H163Y; A164V; W165C (G>C); W165C (G>T); W165G; L166H; L166P; L166R; L166V; L166del; I167del (TTAdel); I167del (TATdel); I168T; S169del (ΔS169, Ser169del, ΔS170); S169L; S169P; S170F; S170P; L171P; L173F (G>C); L173F (G>T); L173W; L174del; L174M; L174R; F175S; F176L; F177L; F177S; S178P; G183V; E184D; E184G; V191A; I202F; G206A; G206D; G206S; G206V; G209A; G209E; G209R; G209V; S212Y; I213F; I213L; I213T; H214D; H214N; H214Y; G217D; G217R; L219F; L219P; L219R; R220P; Q222H; Q222P; Q222R; Q223R; L226F; L226R; I229F; S230I; S230N; S230R; A231P; A231T; A231V; L232P; M233I (G>A); M233I (G>C);

M233L (A>T); M233L (A>C); M233T; M233V; L235P; L235R; L235V; F237I; F237L; I238M; K239N; T245P; A246E; A246P; L248P; L248R; L250F; L250S; L250V; Y256S; A260V; V261F; V261L; L262F; L262V; C263F; C263R; P264L; G266S; P267A; P267L; P267S; R269G; R269H; L271V; V272A; E273A; E273G; T274R; A275V; R278I; R278K; R278S; R278T; E280A; (Paisa); E280G; E280K; L282F; L282R; L282V; F283L; P284L; P284S; A285V; L286P; L286V; T291A; T291P; K311R; E318G; D333G; R352C; R352 S353insR; T354I; R358Q; S365A; S365Y; R377M; R377W; G378E; G378V; G378fs; L381F; L381V; G384A; F386I; F386S; F388L; S390I; S390N; V391F; V391G; L392P; L392V; G394V; A396T; N405S; I408T; A409T; C410Y; V412I; I416T; G417S; L418F; L420R; L424F; L424H; L424R; L424V; A426P; A431E; (Jalisco); A431V; A434C; A434T; L435F; P436Q; P436S; I437V; I439S; I439V; T440del; 869-2A>G; 869-22_869-23ins18 (ΔE9, Δ9, deltaE9); I238_K239insI; S290C; T291_S319del (ΔE9Finn, Δ9Finn, Δ9); S290C; T291_S319del (ΔE9, Δ9); S290C; T291_S319del A>G (ΔE9, Δ9); S290C; T291_S319del G>A (ΔE9, Δ9); S290C; T291_S319del G>T (ΔE9, Δ9); or S290W; S291_R377del (Δ9-10, Delta9-10, p.Ser290_Arg377delinsTrp, g.73671948_73682054del) (mutations are named relative to Uniprot P49768.1/GenBank Ref. No. NM_000021.4), and in PSEN-2; T18M; R29H; G34S; R62C; R62H; P69A; R71W; K82R; A85V; V101M; K115Efs*; T122P; T122R; P123L; E126fs; E126K; S130L; V139M; N141I (Volga German); N141Y; L143H; V148I; K161R; R163H; H169N; M174V; S175C; G212V; V214L; Q228L; Y231C; I235F; A237V; L238F; L238P; M239I; M239V; A252T; A258T; T301M; K306fs; P334A; P334R; P348L; A377V; V393M; T430M; or D439A mutations are named relative to Uniprot P49810.1/GenBank Ref. No. NP_000438.2). See, e.g., Sun et al., Proc Natl Acad Sci USA. 2017; 114:E476-E485; Heilig et al., J Neurosci. 2013 Jul. 10; 33(28):11606-17; Zhou et al., PNAS Nov. 28, 2017 114 (48) 12731-12736. In some embodiments, the methods can include determining that a subject has such a mutation, e.g., using methods known in the art. In some embodiments, the subject has a mutation as described herein (e.g., is identified as having a mutation as described herein using methods known in the art), and optionally has a family history of AD and/or one or more symptoms of AD, and the subject is treated using a method described herein. In some embodiments, the subject does not yet have full AD.

Typically, increasing forgetfulness or mild confusion are early symptoms of Alzheimer's disease. Gradually, cognitive impairment associated with Alzheimer's disease leads to memory loss, especially recent memories, disorientation and misinterpreting spatial relationships, difficulty in speaking, writing, thinking, reasoning, changes in personality and behavior resulting in depression, anxiety, social withdrawal, mood swings, distrust in others, irritability and aggressiveness, changes in sleeping habits, wandering, loss of inhibitions, delusions, and eventually death.

Other Neurodegenerative Diseases, Disorders or Conditions

In addition to Alzheimer's disease, the present methods may be used to treat other neurodegenerative diseases, disorders or conditions, including frontotemporal dementia, various types of memory loss, cognitive impairment including but not limited to mild cognitive impairment (MCI), or other conditions associated with loss of PS1 or PS2, e.g., due to a mutation in PSEN1 or PSEN2, e.g., that creates a dominant negative isoform.

Codon-Optimized Presenilin-1 (PSEN1)

A codon-optimized presenilin-1 (PSEN1-encoding polynucleotide suitable for use in the compositions and methods described herein can include a full length cDNA or a portion or fragment thereof that encodes a protein retaining substantial gamma secretase activity of the wild-type protein, e.g., at least 50% of the gamma secretase activity, or at least 60, 70, 80, 90, or 95%, or more than 100%, of the activity of the wild-type protein determined by (e.g., in in vitro γ-secretase assays including those described in the Examples section, see also Watanabe et al., J. Neurosci. 32(15):5085-5096 (2012)). In some embodiments, a suitable codon-optimized PSEN1 encodes a protein sequence that is at least 80%, 85%, 90%, 95%, 96%, 97%, 98%, 99%, or 100% identical to the full-length wild type PS1 or PS2 protein sequence, respectively. Exemplary wild type genomic, cDNA or protein sequences of human PSEN1/PS1 or PSEN2/PS2 are shown in Table 1 and FIGS. 4A-C and 5A-B. PS1 is normally cleaved into N- and C-terminal fragments that are the active form. PS-1 is processed to give two fragments: an N-terminal 28 kDa fragment, and a C-terminal 18 kDa fragment; the principal endoproteolytic cleavage occurs at and near Met298 in the proximal portion of the large hydrophilic loop (Podlisny et al., Neurobiol Dis. 1997; 3(4):325-37; Marambaud et al., EMBO J. 2002 Apr. 15; 21(8):1948-56). Sequences comprising or encoding these cleaved forms can also be used in the methods and compositions described herein, e.g., encoding amino acids 1-291, 1-292, 1-293, 1-294, 1-295, 1-296, 1-297, 1-298, or 1-299 of SEQ ID NO:5 or a corresponding fragment of SEQ ID NO:6-8.

TABLE 1

| Isoform | mRNA | Protein | RefSeqGene |
|---|---|---|---|
| presenilin-1 isoform I-467 | NM_000021.3 (SEQ ID NO: 1) | NP_000012.1 (SEQ ID NO: 5) | NG_007386.2 Range 4965 to 92221 |
| presenilin-1 isoform I-463 | NM_007318.2 (SEQ ID NO: 2) | NP_015557.2 (SEQ ID NO: 6) | |
| presenilin-2 isoform 1 | NM_000447.2 (SEQ ID NO: 3) | NP_000438.2 (SEQ ID NO: 7) | NG_007381.1 Range 5001 to 30532 |
| presenilin-2 isoform 2 | NM_012486.2 (SEQ ID NO: 4) | NP_036618.2 (SEQ ID NO: 8) | |

```
>NM_000021.3 Homo sapiens presenilin 1 (PSEN1), transcript variant
1, mRNA
                                                          (SEQ ID NO: 1)
AAATGACGACAACGGTGAGGGTTCTCGGGCGGGCCTGGGACAGGCAGCTCCGGGGTCCGCGGTTTCACA

TCGGAAACAAAACAGCGGCTGGTCTGGAAGGAACCTGAGCTACGAGCCGCGGCGGCAGCGGGGCGGCGGG

GAAGCGTATACCTAATCTGGGAGCCTGCAAGTGACAACAGCCTTTGCGGTCCTTAGACAGCTTGGCCTGG

AGGAGAACACATGAAAGAAAGAACCTCAAGAGGCTTTGTTTTCTGTGAAACAGTATTTCTATACAGTTGC
```

-continued

```
TCCAATGACAGAGTTACCTGCACCGTTGTCCTACTTCCAGAATGCACAGATGTCTGAGGACAACCACCTG

AGCAATACTGTACGTAGCCAGAATGACAATAGAGAACGGCAGGAGCACAACGACAGACGGAGCCTTGGCC

ACCCTGAGCCATTATCTAATGGACGACCCCAGGGTAACTCCCGGCAGGTGGTGGAGCAAGATGAGGAAGA

AGATGAGGAGCTGACATTGAAATATGGCGCCAAGCATGTGATCATGCTCTTTGTCCCTGTGACTCTCTGC

ATGGTGGTGGTCGTGGCTACCATTAAGTCAGTCAGCTTTTATACCCGGAAGGATGGGCAGCTAATCTATA

CCCCATTCACAGAAGATACCGAGACTGTGGGCCAGAGAGCCCTGCACTCAATTCTGAATGCTGCCATCAT

GATCAGTGTCATTGTTGTCATGACTATCCTCCTGGTGGTTCTGTATAAATACAGGTGCTATAAGGTCATC

CATGCCTGGCTTATTATATCATCTATTGTTGCTGTTCTTTTTTTCATTCATTTACTTGGGGGAAGTGT

TTAAAACCTATAACGTTGCTGTGGACTACATTACTGTTGCACTCCTGATCTGGAATTTTGGTGTGGTGGG

AATGATTTCCATTCACTGGAAAGGTCCACTTCGACTCCAGCAGGCATATCTCATTATGATTAGTGCCCTC

ATGGCCCTGGTGTTTATCAAGTACCTCCCTGAATGGACTGCGTGGCTCATCTTGGCTGTGATTTCAGTAT

ATGATTTAGTGGCTGTTTTGTGTCCGAAAGGTCCACTTCGTATGCTGGTTGAAACAGCTCAGGAGAGAAA

TGAAACGCTTTTTCCAGCTCTCATTTACTCCTCAACAATGGTGTGGTTGGTGAATATGGCAGAAGGAGAC

CCGGAAGCTCAAAGGAGAGTATCCAAAAATTCCAAGTATAATGCAGAAAGCACAGAAAGGGAGTCACAAG

ACACTGTTGCAGAGAATGATGATGGCGGGTTCAGTGAGGAATGGGAAGCCCAGAGGGACAGTCATCTAGG

GCCTCATCGCTCTACACCTGAGTCACGAGCTGCTGTCCAGGAACTTTCCAGCAGTATCCTCGCTGGTGAA

GACCCAGAGGAAAGGGGAGTAAAACTTGGATTGGGAGATTTCATTTTCTACAGTGTTCTGGTTGGTAAAG

CCTCAGCAACAGCCAGTGGAGACTGGAACACAACCATAGCCTGTTTCGTAGCCATATTAATTGGTTTGTG

CCTTACATTATTACTCCTTGCCATTTTCAAGAAAGCATTGCCAGCTCTTCCAATCTCCATCACCTTTGGG

CTTGTTTTCTACTTTGCCACAGATTATCTTGTACAGCCTTTTATGGACCAATTAGCATTCCATCAATTTT

ATATCTAGCATATTTGCGGTTAGAATCCCATGGATGTTTCTTCTTTGACTATAACAAAATCTGGGGAGGA

CAAAGGTGATTTTCCTGTGTCCACATCTAACAAAGTCAAGATTCCCGGCTGGACTTTTGCAGCTTCCTTC

CAAGTCTTCCTGACCACCTTGCACTATTGGACTTTGGAAGGAGGTGCCTATAGAAAACGATTTTGAACAT

ACTTCATCGCAGTGGACTGTGTCCCTCGGTGCAGAAACTACCAGATTTGAGGGACGAGGTCAAGGAGATA

TGATAGGCCCGGAAGTTGCTGTGCCCCATCAGCAGCTTGACGCGTGGTCACAGGACGATTTCACTGACAC

TGCGAACTCTCAGGACTACCGTTACCAAGAGGTTAGGTGAAGTGGTTTAAACCAAACGGAACTCTTCATC

TTAAACTACACGTTGAAAATCAACCCAATAATTCTGTATTAACTGAATTCTGAACTTTTCAGGAGGTACT

GTGAGGAAGAGCAGGCACCAGCAGCAGAATGGGGAATGGAGAGGTGGGCAGGGGTTCCAGCTTCCCTTTG

ATTTTTTGCTGCAGACTCATCCTTTTTAAATGAGACTTGTTTTCCCCTCTCTTTGAGTCAAGTCAAATAT

GTAGATTGCCTTTGGCAATTCTTCTTCTCAAGCACTGACACTCATTACCGTCTGTGATTGCCATTTCTTC

CCAAGGCCAGTCTGAACCTGAGGTTGCTTTATCCTAAAAGTTTTAACCTCAGGTTCCAAATTCAGTAAAT

TTTGGAAACAGTACAGCTATTTCTCATCAATTCTCTATCATGTTGAAGTCAAATTTGGATTTTCCACCAA

ATTCTGAATTTGTAGACATACTTGTACGCTCACTTGCCCCAGATGCCTCCTCTGTCCTCATTCTTCTCTC

CCACACAAGCAGTCTTTTTCTACAGCCAGTAAGGCAGCTCTGTCGTGGTAGCAGATGGTCCCATTATTCT

AGGGTCTTACTCTTTGTATGATGAAAAGAATGTGTTATGAATCGGTGCTGTCAGCCCTGCTGTCAGACCT

TCTTCCACAGCAAATGAGATGTATGCCCAAAGACGGTAGAATTAAAGAAGAGTAAAATGGCTGTTGAAGC

ACTTTCTGTCCTGGTATTTTGTTTTTGCTTTTGCCACACAGTAGCTCAGAATTTGAACAAATAGCCAAAA

GCTGGTGGTTGATGAATTATGAACTAGTTGTATCAACACAAAGCAAGAGTTGGGGAAAGCCATATTTAAC

TTGGTGAGCTGTGGGAGAACCTGGTGGCAGAAGGAGAACCAACTGCCAAGGGGAAAGAGAAGGGGCCTCC

AGCAGCGAAGGGGATACAGTGAGCTAATGATGTCAAGGAGGAGTTTCAGGTTATTCTCGTCAGCTCCACA
```

-continued

```
AATGGGTGCTTTGTGGTCTCTGCCCGCGTTACCTTTCCTCTCAATGTACCTTTGTGTGAACTGGGCAGTG

GAGGTGCCTGCTGCAGTTACCATGGAGTTCAGGCTCTGGGCAGCTCAGTCAGGCAAAACACACAAACAGC

CATCAGCCTGTGTGGGCTCAGGGCACCTCTGGACAAAGGCTTGTGGGGCATAACCTTCTTTACCACAGAG

AGCCCTTAGCTATGCTGATCAGACCGTAAGCGTTTATGAGAAACTTAGTTTCCTCCTGTGGCTGAGGAGG

GGCCAGCTTTTTCTTCTTTTGCCTGCTGTTTTCTCTCCCAATCTATGATATGATATGACCTGGTTTGGGG

CTGTCTTTGGTGTTTAGAATATTTGTTTTCTGTCCCAGGATATTTCTTATAAGAACCTAACTTCAAGAGT

AGTGTGCGAGTACTGATCTGAATTTAAATTAAAATTGGCTTATATTAGGCAGTCACAGACAGGAAAAATA

AGAGCTATGCAAAGAAAGGGGGATTTAAAGTAGTAGGTTCTATCATCTCAATTCATTTTTTTCCATGAAA

TCCCTTCTTCCAAGATTCATTCCCTCTCTCAGACATGTGCTAGCATGGGTATTATCATTGAGAAAGCACA

GCTACAGCAAAGCCACCTGAATAGCAATTTGTGATTGGAAGCATTCTTGAGGGATCCCTAATCTAGAGTA

ATTTATTTGTGTAAGGATCCCAAATGTGTTGCACCTTTCATGATACATTTCTTCTCTGAAGAGGGTACGT

GGGGTGTGTGTATTTAAATCCATCCTATGTATTACTGATTGTCCTGTGTAGAAAGATGGCAATTATTCTG

TCTCTTTCTCCAAGTTTGAGCCACATCTCAGCCACATTGTTAGACAGTGTACAGAGAACCTATCTTTCCT

TTTTTTTTTTTAAAGGACAGGATTTTGCTGTGTTGCCCAGGCTAGACTTGAACTCCTGGGCTCAAGTAA

TCCACCTCAGCCTGAGTAGCTGAGACTACAGCCCATCTTATTTCTTTAAATCATTCATCTCAGGCAGAGA

ACTTTTCCCTCAAACATTCTTTTTAGAATTAGTTCAGTCATTCCTAAAACATCCAAATGCTAGTCTTCCA

CCATGAAAAATAGATTGTCACTGGAAAGAACAGTAGCAATTTCCATAAGGATGTGCCTTCACTCACACGG

GACAGGCGGTGGTTATAGAGTCGGGCAAAACCAGCAGTAGAGTATGACCAGCCAAGCCAATCTGCTTAAT

AAAAAGATGGAAGACAGTAAGGAAGGAAAGTAGCCACTAAGAGTCTGAGTCTGACTGGGCTACAGAATAA

AGGGTATTTATGGACAGAATGTCATTACATGCCTATGGGAATACCAATCATATTTGGAAGATTTGCAGAT

TTTTTTTCAGAGAGGAAAGACTCACCTTCCTGTTTTTGGTTCTCAGTAGGTTCGTGTGTGTTCCTAGAAT

CACAGCTCTGACTCCAAATGACTCAATTTCTCAATTAGAAAAAGTAGAAGCTTTCTAAGCAACTTGGAAG

AAAACAGTCATAAGTAAGCAATTTGTTGATTTTACTACAGAAGCAACAACTGAAGAGGCAGTGTTTTTAC

TTTCAGACTCCGGGATTCCCATTCTGTAGTCTCTCTGCTTTTAAAAACCCTCCTTTTGCAATAGATGCCC

AAACAGATGATGTTTATTACTTGTTATTTACGTGGCCTCAGACAGTGTATGTATTCTCGATATAACTTGT

AGAGTGTGAAATATAAGTTTAACTACCAAATAAGGTCTCCCAGGGTTAGATGACTGCGGGAAGCCTTTGA

TCCCAACCCCCAAGGCTTTGTATATTTGATCATTTGTGATCTAACCCTGGAAGAAAAAGAGCTCAGAAAC

CACTATGAAAAAATTTGTTCAGTGTTTTCTGTGTTCCCGTAGGTTCTGGAGTCTGAGGATGCAAAGATGA

ATAAGATAAATTCTCAGAATGTAGTTATAATCTCTTGTTTTCTGGTATATGCCATCTTTCTTTAACTTCT

CTAAAATATTGGGTATTTGTCAAATAACCACTTTTAACAGTTACCATTACTGAGGGCTTATACATTGGTG

TTATAAAAGTGACTTGATTCAGAAATCAATCCATTCAGTAAAGTACTCCTTCTCTAAATTTGCTGTTATG

TCTATAAGGAACAGTTTGACCTGCCCTTCTCCTCACCTCCTCACCTGCCTTCCAACATTGAATTTGGAAG

GAGACGTGAAAATTGGACATTTGGTTTTGCCCTTGGGCTGGAAACTATCATATAATCATAAGTTTGAGCC

TAGAAGTGATCCTTGTGATCTTCTCACCTCTTTAAATTCCCACAACACAAGAGATTAAAAACAGAGGTTT

CAGCTCTTCATAGTGCGTTGTGAAATGGCTGGCCAGAGTGTACCAACAAAGCTGTCATCGGGCTCACAGC

TCAGAGACATCTGCATGTGATCATCTGCATAGTCCTCTCCTCTAACGGGAAACACCTCAGATTTGCATAT

AAAAAAGCACCCTGGTGCTGAAATGAACCCCTTTCTTGAACATCAAAGCTGTCTCCCACAGCCTTGGGCA

GCAGGGTGCCTCTTAGTGGATGTGCTGGGTCCACCCTGAGCCCTGACATGTGGTGGCAGCATTGCCAGTT

GGTCTGTGTGTCTGTGTAGCAGGGACGATTTCCCAGAAAGCAATTTTCCTTTTGAAATACGTAATTGTTG

AGACTAGGCAGTTTCAAAGTCAGCTGCATATAGTAGCAAGTACAGGACTGTCTTGTTTTTGGTGTCCTTG

GAGGTGCTGGGGTGAGGGTTTCAGTGGGATCATTTACTCTCACATGTTGTCTGCCTTCTGCTTCTGTGGA
```

-continued

CACTGCTTTGTACTTAATTCAGACAGACTGTGAATACACCTTTTTTATAAATACCTTTCAAATTCTTGGT

AAGATATAATTTTGATAGCTGATTGCAGATTTTCTGTATTTGTCAGATTAATAAAGACTGCATGAATCCA

AAAAAAAAAAAAAAAA

>NM_007318.2 *Homo sapiens* presenilin 1 (PSEN1), transcript variant
2, mRNA (SEQ ID NO: 2)

AAATGACGACAACGGTGAGGGTTCTCGGGCGGGGCCTGGGACAGGCAGCTCCGGGGTCCGCGGTTTCACA

TCGGAAACAAAACAGCGGCTGGTCTGGAAGGAACCTGAGCTACGAGCCGCGGCGGCAGCGGGGCGGCGGG

GAAGCGTATACCTAATCTGGGAGCCTGCAAGTGACAACAGCCTTTGCGGTCCTTAGACAGCTTGGCCTGG

AGGAGAACACATGAAAGAAAGAACCTCAAGAGGCTTTGTTTTCTGTGAAACAGTATTTCTATACAGTTGC

TCCAATGACAGAGTTACCTGCACCGTTGTCCTACTTCCAGAATGCACAGATGTCTGAGGACAACCACCTG

AGCAATACTAATGACAATAGAGAACGGCAGGAGCACAACGACAGACGGAGCCTTGGCCACCCTGAGCCAT

TATCTAATGGACGACCCCAGGGTAACTCCCGGCAGGTGGTGGAGCAAGATGAGGAAGAAGATGAGGAGCT

GACATTGAAATATGGCGCCAAGCATGTGATCATGCTCTTTGTCCCTGTGACTCTCTGCATGGTGGTGGTC

GTGGCTACCATTAAGTCAGTCAGCTTTTATACCCGGAAGGATGGGCAGCTAATCTATACCCCATTCACAG

AAGATACCGAGACTGTGGGCCAGAGAGCCCTGCACTCAATTCTGAATGCTGCCATCATGATCAGTGTCAT

TGTTGTCATGACTATCCTCCTGGTGGTTCTGTATAAATACAGGTGCTATAAGGTCATCCATGCCTGGCTT

ATTATATCATCTCTATTGTTGCTGTTCTTTTTTTCATTCATTTACTTGGGGGAAGTGTTTAAAACCTATA

ACGTTGCTGTGGACTACATTACTGTTGCACTCCTGATCTGGAATTTTGGTGTGGTGGGAATGATTTCCAT

TCACTGGAAAGGTCCACTTCGACTCCAGCAGGCATATCTCATTATGATTAGTGCCCTCATGGCCCTGGTG

TTTATCAAGTACCTCCCTGAATGGACTGCGTGGCTCATCTTGGCTGTGATTTCAGTATATGATTTAGTGG

CTGTTTTGTGTCCGAAAGGTCCACTTCGTATGCTGGTTGAAACAGCTCAGGAGAGAAATGAAACGCTTTT

TCCAGCTCTCATTTACTCCTCAACAATGGTGTGGTTGGTGAATATGGCAGAAGGAGACCCGGAAGCTCAA

AGGAGAGTATCCAAAAATTCCAAGTATAATGCAGAAAGCACAGAAAGGGAGTCACAAGACACTGTTGCAG

AGAATGATGATGGCGGGTTCAGTGAGGAATGGGAAGCCCAGAGGGACAGTCATCTAGGGCCTCATCGCTC

TACACCTGAGTCACGAGCTGCTGTCCAGGAACTTTCCAGCAGTATCCTCGCTGGTGAAGACCCAGAGGAA

AGGGGAGTAAAACTTGGATTGGGAGATTTCATTTTCTACAGTGTTCTGGTTGGTAAAGCCTCAGCAACAG

CCAGTGGAGACTGGAACACAACCATAGCCTGTTTCGTAGCCATATTAATTGGTTTGTGCCTTACATTATT

ACTCCTTGCCATTTTCAAGAAAGCATTGCCAGCTCTTCCAATCTCCATCACCTTTGGGCTTGTTTTCTAC

TTTGCCACAGATTATCTTGTACAGCCTTTTATGGACCAATTAGCATTCCATCAATTTTATATCTAGCATA

TTTGCGGTTAGAATCCCATGGATGTTTCTTCTTTGACTATAACAAAATCTGGGGAGGACAAAGGTGATTT

TCCTGTGTCCACATCTAACAAAGTCAAGATTCCCGGCTGGACTTTTGCAGCTTCCTTCCAAGTCTTCCTG

ACCACCTTGCACTATTGGACTTTGGAAGGAGGTGCCTATAGAAAACGATTTTGAACATACTTCATCGCAG

TGGACTGTGTCCCTCGGTGCAGAAACTACCAGATTTGAGGGACGAGGTCAAGGAGATATGATAGGCCCGG

AAGTTGCTGTGCCCCATCAGCAGCTTGACGCGTGGTCACAGGACGATTTCACTGACACTGCGAACTCTCA

GGACTACCGTTACCAAGAGGTTAGGTGAAGTGGTTTAAACCAAACGGAACTCTTCATCTTAAACTACACG

TTGAAAATCAACCCAATAATTCTGTATTAACTGAATTCTGAACTTTTCAGGAGGTACTGTGAGGAAGAGC

AGGCACCAGCAGCAGAATGGGAATGGAGAGGTGGGCAGGGGTTCCAGCTTCCCTTTGATTTTTTGCTGC

AGACTCATCCTTTTTAAATGAGACTTGTTTTCCCCTCTCTTTGAGTCAAGTCAAATATGTAGATTGCCTT

TGGCAATTCTTCTTCTCAAGCACTGACACTCATTACCGTCTGTGATTGCCATTTCTTCCCAAGGCCAGTC

TGAACCTGAGGTTGCTTTATCCTAAAAGTTTTAACCTCAGGTTCCAAATTCAGTAAATTTTGGAAACAGT

ACAGCTATTTCTCATCAATTCTCTATCATGTTGAAGTCAAATTTGGATTTTCCACCAAATTCTGAATTTG

-continued

```
TAGACATACTTGTACGCTCACTTGCCCCAGATGCCTCCTCTGTCCTCATTCTTCTCTCCCACACAAGCAG

TCTTTTTCTACAGCCAGTAAGGCAGCTCTGTCGTGGTAGCAGATGGTCCCATTATTCTAGGGTCTTACTC

TTTGTATGATGAAAAGAATGTGTTATGAATCGGTGCTGTCAGCCCTGCTGTCAGACCTTCTTCCACAGCA

AATGAGATGTATGCCCAAAGACGGTAGAATTAAAGAAGAGTAAAATGGCTGTTGAAGCACTTTCTGTCCT

GGTATTTTGTTTTTGCTTTTGCCACACAGTAGCTCAGAATTTGAACAAATAGCCAAAAGCTGGTGGTTGA

TGAATTATGAACTAGTTGTATCAACACAAAGCAAGAGTTGGGGAAAGCCATATTTAACTTGGTGAGCTGT

GGGAGAACCTGGTGGCAGAAGGAGAACCAACTGCCAAGGGGAAAGAGAAGGGGCCTCCAGCAGCGAAGGG

GATACAGTGAGCTAATGATGTCAAGGAGGAGTTTCAGGTTATTCTCGTCAGCTCCACAAATGGGTGCTTT

GTGGTCTCTGCCCGCGTTACCTTTCCTCTCAATGTACCTTTGTGTGAACTGGGCAGTGGAGGTGCCTGCT

GCAGTTACCATGGAGTTCAGGCTCTGGGCAGCTCAGTCAGGCAAAACACACAAACAGCCATCAGCCTGTG

TGGGCTCAGGGCACCTCTGGACAAAGGCTTGTGGGGCATAACCTTCTTTACCACAGAGAGCCCTTAGCTA

TGCTGATCAGACCGTAAGCGTTTATGAGAAACTTAGTTTCCTCCTGTGGCTGAGGAGGGGCCAGCTTTTT

CTTCTTTTGCCTGCTGTTTTCTCTCCCAATCTATGATATGATATGACCTGGTTTGGGGCTGTCTTTGGTG

TTTAGAATATTTGTTTTCTGTCCCAGGATATTTCTTATAAGAACCTAACTTCAAGAGTAGTGTGCGAGTA

CTGATCTGAATTTAAATTAAAATTGGCTTATATTAGGCAGTCACAGACAGGAAAAATAAGAGCTATGCAA

AGAAAGGGGGATTTAAAGTAGTAGGTTCTATCATCTCAATTCATTTTTTTCCATGAAATCCCTTCTTCCA

AGATTCATTCCCTCTCTCAGACATGTGCTAGCATGGGTATTATCATTGAGAAAGCACAGCTACAGCAAAG

CCACCTGAATAGCAATTTGTGATTGGAAGCATTCTTGAGGGATCCCTAATCTAGAGTAATTTATTTGTGT

AAGGATCCCAAATGTGTTGCACCTTTCATGATACATTTCTTCTCTGAAGAGGGTACGTGGGGTGTGTGTA

TTTAAATCCATCCTATGTATTACTGATTGTCCTGTGTAGAAAGATGGCAATTATTCTGTCTCTTTCTCCA

AGTTTGAGCCACATCTCAGCCACATTGTTAGACAGTGTACAGAGAACCTATCTTTCCTTTTTTTTTTTT

AAAGGACAGGATTTTGCTGTGTTGCCCAGGCTAGACTTGAACTCCTGGGCTCAAGTAATCCACCTCAGCC

TGAGTAGCTGAGACTACAGCCCATCTTATTTCTTTAAATCATTCATCTCAGGCAGAGAACTTTTCCCTCA

AACATTCTTTTTAGAATTAGTTCAGTCATTCCTAAAACATCCAAATGCTAGTCTTCCACCATGAAAAATA

GATTGTCACTGGAAAGAACAGTAGCAATTTCCATAAGGATGTGCCTTCACTCACACGGGACAGGCGGTGG

TTATAGAGTCGGGCAAAACCAGCAGTAGAGTATGACCAGCCAAGCCAATCTGCTTAATAAAAAGATGGAA

GACAGTAAGGAAGGAAAGTAGCCACTAAGAGTCTGAGTCTGACTGGGCTACAGAATAAAGGGTATTTATG

GACAGAATGTCATTACATGCCTATGGGAATACCAATCATATTTGGAAGATTTGCAGATTTTTTTTCAGAG

AGGAAAGACTCACCTTCCTGTTTTTGGTTCTCAGTAGGTTCGTGTGTGTTCCTAGAATCACAGCTCTGAC

TCCAAATGACTCAATTTCTCAATTAGAAAAAGTAGAAGCTTTCTAAGCAACTTGGAAGAAAACAGTCATA

AGTAAGCAATTTGTTGATTTTACTACAGAAGCAACAACTGAAGAGGCAGTGTTTTACTTTCAGACTCCG

GGATTCCCATTCTGTAGTCTCTCTGCTTTTAAAAACCCTCCTTTTGCAATAGATGCCCAAACAGATGATG

TTTATTACTTGTTATTTACGTGGCCTCAGACAGTGTATGTATTCTCGATATAACTTGTAGAGTGTGAAAT

ATAAGTTTAACTACCAAATAAGGTCTCCCAGGGTTAGATGACTGCGGGAAGCCTTTGATCCCAACCCCCA

AGGCTTTGTATATTTGATCATTTGTGATCTAACCCTGGAAGAAAAAGAGCTCAGAAACCACTATGAAAAA

ATTTGTTCAGTGTTTTCTGTGTTCCCGTAGGTTCTGGAGTCTGAGGATGCAAAGATGAATAAGATAAATT

CTCAGAATGTAGTTATAATCTCTTGTTTTCTGGTATATGCCATCTTTCTTTAACTTCTCTAAATATTGG

GTATTTGTCAAATAACCACTTTTAACAGTTACCATTACTGAGGGCTTATACATTGGTGTTATAAAAGTGA

CTTGATTCAGAAATCAATCCATTCAGTAAAGTACTCCTTCTCTAAATTTGCTGTTATGTCTATAAGGAAC

AGTTTGACCTGCCCTTCTCCTCACCTCCTCACCTGCCTTCCAACATTGAATTTGGAAGGAGACGTGAAAA
```

-continued

```
TTGGACATTTGGTTTTGCCCTTGGGCTGGAAACTATCATATAATCATAAGTTTGAGCCTAGAAGTGATCC

TTGTGATCTTCTCACCTCTTTAAATTCCCACAACACAAGAGATTAAAAACAGAGGTTTCAGCTCTTCATA

GTGCGTTGTGAAATGGCTGGCCAGAGTGTACCAACAAAGCTGTCATCGGGCTCACAGCTCAGAGACATCT

GCATGTGATCATCTGCATAGTCCTCTCCTCTAACGGGAAACACCTCAGATTTGCATATAAAAAAGCACCC

TGGTGCTGAAATGAACCCCTTTCTTGAACATCAAAGCTGTCTCCCACAGCCTTGGGCAGCAGGGTGCCTC

TTAGTGGATGTGCTGGGTCCACCCTGAGCCCTGACATGTGGTGGCAGCATTGCCAGTTGGTCTGTGTGTC

TGTGTAGCAGGGACGATTTCCCAGAAAGCAATTTTCCTTTTGAAATACGTAATTGTTGAGACTAGGCAGT

TTCAAAGTCAGCTGCATATAGTAGCAAGTACAGGACTGTCTTGTTTTTGGTGTCCTTGGAGGTGCTGGGG

TGAGGGTTTCAGTGGGATCATTTACTCTCACATGTTGTCTGCCTTCTGCTTCTGTGGACACTGCTTTGTA

CTTAATTCAGACAGACTGTGAATACACCTTTTTTATAAATACCTTTCAAATTCTTGGTAAGATATAATTT

TGATAGCTGATTGCAGATTTTCTGTATTTGTCAGATTAATAAAGACTGCATGAATCCAAAAAAAAAAAAA

AAAAA

>NM_000447.2 Homo sapiens presenilin 2 (PSEN2), transcript variant
1, mRNA
                                                         (SEQ ID NO: 3)
GGGGCCTGGGCCGGCGCCGGGTCCGGCCGGGCGCTCAGCCAGCTGCGTAAACTCCGCTGGAGCGCGGCGG

CAGAGCAGGCATTTCCAGCAGTGAGGAGACAGCCAGAAGCAAGCTTTTGGAGCTGAAGGAACCTGAGACA

GAAGCTAGTCCCCCCTCTGAATTTTACTGATGAAGAAACTGAGGCCACAGAGCTAAAGTGACTTTTCCCA

AGGTCGCCCAGCGAGGACGTGGGACTTCTCAGACGTCAGGAGAGTGATGTGAGGGAGCTGTGTGACCATA

GAAAGTGACGTGTTAAAAACCAGCGCTGCCCTCTTTGAAAGCCAGGGAGCATCATTCATTTAGCCTGCTG

AGAAGAAGAAACCAAGTGTCCGGGATTCAGACCTCTCTGCGGCCCCAAGTGTTCGTGGTGCTTCCAGAGG

CAGGGCTATGCTCACATTCATGGCCTCTGACAGCGAGGAAGAAGTGTGTGATGAGCGGACGTCCCTAATG

TCGGCTGAGAGCCCCACGCCGCGCTCCTGCCAGGAGGGCAGGCAGGGCCCAGAGGATGGAGAGAACACTG

CCCAGTGGAGAAGCCAGGAGAACGAGGAGGACGGTGAGGAGGACCCTGACCGCTATGTCTGTAGTGGGGT

TCCCGGGCGGCCGCCAGGCCTGGAGGAAGAGCTGACCCTCAAATACGGAGCGAAGCACGTGATCATGCTG

TTTGTGCCTGTCACTCTGTGCATGATCGTGGTGGTAGCCACCATCAAGTCTGTGCGCTTCTACACAGAGA

AGAATGGACAGCTCATCTACACGCCATTCACTGAGGACACACCCTCGGTGGGCCAGCGCCTCCTCAACTC

CGTGCTGAACACCCTCATCATGATCAGCGTCATCGTGGTTATGACCATCTTCTTGGTGGTGCTCTACAAG

TACCGCTGCTACAAGTTCATCCATGGCTGGTTGATCATGTCTTCACTGATGCTGCTGTTCCTCTTCACCT

ATATCTACCTTGGGGAAGTGCTCAAGACCTACAATGTGGCCATGGACTACCCCACCCTCTTGCTGACTGT

CTGGAACTTCGGGGCAGTGGGCATGGTGTGCATCCACTGGAAGGGCCCTCTGGTGCTGCAGCAGGCCTAC

CTCATCATGATCAGTGCGCTCATGGCCCTAGTGTTCATCAAGTACCTCCCAGAGTGGTCCGCGTGGGTCA

TCCTGGGCGCCATCTCTGTGTATGATCTCGTGGCTGTGCTGTGTCCCAAAGGGCCTCTGAGAATGCTGGT

AGAAACTGCCCAGGAGAGAAATGAGCCCATATTCCCTGCCCTGATATACTCATCTGCCATGGTGTGGACG

GTTGGCATGGCGAAGCTGGACCCCTCCTCTCAGGGTGCCCTCCAGCTCCCCTACGACCCGGAGATGGAAG

AAGACTCCTATGACAGTTTTGGGGAGCCTTCATACCCCGAAGTCTTTGAGCCTCCCTTGACTGGCTACCC

AGGGGAGGAGCTGGAGGAAGAGGAGGAAAGGGGCGTGAAGCTTGGCCTCGGGGACTTCATCTTCTACAGT

GTGCTGGTGGGCAAGGCGGCTGCCACGGGCAGCGGGGACTGGAATACCACGCTGGCCTGCTTCGTGGCCA

TCCTCATTGGCTTGTGTCTGACCCTCCTGCTGCTTGCTGTGTTCAAGAAGGCGCTGCCCGCCCTCCCCAT

CTCCATCACGTTCGGGCTCATCTTTTACTTCTCCACGGACAACCTGGTGCGGCCGTTCATGGACACCCTG

GCCTCCCATCAGCTCTACATCTGAGGGACATGGTGTGCCACAGGCTGCAAGCTGCAGGGAATTTTCATTG

GATGCAGTTGTATAGTTTTACACTCTAGTGCCATATATTTTTAAGACTTTTCTTTCCTTAAAAAATAAAG
```

```
                                         -continued
TACGTGTTTACTTGGTGAGGAGGAGGCAGAACCAGCTCTTTGGTGCCAGCTGTTTCATCACCAGACTTTG

GCTCCCGCTTTGGGGAGCGCCTCGCTTCACGGACAGGAAGCACAGCAGGTTTATCCAGATGAACTGAGAA

GGTCAGATTAGGGCGGGGAGAAGAGCATCCGGCATGAGGGCTGAGATGCGCAAAGAGTGTGCTCGGGAGT

GGCCCCTGGCACCTGGGTGCTCTGGCTGGAGAGGAAAAGCCAGTTCCCTACGAGGAGTGTTCCCAATGCT

TTGTCCATGATGTCCTTGTTATTTTATTGCCTTTAGAAACTGAGTCCTGTTCTTGTTACGGCAGTCACAC

TGCTGGGAAGTGGCTTAATAGTAATATCAATAAATAGATGAGTCCTGTTAGAATCTTGAAAA
```

>NM_012486.2 *Homo sapiens* presenilin 2 (PSEN2), transcript variant 2, mRNA (SEQ ID NO: 4)

```
GGGGCCTGGGCCGGCGCCGGGTCCGGCCGGGCGCTCAGCCAGCTGCGTAAACTCCGCTGGAGCGCGGCGG

CAGAGCAGGCATTTCCAGCAGTGAGGAGACAGCCAGAAGCAAGCTTTTGGAGCTGAAGGAACCTGAGACA

GAAGCTAGTCCCCCCTCTGAATTTTACTGATGAAGAAACTGAGGCCACAGAGCTAAAGTGACTTTTCCCA

AGGTCGCCCAGCGAGGACGTGGGACTTCTCAGACGTCAGGAGAGTGATGTGAGGGAGCTGTGTGACCATA

GAAAGTGACGTGTTAAAAACCAGCGCTGCCCTCTTTGAAAGCCAGGGAGCATCATTCATTTAGCCTGCTG

AGAAGAAGAAACCAAGTGTCCGGGATTCAGACCTCTCTGCGGCCCCAAGTGTTCGTGGTGCTTCCAGAGG

CAGGGCTATGCTCACATTCATGGCCTCTGACAGCGAGGAAGAAGTGTGTGATGAGCGGACGTCCCTAATG

TCGGCTGAGAGCCCCACGCCGCGCTCCTGCCAGGAGGGCAGGCAGGGCCCAGAGGATGGAGAGAACACTG

CCCAGTGGAGAAGCCAGGAGAACGAGGAGGACGGTGAGGAGGACCCTGACCGCTATGTCTGTAGTGGGGT

TCCCGGGCGGCCGCCAGGCCTGGAGGAAGAGCTGACCCTCAAATACGGAGCGAAGCACGTGATCATGCTG

TTTGTGCCTGTCACTCTGTGCATGATCGTGGTGGTAGCCACCATCAAGTCTGTGCGCTTCTACACAGAGA

AGAATGGACAGCTCATCTACACGCCATTCACTGAGGACACACCCTCGGTGGGCCAGCGCCTCCTCAACTC

CGTGCTGAACACCCTCATCATGATCAGCGTCATCGTGGTTATGACCATCTTCTTGGTGGTGCTCTACAAG

TACCGCTGCTACAAGTTCATCCATGGCTGGTTGATCATGTCTTCACTGATGCTGCTGTTCCTCTTCACCT

ATATCTACCTTGGGGAAGTGCTCAAGACCTACAATGTGGCCATGGACTACCCCACCCTCTTGCTGACTGT

CTGGAACTTCGGGGCAGTGGGCATGGTGTGCATCCACTGGAAGGGCCCTCTGGTGCTGCAGCAGGCCTAC

CTCATCATGATCAGTGCGCTCATGGCCCTAGTGTTCATCAAGTACCTCCCAGAGTGGTCCGCGTGGGTCA

TCCTGGGCGCCATCTCTGTGTATGATCTCGTGGCTGTGCTGTGTCCCAAAGGGCCTCTGAGAATGCTGGT

AGAAACTGCCCAGGAGAGAAATGAGCCCATATTCCCTGCCCTGATATACTCATCTGCCATGGTGTGGACG

GTTGGCATGGCGAAGCTGGACCCCTCCTCTCAGGGTGCCCTCCAGCTCCCCTACGACCCGGAGATGGAAG

ACTCCTATGACAGTTTTGGGGAGCCTTCATACCCCGAAGTCTTTGAGCCTCCCTTGACTGGCTACCCAGG

GGAGGAGCTGGAGGAAGAGGAGGAAAGGGGCGTGAAGCTTGGCCTCGGGGACTTCATCTTCTACAGTGTG

CTGGTGGGCAAGGCGGCTGCCACGGGCAGCGGGGACTGGAATACCACGCTGGCCTGCTTCGTGGCCATCC

TCATTGGCTTGTGTCTGACCCTCCTGCTGCTTGCTGTGTTCAAGAAGGCGCTGCCCGCCCTCCCCATCTC

CATCACGTTCGGGCTCATCTTTTACTTCTCCACGGACAACCTGGTGCGGCCGTTCATGGACACCCTGGCC

TCCCATCAGCTCTACATCTGAGGGACATGGTGTGCCACAGGCTGCAAGCTGCAGGGAATTTTCATTGGAT

GCAGTTGTATAGTTTTACACTCTAGTGCCATATATTTTTAAGACTTTTCTTTCCTTAAAAAATAAAGTAC

GTGTTTACTTGGTGAGGAGGAGGCAGAACCAGCTCTTTGGTGCCAGCTGTTTCATCACCAGACTTTGGCT

CCCGCTTTGGGGAGCGCCTCGCTTCACGGACAGGAAGCACAGCAGGTTTATCCAGATGAACTGAGAAGGT

CAGATTAGGGCGGGGAGAAGAGCATCCGGCATGAGGGCTGAGATGCGCAAAGAGTGTGCTCGGGAGTGGC

CCCTGGCACCTGGGTGCTCTGGCTGGAGAGGAAAAGCCAGTTCCCTACGAGGAGTGTTCCCAATGCTTTG

TCCATGATGTCCTTGTTATTTTATTGCCTTTAGAAACTGAGTCCTGTTCTTGTTACGGCAGTCACACTGC

TGGGAAGTGGCTTAATAGTAATATCAATAAATAGATGAGTCCTGTTAGAATCTTGAAAA
```

-continued

>NP_000012.1 presenilin-1 isoform 1-467 [Homo sapiens]
(SEQ ID NO: 5)
MTELPAPLSYFQNAQMSEDNHLSNTVRSQNDNRERQEHNDRRSLGHPEPLSNGRPQGNSRQVVEQ

DEEEDEELTLKYGAKHVIMLFVPVTLCMVVVVATIKSVSFYTRKDGQLIYTPFTEDTETVGQRAL

HSILNAAIMISVIVVMTILLVVLYKYRCYKVIHAWLIISSLLLLFFFSFIYLGEVFKTYN

VAVDYITVALLIWNFGVVGMISIHWKGPLRLQQAYLIMISALMALVFIKYLPEWTAWLI

LAVISVYDLVAVLCPKGPLRMLVETAQERNETLFPALIYSSTMVWLVNMAEGDPEAQRR

VSKNSKYNAESTERESQDTVAENDDGGFSEEWEAQRDSHLGPHRSTPESRAAVQELSSS

ILAGEDPEERGVKLGLGDFIFYSVLVGKASATASGDWNTTIACFVAILIGLCLTLLLLA

IFKKALPALPISITFGLVFYFATDYLVQPFMDQLAFHQFYI

>NP_015557.2 presenilin-1 isoform 1-463 [Homo sapiens]
(SEQ ID NO: 6)
MTELPAPLSYFQNAQMSEDNHLSNTNDNRERQEHNDRRSLGHPEPLSNGRPQGNSRQVVEQDEEEDEE

LTLKYGAKHVIMLFVPVTLCMVVVVATIKSVSFYTRKDGQLIYTPFTEDTETVGQRALHSILNAAIMI

SVIVVMTILLVVLYKYRCYKVIHAWLIISSLLLLFFFSFIYLGEVFKTYNVAVDYITVALLIWNFGVV

GMISIHWKGPLRLQQAYLIMISALMALVFIKYLPEWTAWLILAVISVYDLVAVLCPKGPLRMLVETAQ

ERNETLFPALIYSSTMVWLVNMAEGDPEAQRRVSKNSKYNAESTERESQDTVAENDDGGFSEEWEAQR

DSHLGPHRSTPESRAAVQELSSSILAGEDPEERGVKLGLGDFIFYSVLVGKASATASGDWNTTIACFV

AILIGLCLTLLLLAIFKKALPALPISITFGLVFYFATDYLVQPFMDQLAFHQFYI

>NP_000438.2 presenilin-2 isoform 1 [Homo sapiens]
(SEQ ID NO: 7)
MLTFMASDSEEEVCDERTSLMSAESPTPRSCQEGRQGPEDGENTAQWRSQENEEDGEEDPDRYVCSGV

PGRPPGLEEELTLKYGAKHVIMLFVPVTLCMIVVVATIKSVRFYTEKNGQLIYTPFTEDTPSVGQRLL

NSVLNTLIMISVIVVMTIFLVVLYKYRCYKFIHGWLIMSSLMLLFLFTYIYLGEVLKTYNVAMDYPTL

LLTVWNFGAVGMVCIHWKGPLVLQQAYLIMISALMALVFIKYLPEWSAWVILGAISVYDLVAVLCPKG

PLRMLVETAQERNEPIFPALIYSSAMVWTVGMAKLDPSSQGALQLPYDPEMEEDSYDSFGEPSYPEVF

EPPLTGYPGEELEEEEERGVKLGLGDFIFYSVLVGKAAATGSGDWNTTLACFVAILIGLCLTLLLLAV

FKKALPALPISITEGLIFYFSTDNLVRPFMDTLASHQLYI

>NP_036618.2 presenilin-2 isoform 2 [Homo sapiens]
(SEQ ID NO: 8)
MLTFMASDSEEEVCDERTSLMSAESPTPRSCQEGRQGPEDGENTAQWRSQENEEDGEEDPDRYVCSGV

PGRPPGLEEELTLKYGAKHVIMLFVPVTLCMIVVVATIKSVRFYTEKNGQLIYTPFTEDTPSVGQRLL

NSVLNTLIMISVIVVMTIFLVVLYKYRCYKFIHGWLIMSSLMLLFLFTYIYLGEVLKTYNVAMDYPTL

LLTVWNFGAVGMVCIHWKGPLVLQQAYLIMISALMALVFIKYLPEWSAWVILGAISVYDLVAVLCPKG

PLRMLVETAQERNEPIFPALIYSSAMVWTVGMAKLDPSSQGALQLPYDPEMEDSYDSFGEPSYPEVFE

PPLTGYPGEELEEEEERGVKLGLGDFIFYSVLVGKAAATGSGDWNTTLACFVAILIGLCLTLLLLAVF

KKALPALPISITFGLIFYFSTDNLVRPFMDTLASHQLYI

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The length of a reference sequence aligned for comparison purposes is at least 80% of the length of the reference sequence, and in some embodiments is at least 90% or 100%. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences, taking into account the number of gaps, and the length of each gap, which need to be introduced for optimal alignment of the two sequences. In another embodiment, the percent identity of two amino acid sequences can be assessed as a function of the conservation of amino acid residues within the same family of amino acids (e.g., positive charge, negative charge, polar and uncharged, hydrophobic) at corresponding positions in both amino acid sequences (e.g., the presence of an alanine residue in place of a valine residue at a specific position in both sequences shows a high level of conservation, but the presence of an arginine residue in place of an aspartate residue at a specific position in both sequences shows a low level of conservation).

For example, the percent identity between two amino acid sequences can be determined using the Needleman and Wunsch ((1970) J. Mol. Biol. 48:444-453) algorithm which has been incorporated into the GAP program in the GCG software package, using a Blossum scoring matrix, e.g., with default values for gap penalty, gap extend penalty of 4, and frameshift gap penalty.

Codon Optimized Presenilin 1

Codon optimization is desirable to express proteins in specific host cells—e.g., bacterial, mouse, human. It will be appreciated by those skilled in the art that as a result of the degeneracy of the genetic code, a multitude of cDNAs encoding human presenilin 1, some bearing minimal similarity to the cDNAs of any known and naturally occurring gene, may be produced. Thus, the invention contemplates each and every possible variation of cDNA that could be made by selecting combinations based on possible codon choices. These combinations are made in accordance with the standard triplet genetic code as applied to the polynucleotide encoding naturally occurring human presenilin variant, and all such variations are to be considered as being specifically disclosed. An exemplary codon-optimized human PSEN1 nucleotide sequence is disclosed herein—e.g., SEQ ID NO:9; See FIG. 2. This codon-optimized human PSEN1 nucleotide sequence was generated by substituting codons in the naturally occurring PSEN1 nucleotide sequence that occur at lower frequency in human cells for codons that occur at higher frequency in human cells. Codon-optimized human PSEN1 nucleotide sequences can include sequences wherein less than 100% of the codons are optimized, e.g., wherein only 20%, 30%, 40%, 50%, 60%, 70%, 80%, or 90% of the wild type non-optimized codons are optimized. The frequency of occurrence for codons can be computationally determined by methods known in the art. An exemplary calculation of these codon frequencies is disclosed in Table 1.

An exemplary codon-optimized human PSEN1 sequence is as follows:

>Codon optimized Homo sapiens presenilin 1 (PSEN1) cDNA
(SEQ ID NO: 9)
CGACGCCACCATGACAGAACTGCCTGCCCCCCTGAGCTACTTCCAGAACG

CCCAGATGAGCGAGGACAACCACCTGAGCAACACCGTGCGGAGCCAGAAC

GACAACAGAGAGCGGCAGGAACACAACGACAGGCGGAGCCTGGGACACCC

TGAGCCCCTGTCTAATGGCAGACCCCAGGGCAACAGCAGACAGGTGGTGG

AACAGGACGAGGAAGAGGACGAAGAACTGACCCTGAAGTACGGCGCCAAG

CACGTGATCATGCTGTTCGTGCCCGTGACCCTGTGCATGGTCGTGGTGGT

GGCCACAATCAAGAGCGTGTCCTTCTACACCCGGAAGGACGGCCAGCTGA

TCTACACCCCCTTCACCGAGGACACCGAGACAGTGGGACAGAGAGCCCTG

CACAGCATCCTGAACGCCGCCATCATGATCAGCGTGATCGTCGTGATGAC

CATCCTGCTGGTGGTGCTGTACAAGTACCGGTGCTACAAAGTGATCCACG

CCTGGCTGATCATCAGCAGCCTGCTGCTGCTGTTCTTCTTTAGCTTCATC

TACCTGGGCGAGGTGTTCAAGACCTACAACGTGGCCGTGGACTACATCAC

CGTGGCCCTGCTGATCTGGAACTTCGGCGTCGTGGGCATGATCTCCATCC

ACTGGAAGGGCCCCCTGAGACTGCAGCAGGCCTACCTGATTATGATCTCC

GCCCTGATGGCCCTGGTGTTCATCAAGTACCTGCCCGAGTGGACCGCTTG

GCTGATCCTGGCCGTGATCTCCGTGTACGACCTGGTGGCCGTGCTGTGCC

CTAAGGGACCTCTGCGGATGCTGGTGGAAACCGCCCAGGAACGGAACGAG

ACACTGTTCCCTGCCCTGATCTACTCCAGCACAATGGTGTGGCTCGTGAA

CATGGCCGAGGGCGATCCTGAGGCCCAGCGGAGAGTGTCCAAGAACTCCA

AGTACAACGCCGAGAGCACCGAGCGCGAGAGCCAGGATACAGTGGCCGAG

AATGACGACGGCGGCTTCAGCGAGGAATGGGAGGCCCAGAGAGATAGCCA

CCTGGGCCCTCACAGAAGCACCCCTGAATCTAGAGCCGCCGTGCAGGAAC

TGAGCAGCTCCATTCTGGCCGGCGAGGACCCCGAAGAAAGAGGCGTGAAA

CTGGGCCTGGGCGACTTCATCTTCTACAGCGTGCTCGTGGGCAAGGCCAG

CGCCACAGCTAGCGGCGACTGGAACACCACAATCGCCTGCTTCGTGGCCA

TCCTGATCGGCCTGTGTCTGACACTTCTGCTGCTGGCCATCTTCAAGAAG

GCCCTGCCCGCCCTGCCTATCAGCATCACCTTCGGCCTGGTGTTTTACTT

CGCCACCGACTACCTGGTGCAGCCCTTCATGGACCAGCTGGCCTTCCACC

AGTTCTACATCTGA

TABLE 1

Codon Usage Frequency Table in Humans (Source: Gen Script ®, GenScript Codon Usage Frequency Table Tool)

| Triplet | Amino acid | Fraction | Frequency/ Thousand | Number |
|---|---|---|---|---|
| TTT | F | 0.45 | 16.9 | 336562 |
| TTC | F | 0.55 | 20.4 | 406571 |
| TTA | L | 0.07 | 7.2 | 143715 |
| TTG | L | 0.13 | 12.6 | 249879 |
| TAT | Y | 0.43 | 12 | 239268 |
| TAC | Y | 0.57 | 15.6 | 310695 |
| TAA | * | 0.28 | 0.7 | 14322 |
| TAG | * | 0.2 | 0.5 | 10915 |
| CTT | L | 0.13 | 12.8 | 253795 |
| CTC | L | 0.2 | 19.4 | 386182 |
| CTA | L | 0.07 | 6.9 | 138154 |
| CTG | L | 0.41 | 40.3 | 800774 |
| CAT | H | 0.41 | 10.4 | 207826 |
| CAC | H | 0.59 | 14.9 | 297048 |
| CAA | Q | 0.25 | 11.8 | 234785 |
| CAG | Q | 0.75 | 34.6 | 688316 |
| ATT | I | 0.36 | 15.7 | 313225 |
| ATC | I | 0.48 | 21.4 | 426570 |
| ATA | I | 0.16 | 7.1 | 140652 |
| ATG | M | 1 | 22.3 | 443795 |
| AAT | N | 0.46 | 16.7 | 331714 |
| AAC | N | 0.54 | 19.5 | 387148 |
| AAA | K | 0.42 | 24 | 476554 |
| AAG | K | 0.58 | 32.9 | 654280 |
| GTT | V | 0.18 | 10.9 | 216818 |
| GTC | V | 0.24 | 14.6 | 290874 |
| GTA | V | 0.11 | 7 | 139156 |
| GTG | V | 0.47 | 28.9 | 575438 |
| GAT | D | 0.46 | 22.3 | 443369 |
| GAC | D | 0.54 | 26 | 517579 |
| GAA | E | 0.42 | 29 | 577846 |
| GAG | E | 0.58 | 40.8 | 810842 |
| TCT | S | 0.18 | 14.6 | 291040 |
| TCC | S | 0.22 | 17.4 | 346943 |
| TCA | S | 0.15 | 11.7 | 233110 |

TABLE 1-continued

Codon Usage Frequency Table in Humans (Source: Gen Script ®, GenScript Codon Usage Frequency Table Tool)

| Triplet | Amino acid | Fraction | Frequency/ Thousand | Number |
| --- | --- | --- | --- | --- |
| TCG | S | 0.06 | 4.5 | 89429 |
| TGT | C | 0.45 | 9.9 | 197293 |
| TGC | C | 0.55 | 12.2 | 243685 |
| TGA | * | 0.52 | 1.3 | 25383 |
| TGG | W | 1 | 12.8 | 255512 |
| CCT | P | 0.28 | 17.3 | 343793 |
| CCC | P | 0.33 | 20 | 397790 |
| CCA | P | 0.27 | 16.7 | 331944 |
| CCG | P | 0.11 | 7 | 139414 |
| CGT | R | 0.08 | 4.7 | 93458 |
| CGC | R | 0.19 | 10.9 | 217130 |
| CGA | R | 0.11 | 6.3 | 126113 |
| CGG | R | 0.21 | 11.9 | 235938 |
| ACT | T | 0.24 | 12.8 | 255582 |
| ACC | T | 0.36 | 19.2 | 382050 |
| ACA | T | 0.28 | 14.8 | 294223 |
| ACG | T | 0.12 | 6.2 | 123533 |
| AGT | S | 0.15 | 11.9 | 237404 |
| AGC | S | 0.24 | 19.4 | 385113 |
| AGA | R | 0.2 | 11.5 | 228151 |
| AGG | R | 0.2 | 11.4 | 227281 |
| GCT | A | 0.26 | 18.6 | 370873 |
| GCC | A | 0.4 | 28.5 | 567930 |
| GCA | A | 0.23 | 16 | 317338 |
| GCG | A | 0.11 | 7.6 | 150708 |
| GGT | G | 0.16 | 10.8 | 215544 |
| GGC | G | 0.34 | 22.8 | 453917 |
| GGA | G | 0.25 | 16.3 | 325243 |
| GGG | G | 0.25 | 16.4 | 326879 |

Mutated Presenilin 1

In some embodiments, the PS1 protein contains a mutation. In some embodiments, the mutation is a conservative substitution. Such changes include substituting any of isoleucine (I), valine (V), and leucine (L) for any other of these hydrophobic amino acids; aspartic acid (D) for glutamic acid (E) and vice versa; glutamine (Q) for asparagine (N) and vice versa; and serine (S) for threonine (T) and vice versa. Other substitutions can also be considered conservative, depending on the environment of the particular amino acid and its role in the three-dimensional structure of the protein. For example, glycine (G) and alanine (A) can frequently be interchangeable, as can alanine (A) and valine (V). Methionine (M), which is relatively hydrophobic, can frequently be interchanged with leucine and isoleucine, and sometimes with valine. Lysine (K) and arginine (R) are frequently interchangeable in locations in which the significant feature of the amino acid residue is its charge and the differing pK's of these two amino acid residues are not significant. Still other changes can be considered "conservative" in particular environments (see, e.g. Table III of US20110201052; pages 13-15 "Biochemistry" 2nd ED. Stryer ed (Stanford University); Henikoff et al., PNAS 1992 Vol 89 10915-10919; Lei et al., J Biol Chem 1995 May 19; 270(20):11882-6).

In some embodiments, the methods include introducing one or more additional mutations into the human PS1 sequence (SEQ ID NOs:5 or 6). Thus, in some embodiments, the sequence can be at least 80%, 85%, 90%, 95%, or 99% identical to at least 60%, 70%, 80%, 90%, or 100% of a human PS1.

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). The length of a reference sequence aligned for comparison purposes is typically at least 80% of the length of the reference sequence, and in some embodiments is at least 90% or 100%. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences. In another embodiment, the percent identity of two amino acid sequences can be assessed as a function of the conservation of amino acid residues within the same family of amino acids (e.g., positive charge, negative charge, polar and uncharged, hydrophobic) at corresponding positions in both amino acid sequences (e.g., the presence of an alanine residue in place of a valine residue at a specific position in both sequences shows a high level of conservation, but the presence of an arginine residue in place of an aspartate residue at a specific position in both sequences shows a low level of conservation).

For purposes of the present methods, the comparison of sequences and determination of percent identity between two sequences can be accomplished using a Blossum 62 scoring matrix with a gap penalty of 12, a gap extend penalty of 4, and a frameshift gap penalty of 5.

Delivery Vectors

Codon-optimized nucleic acids encoding a PS1 polypeptide or therapeutically active fragment thereof can be incorporated into a gene construct to be used as a part of a gene therapy protocol. For example, described herein are targeted expression vectors for in vivo delivery and expression of a codon-optimized polynucleotide that encodes a PS1 polypeptide or active fragment thereof in particular cell types, especially cerebral cortical neuronal cells. Expression constructs of such components can be administered in any effective carrier, e.g., any formulation or composition capable of effectively delivering the component gene to cells in vivo. Approaches include insertion of the gene in viral vectors, preferably adeno-associated virus. Viral vectors typically transduce cells directly.

Viral vectors capable of highly efficient transduction of CNS neurons may be employed, including any serotypes of rAAV (e.g., AAV1-AAV12) vectors, recombinant or chimeric AAV vectors, as well as lentivirus or other suitable viral vectors. In some embodiments, a codon-optimized polynucleotide encoding PS1 is operably linked to promoter suitable for expression in the CNS. For example, a neuron subtype-specific specific promoter, such as the alpha-calcium/calmodulin kinase 2A promoter may be used to target excitatory neurons. Alternatively, a pan neuronal promoter, such as the synapsin I promoter, may be used to drive PS1 expression. Other exemplary promoters include, but are not limited to, a cytomegalovirus (CMV) early enhancer/promoter; a hybrid CMV enhance/chicken β-actin (CBA) promoter; a promoter comprising the CMV early enhancer element, the first exon and first intron of the chicken β-actin gene, and the splice acceptor of the rabbit β-globin gene (commonly call the "CAG promoter"); or a 1.6-kb hybrid promoter composed of a CMV immediate-early enhancer and CBA intron 1/exon 1 (commonly called the CAGGS promoter; Niwa et al. Gene, 108:193-199 (1991)). The CAGGS promoter (Niwa et al., 1991) has been shown to provide ubiquitous and long-term expression in the brain (Klein et al., Exp. Neurol. 176:66-74 (2002)). One approach for in vivo introduction of nucleic acid into a cell is by use of a viral vector containing nucleic acid, e.g., a codon-optimized cDNA encoding a PS1. Among other things, infection of cells with a viral vector has the advantage that a large proportion of the targeted cells can receive the nucleic acid. Additionally, molecules encoded within the viral vector, e.g., by a cDNA contained in the viral vector, are expressed efficiently in cells that have taken up viral vector nucleic acid.

A viral vector system particularly useful for delivery of nucleic acids is the adeno-associated virus (AAV). Adeno-associated virus is a naturally occurring defective virus that requires another virus, such as an adenovirus or a herpes virus, as a helper virus for efficient replication and a productive life cycle. (For a review see Muzyczka et al., Curr. Topics in Micro and Immunol. 158:97-129 (1992)). AAV vectors efficiently transduce various cell types and can produce long-term expression of transgenes in vivo. Although AAV vector genomes can persist within cells as episomes, vector integration has been observed (see for example Deyle and Russell, Curr Opin Mol Ther. 2009 August; 11(4): 442-447; Asokan et al., Mol Ther. 2012 April; 20(4): 699-708; Flotte et al., Am. J. Respir. Cell. Mol. Biol. 7:349-356 (1992); Samulski et al., J. Virol. 63:3822-3828 (1989); and McLaughlin et al., J. Virol. 62:1963-1973 (1989)). AAV vectors, such as AAV2, have been extensively used for gene augmentation or replacement and have shown therapeutic efficacy in a range of animal models as well as in the clinic; see, e.g., Mingozzi and High, Nature Reviews Genetics 12, 341-355 (2011); Deyle and Russell, Curr Opin Mol Ther. 2009 August; 11(4): 442-447; Asokan et al., Mol Ther. 2012 April; 20(4): 699-708. AAV vectors containing as little as 300 base pairs of AAV can be packaged and can produce recombinant protein expression. Protocols for producing recombinant retroviruses and for infecting cells in vitro or in vivo with such viruses are known in the art, e.g, can be found in Ausubel, et al., eds., Current Protocols in Molecular Biology, Greene Publishing Associates, (1989), Sections 9.10-9.14, and other standard laboratory manuals. The use of AAV vectors to deliver constructs for expression in the brain has been described, e.g., in Iwata et al., Sci Rep. 2013; 3:1472; Hester et al., Curr Gene Ther. 2009 October; 9(5):428-33; Doll et al., Gene Therapy 1996, 3(5):437-447; and Foley et al., J Control Release. 2014 Dec. 28; 196:71-8.

Thus, in some embodiments, the codon-optimized PSEN1 encoding nucleic acid is present in a vector for gene therapy, such as an AAV vector. In some instances, the AAV vector is selected from the group consisting of AAV1, AAV2, AAV3, AAV4, AAV5, AAV6, AAV7, AAV8, AAV9, AAVrh10, AAV11, and AAV12. In preferred embodiments, the AAV is AAV9 or AAVrh10.

A vector as described herein can be a pseudotyped vector. Pseudotyping provides a mechanism for modulating a vector's target cell population. For instance, pseudotyped AAV vectors can be utilized in various methods described herein. Pseudotyped vectors are those that contain the genome of one vector, e.g., the genome of one AAV serotype, in the capsid of a second vector, e.g., a second AAV serotype. Methods of pseudotyping are well known in the art. For instance, a vector may be pseudotyped with envelope glycoproteins derived from Rhabdovirus vesicular stomatitis virus (VSV) serotypes (Indiana and Chandipura strains), rabies virus (e.g., various Evelyn-Rokitnicki-Abelseth ERA strains and challenge virus standard (CVS)), Lyssavirus Mokola virus, a rabies-related virus, vesicular stomatitis virus (VSV), Mokola virus (MV), lymphocytic choriomeningitis virus (LCMV), rabies virus glycoprotein (RV-G), glycoprotein B type (FuG-B), a variant of FuG-B (FuG-B2) or Moloney murine leukemia virus (MuLV). A virus may be pseudotyped for transduction of one or more neurons or groups of cells.

Without limitation, illustrative examples of pseudotyped vectors include recombinant AAV2/1, AAV2/2, AAV2/5, AAV2/6, AAV2/7, AAV2/8, AAV9, AAVrh10, AAV11, and AAV12 serotype vectors. It is known in the art that such vectors may be engineered to include a transgene encoding a human protein or other protein. In particular instances, the present disclosures can include a pseudotyped AAV9 or AAVrh10 viral vector including a nucleic acid as disclosed herein. See *Viral Vectors for Gene Therapy: Methods and Protocols*, ed. Machida, Humana Press, 2003.

In some instances, a particular AAV serotype vector may be selected based upon the intended use, e.g., based upon the intended route of administration.

Various methods for application of AAV vector constructs in gene therapy are known in the art, including methods of modification, purification, and preparation for administration to human subjects (see, e.g., Viral Vectors for Gene Therapy: Methods and Protocols, ed. Machida, Humana Press, 2003). In addition, AAV based gene therapy targeted to cells of the CNS has been described (see, e.g., U.S. Pat. Nos. 6,180,613 and 6,503,888). High titer AAV preparations can be produced using techniques known in the art, e.g., as described in U.S. Pat. No. 5,658,776

A vector construct refers to a polynucleotide molecule including all or a portion of a viral genome and a transgene. In some instances, gene transfer can be mediated by a DNA viral vector, such as an adenovirus (Ad) or adeno-associated virus (AAV). Other vectors useful in methods of gene therapy are known in the art. For example, a construct as disclosed herein can include an alphavirus, herpesvirus, retrovirus, lentivirus, or vaccinia virus.

Adenoviruses are a relatively well characterized group of viruses, including over 50 serotypes (see, e.g., WO 95/27071, which is herein incorporated by reference). Adenoviruses are tractable through the application of techniques of molecular biology and may not require integration into the host cell genome. Recombinant Ad-derived vectors, including vectors that reduce the potential for recombination and generation of wild-type virus, have been constructed (see, e.g., international patent publications WO 95/00655 and WO 95/11984, which are herein incorporated by reference). Wild-type AAV has high infectivity and is capable of integrating into a host genome with a high degree of specificity (see, e.g. Hermonat and Muzyczka 1984 Proc. Natl. Acad. Sci., USA 81:6466-6470 and Lebkowski et al. 1988 Mol. Cell. Biol. 8:3988-3996).

Non-native regulatory sequences, gene control sequences, promoters, non-coding sequences, introns, or coding sequences can be included in a nucleic acid as disclosed herein. The inclusion of nucleic acid tags or signaling sequences, or nucleic acids encoding protein tags or protein signaling sequences, is further contemplated herein. Typically, the coding region is operably linked with one or more regulatory nucleic acid components.

A promoter included in a nucleic acid as disclosed herein can be a tissue- or cell type-specific promoter, a promoter specific to multiple tissues or cell types, an organ-specific promoter, a promoter specific to multiple organs, a systemic or ubiquitous promoter, or a nearly systemic or ubiquitous promoter. Promoters having stochastic expression, inducible expression, conditional expression, or otherwise discontinuous, inconstant, or unpredictable expression are also included within the scope of the present disclosure. A promoter can include any of the above characteristics or other promoter characteristics known in the art.

In clinical settings, the gene delivery systems for the therapeutic gene can be introduced into a subject by any of a number of methods, each of which is familiar in the art. For instance, a pharmaceutical preparation of the gene delivery system can be introduced systemically, e.g., by intravenous injection, and specific transduction of the protein in the target cells will occur predominantly from specificity of transfection, provided by the gene delivery vehicle, cell-type or tissue-type expression due to the transcriptional regulatory sequences controlling expression of the receptor gene, or a combination thereof. In other embodiments, initial delivery of the recombinant gene is more limited, with introduction into the subject being quite localized. For example, the gene delivery vehicle can be introduced by catheter (see U.S. Pat. No. 5,328,470) or by stereotactic injection, e.g., optionally into the cisterna magna, cerebral ventricles, lumbar intrathecal space, direct injection into hippocampus (e.g., Chen et al., PNAS USA 91: 3054-3057 (1994)). In preferred embodiments, delivery methods of Presenilin-expressing virus include intravenous, intrathecal, intracerebroventricular, intracisternal, and stereotactic intraparenchymal administration.

The methods can be further optimized via preclinical testing to achieve the best rescue of neurodegeneration, dementia, synaptic dysfunction and molecular alteration in presenilin conditional double knockout mice and presenilin-1 knockin mice expressing FAD mutations.

The pharmaceutical preparation of the gene therapy construct can consist essentially of the gene delivery system in an acceptable diluent, or can comprise a slow release matrix in which the gene delivery vehicle is embedded. Alternatively, where the complete gene delivery system can be produced intact from recombinant cells, e.g., retroviral vectors, the pharmaceutical preparation can comprise one or more cells, which produce the gene delivery system.

Delivery Formulations and Pharmaceutical Compositions

In some embodiments, polynucleotides as disclosed herein for delivery to a target tissue in vivo are encapsulated or associated with in a nanoparticle. Methods for nanoparticle packaging are well known in the art, and are described, for example, in Bose S, et al (Role of Nucleolin in Human Parainfluenza Virus Type 3 Infection of Human Lung Epithelial Cells. J. Virol. 78:8146. 2004); Dong Y et al. Poly (d,l-lactide-co-glycolide)/montmorillonite nanoparticles for oral delivery of anticancer drugs. Biomaterials 26:6068. 2005); Lobenberg R. et al (Improved body distribution of 14C-labelled AZT bound to nanoparticles in rats determined by radioluminography. J Drug Target 5:171.1998); Sakuma S R et al (Mucoadhesion of polystyrene nanoparticles having surface hydrophilic polymeric chains in the gastrointestinal tract. Int J Pharm 177:161. 1999); Virovic L et al. Novel delivery methods for treatment of viral hepatitis: an update. Expert Opin Drug Deliv 2:707.2005); and Zimmermann E et al, Electrolyte- and pH-stabilities of aqueous solid lipid nanoparticle (SLN) dispersions in artificial gastrointestinal media. Eur J Pharm Biopharm 52:203. 2001). In some embodiments, one or more polynucleotides is delivered to a target tissue in vivo in a vesicle, e.g. a liposome (see Langer, Science 249:1527-1533 (1990); Treat et al., in Liposomes in the Therapy of Infectious Disease and Cancer, Lopez-Berestein and Fidler (eds.), Liss, New York, pp. 353-365 (1989); Lopez-Berestein, ibid., pp. 317-327; see generally ibid). In some embodiments, lipid-based nanoparticles (LNP) are used; see, e.g., Robinson et al., Mol Ther. 2018 Aug. 1; 26(8):2034-2046; U.S. Pat. No. 9,956,271B2.

The present methods and compositions can include microvesicles or a preparation thereof, that contains one or more therapeutic molecules—e.g., polynucleotides or RNA—described herein. "Microvesicles", as the term is used herein, refers to membrane-derived microvesicles, which includes a range of extracellular vesicles, including exosomes, microparticles and shed microvesicles secreted by many cell types under both normal physiological and pathological conditions. See, e.g., EP2010663B1. The methods and compositions described herein can be applied to microvesicles of all sizes; in one embodiment, 30 to 200 nm, in one embodiment, 30 to 800 nm, in one embodiment, up to 2 um. The methods and compositions described herein can also be more broadly applied to all extracellular vesicles, a term which encompasses exosomes, shed microvesicles, oncosomes, ectosomes, and retroviral-like particles. Such a microvesicle or preparation is produced by the herein described methods. As the term is used herein, a microvesicle preparation refers to a population of microvesicles obtained/prepared from the same cellular source. Such a preparation is generated, for example, in vitro, by culturing cells expressing the nucleic acid molecule of the instant invention and isolating microvesicles produced by the cells. Methods of isolating such microvesicles are known in the art (Thery et al., Isolation and characterization of exosomes from cell culture supernatants and biological fluids, in Current Protocols Cell Biology, Chapter 3, 322, (John Wiley, 2006); Palmisano et al., (Mol Cell Proteomics. 2012 August; 11(8):230-43) and Waldenström et al., ((2012) PLoS ONE 7(4): e34653.doi: 10.1371/journal.pone.0034653)), some examples of which are described herein. Such techniques for isolating microvesicles from cells in culture include, without limitation, sucrose gradient purification/separation and differential centrifugation, and can be adapted for use in a method or composition described herein. See, e.g., EP2010663B1.

In some embodiments, the microvesicles are isolated by gentle centrifugation (e.g., at about 300 g) of the culture medium of the donor cells for a period of time adequate to separate cells from the medium (e.g., about 15 minutes). This leaves the microvesicles in the supernatant, to thereby yield the microvesicle preparation. In one embodiment, the culture medium or the supernatant from the gentle centrifugation, is more strongly centrifuged (e.g., at about 16,000 g) for a period of time adequate to precipitate cellular debris (e.g., about 30 minutes). This leaves the microvesicles in the supernatant, to thereby yield the microvesicle preparation. In one embodiment, the culture medium, the gentle centrifuged preparation, or the strongly centrifuged preparation is subjected to filtration (e.g., through a 0.22 um filter or a 0.8 um filter, whereby the microvesicles pass through the filter. In one embodiment, the filtrate is subjected to a final ultracentrifugation (e.g. at about 110,000 g) for a period of time that will adequately precipitate the microvesicles (e.g. for about 80 minutes). The resulting pellet contains the microvesicles and can be resuspended in a volume of buffer that yields a useful concentration for further use, to thereby yield the microvesicle preparation. In one embodiment, the microvesicle preparation is produced by sucrose density gradient purification. In one embodiment, the microvesicles are further treated with DNAse (e.g., DNAse I) and/or RNAse and/or proteinase to eliminate any contaminating DNA, RNA, or protein, respectively, from the exterior. In one embodiment, the microvesicle preparation contains one or more RNAse inhibitors.

The molecules contained within the microvesicle preparation will comprise the therapeutic molecule. Typically the microvesicles in a preparation will be a heterogeneous population, and each microvesicle will contain a complement of molecule that may or may not differ from that of other microvesicles in the preparation. The content of the therapeutic molecules in a microvesicle preparation can be expressed either quantitatively or qualitatively. One such method is to express the content as the percentage of total molecules within the microvesicle preparation. By way of example, if the therapeutic molecule is an mRNA, the content can be expressed as the percentage of total RNA content, or alternatively as the percentage of total mRNA content, of the microvesicle preparation. Similarly, if the therapeutic molecule is a protein, the content can be expressed as the percentage of total protein within the microvesicles. In one embodiment, therapeutic microvesicles, or a preparation thereof, produced by the method described herein contain a detectable, statistically significantly increased amount of the therapeutic molecule as compared to microvesicles obtained from control cells (cells obtained from the same source which have not undergone scientific manipulation to increase expression of the therapeutic molecule). In one embodiment, the therapeutic molecule is present in an amount that is at least about 10%, 20%, 30% 40%, 50%, 60%, 70% 80% or 90%, more than in microvesicles obtained from control cells. Higher levels of enrichment may also be achieved. In one embodiment, the therapeutic molecule is present in the microvesicle or preparation thereof, at least 2 fold more than control cell microvesicles. Higher fold enrichment may also be obtained (e.g., 3, 4, 5, 6, 7, 8, 9 or 10 fold).

In one embodiment, a relatively high percentage of the microvesicle content is the therapeutic molecule (e.g., achieved through overexpression or specific targeting of the molecule to microvesicles). In one embodiment, the microvesicle content of the therapeutic molecule is at least about 10%, 20%, 30% 40%, 50%, 60%, 70% 80% or 90%, of the total (like) molecule content (e.g., the therapeutic molecule is an mRNA and is about 10% of the total mRNA content of the microvesicle). Higher levels of enrichment may also be achieved. In one embodiment, the therapeutic molecule is present in the microvesicle or preparation thereof, at least 2 fold more than all other such (like) molecules. Higher fold enrichment may also be obtained (e.g., 3, 4, 5, 6, 7, 8, 9 or 10 fold).

EXAMPLES

The invention is further described in the following examples, which do not limit the scope of the invention described in the claims.

Figure 1B:
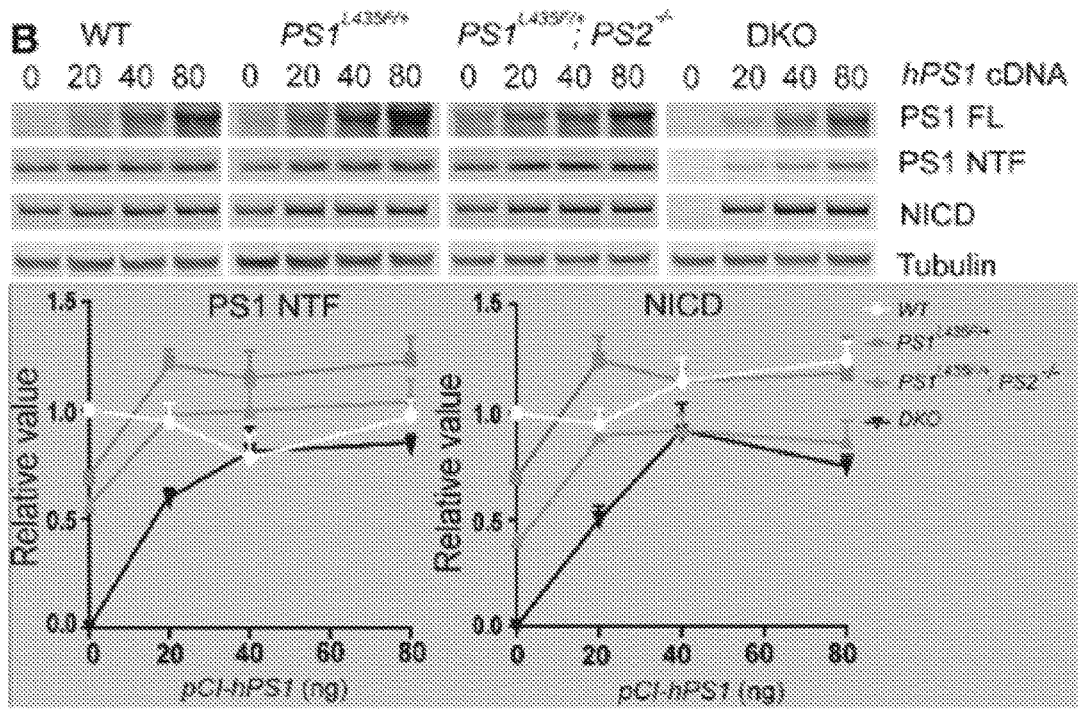

Example 1: Dose-Dependent Rescue of γ-Secretase Activity in MEFs with Varying PS Genotypes: $PS1^{+/+}$, $PS1^{L435F/+}$, $PS1^{L435F/L435F}$, $PS1^{-/-}$ and $PS1^{-/-}$; $PS2^{-/-}$ To determine whether reduced γ-secretase activity associated with PSEN1 mutations can be corrected by introduction of wild-type (WT) hPS1, primary MEFs from embryos carrying varying PS genotypes, $PS1^{+/+}$, $PS1^{L435F/+}$, $PS1^{+/-}$, $PS1^{L435F/L435F}$, $PS1^{-/-}$ and $PS1^{-/-}$; $PS2^{-/-}$ (DKO) were derived. The immortalized MEFs were transiently transfected with CMV-N ΔE, and γ-secretase activity was evaluated by measuring the levels of NICD and PS1 NTF/CTF. The NICD levels were reduced in a PS1 dosage sensitive manner, and were undetectable in DKO cells (FIG. 1A). The NICD levels were reduced but detectable in $PS1^{L435F/L435F}$ MEFs ("L435F KI/KI" MEFs) and $PS1^{-/-}$ MEFs (FIG. 1A), whereas de novo NICD production was undetectable by in vitro γ-secretase assay using L435F KI/KI and $PS1^{-/-}$ embryonic brains (Xia et al., Neuron. 2015 Mar. 4; 85(5): 967-81). Without wishing to be bound to a particular theory, applicant submits that this may be due to lower levels of PS2 normally expressed in the embryonic brain relative to MEFs, leading to lower overall PS activity in L435F KI/KI and $PS1^{-/-}$ brains, relative to MEFs. To test this hypothesis, the γ-secretase activity was measured in $PS1^{L435F/+}$; $PS2^{-/-}$ MEFs and compared to $PS1^{L435F/+}$ MEFs. The γ-secretase activity was lower in $PS1^{L435F/+}$; $PS2^{-/-}$ MEFs compared to $PS1^{L435F/+}$ MEFs (FIG. 1B).

To determine whether the impaired γ-secretase activity in various PS mutant MEFs can be rescued by introduction of WT hPS1, varying amounts (0, 20, 40, 80 ng) of wild-type hPS1 cDNA (pCI-hPS1) were transfected into MEFs, along with CMV-N ΔE. Notably, increasing amounts of pC1-hPS1 transfected into the MEFs resulted in accumulation of PS1 protein and restored levels of PS1 NTF and NICD in mutant ($PS1^{L435F/+}$, $PS1^{L435F/+}$; $PS2^{-/-}$ and DKO) MEFs (FIG. 1B). These results indicate that exogenous WT hPS1 can rescue the impaired γ-secretase activity in in various PS mutant MEFs.

Example 2: Development of an Optimized Wild-Type Human PS1 In Vitro Expression System Methods Cell Culture and Transfection P sen-null mouse embryo fibroblasts (MEFs) lacking endogenous PS1 and PS2 were maintained in DMEM supplemented with 10% FBS and transiently transfected with plasmids expressing either the wild-type endogenous hPSEN1 cDNA (wt_PS1) or the codon optimized hPSEN1 cDNA (opti_PS1), with or without the γ-secretase reporter, CMV-N ΔE, using Lipofectamine 3000 according to instruction. Cell lysates were collected at 24 h time point.

Western Blotting

Cell lysates were subjected to SDS-PAGE, and proteins were transferred to nitrocellulose membranes. After blocking in TBST/5% non-fat dry milk, membranes were incubated overnight with primary antibodies. To control for loading, membranes were stripped and re-probed with anti-β-actin antibody. Band intensity was quantified using ImageJ software, and results were normalized to β-actin levels. Antibodies used included rat anti-PS1-NTF, rabbit anti-cleaved Notch (Val1744) (NICD), and mouse anti-β-actin.

Results

Figures 3A, 3B:
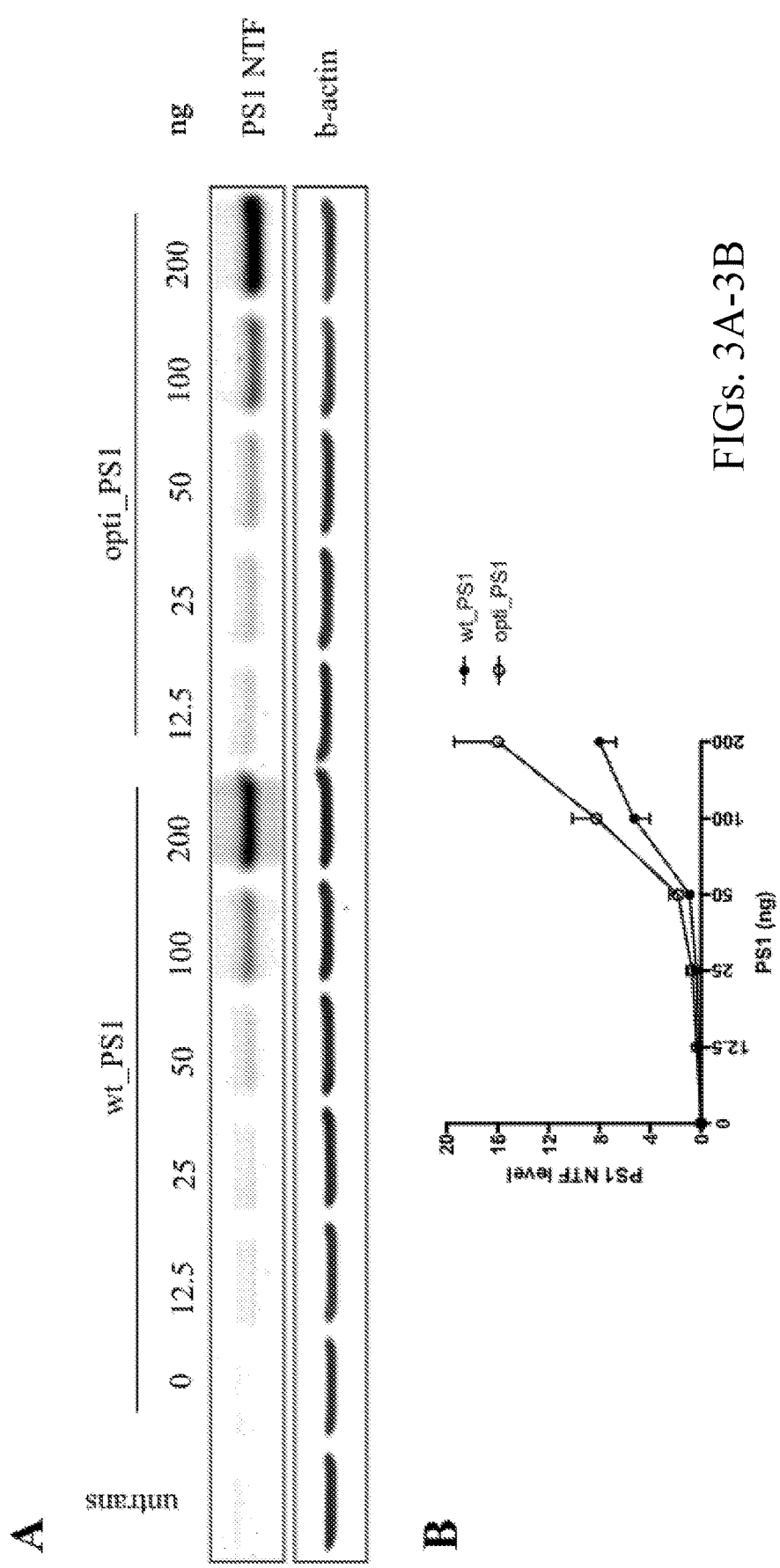
FIGS. 3A-B. Increased expression levels of PS1 NTF with codon optimized PSEN1 cDNA. A, Psen-null MEFs were transfected with increasing amounts of plasmids expressingexpressing the wild-type endogenous hPSEN1 cDNA (wt_PS1) or the codon optimized hPSEN1 cDNA (opti_PS1), and Western analysis was carried out using an antibody specific for PS1 N terminus. Untrans: untransfected MEFs as negative control. B, Quantification of PS1 NTF levels in cells transfected with either wild-type endogenous hPSEN1 cDNA (wt_PS1) or the codon optimized hPSEN1 cDNA (opti_PS1). Data are expressed as Mean±SEM (n=3 independent experiments)
Figure 4:
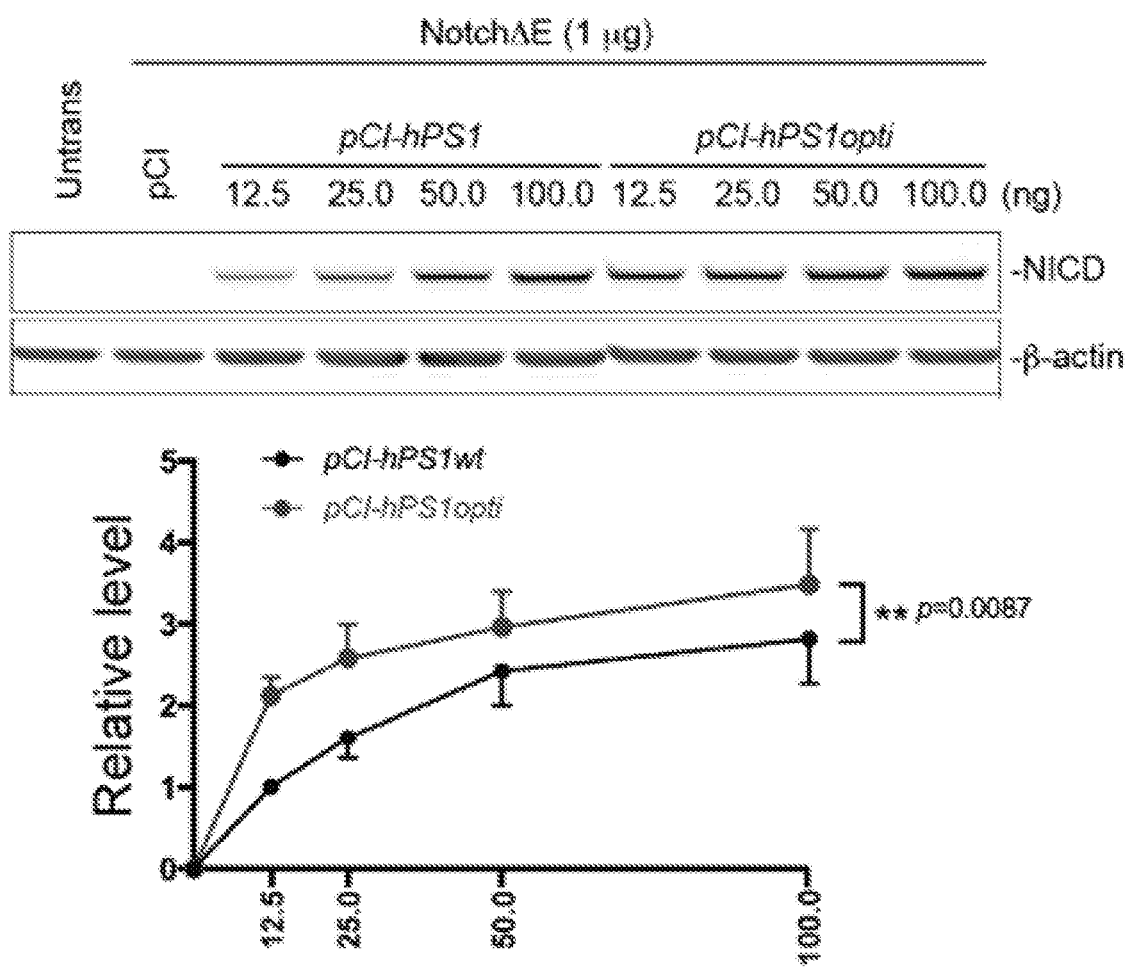
FIG. 4. Codon optimization led to increased γ-secretase activity. PS DKO MEFs were transfected with increasing amounts (12.5, 25, 50 or 100 ng) of pCI-hPS1 or pCI-hPS1opti plasmid DNA and CMV-NΔE followed by Western analysis of NICD. MEFs that were untransfected or transfected with the empty vector were included as negative controls. We found that pCI-hPS1opti led to significantly higher levels of γ-secretase activity, measured by NICD production, relative to pCI-hPS1. Data are expressed as mean±SEM (n=5 independent experiments). Two-way ANOVA was used to assess statistical significance. **$p<0.01$.

First, we expressed wt_hPS1 or opti_hPS1 in Psen-null MEFs to eliminate any contribution of endogenous PS1 or PS2. We detected a progressive increase in the levels of PS1 NTF when Psen-null MEFs were transfected with increasing amounts of vector encoding wt_hPS1 or opti_hPS1. Optimized hPS1 consistently expressed more PS1 relative to wt_hPS1 (FIGS. 3A-3B).

NotchΔE as substrate for γ-secretase-mediated cleavage was co-expressed with wt_hPS1 or opti_hPS1 to measure γ-secretase activity directly. Notch is cleaved by γ-secretase to release the Notch intracellular domain (NICD). We evaluated the dose-response relationships for γ-secretase-mediated cleavage of NotchΔE to produce NICD as a function of γ-secretase activity. Production of NICD increased linearly across the lower amounts of PS1 vectors transfected, but close to saturation at higher levels. More importantly, for each point, optimized hPS1 has higher γ-secretase activity (FIG. 3).

Secreted endogenous Aβ40 and 42 levels are measured in the medium using ELISA. Another γ-secretase substrate, APP C99, is used to evaluate γ-secretase activity by transiently transfecting CMV-C99 into each of the MEF cell lines, along with increasing amounts of pCI-hPS1opti. Primary and immortalized C410Y, E280A and D385A KI/+ and KUKI MEFs as well as PS1 KI/+; PS2−/− MEFs are established. Whether KI/+ and KUKI MEFs recapitulate similar phenotypes as KI/+ and KUKI brains is determined, and whether introduction of WT hPS1 can restore the reduced γ-secretase activity in a dose-dependent manner is measured by NICD and AICD production. The experiment is repeated with multiple independent MEF cell lines per genotype. Power analysis is performed to determine the sample size and the number of independent experiments needed to complete the study.

Example 3: Development of an Optimized Wild-Type Human PS1 In Vivo Expression System Transgenic mice are developed that express human PSEN1 wild-type cDNA constitutively or inducibly under the control of the CAMK2A promoter. To maximize PS1 production and activity, hPS1 was codon-optimized (hPS1opti), and then PS1 levels and γ-secretase activity were compared between the endogenous hPS1 and hPS1opti cDNA by co-transfecting increasing amounts of either pCI-hPS1 or pCI-hPS1opti and CMV-NΔE into PS DKO MEFs. Relative to the endogenous hPS1 cDNA, the hPS1opti cDNA resulted in higher levels of PS1 NTF and higher γ-secretase activity, measured by NICD production (FIG. 3).

Example 4: Determine Whether Postnatal Delivery of hPS1Opti can Rescue Phenotypes in PS cDKO Mice The vectors listed in Table 2 have been prepared. The vector that confers the highest GFP staining at 4 and 8 weeks after injection is identified. To do this, PS cDKO pups (lots–10 breeding cages of F/F; −/−; Cre/Cre crossed with F/F; −/−) are injected at P0-2.

TABLE 2

List of vectors

| UID | Description |
|---|---|
| 01 | AAV9/mCaMKII-intron-hPS1opti-T2A-EGFP-SV40pA |
| 02 | AAV9/hCaMKII-intron-hPS1opti-T2A-EGFP-SV40pA |
| 03 | AAV9/hCaMKII-intron-EGFP-SV40pA |
| 04 | AAV9/hSynI-intron-hPS1opti-T2A-EGFP-SV40pA |
| 05 | AAV9/hCaMKII-intron-hPS1opti-SV40pA |
| 06 | AAV9/hSynI-intron-hPS1opti-SV40A |

An AAV—e.g., AAV9/hCaMKII-intron-hPS1opti-T2A-EGFP-SV40 pA or AAV9/hCaMKII-intron-EGFP-SV40 pA—is selected and injected into PS cDKO mice at P0-P2 by ICV. Western analysis is performed at 4 and 8 weeks of age to determine levels of PS1, APP, Nicastrin, PEN-2; control and PS cDKO mice are included at 4 and 8 weeks as additional controls. Gamma secretase activity, NICD production, and Aβ levels (by ELISA of cortical lysates) are measured at 8 weeks of age. Additionally, at 2 months of age electrophysiological analysis—e.g., Schaffer collateral, PPF, FF, and LTP—is performed, and behavioral analysis is performed at 2-3 months of age—e.g., watermaze. Neuropath analysis is performed at 6 months of age.

Example 5: Determine Whether Postnatal Delivery of hPS1Opti can Rescue Phenotypes Caused by FAD Mutations Mice listed in Table 3 are generated, and analyzed using western blot analysis to measure PS1 and APP levels; in vitro gamma-secretase activity assay; ELISA, electrophysiological analysis at 6 months of age; behavior analysis at 6 and 12 months of age; a neuropath analysis at 6, 12, and 18 months of age.

TABLE 3

List of mice genotypes

| Genotype | Description of mice mated to generate the genotype |
|---|---|
| PS1 L435F KI/+ (C410Y KI/+, E280A/E280A; −/−) | from KI/+ crossed with +/+: use KI/+ |
| PS1 L435F KI/+; PS2 −/− | from KI/+; −/− intercross: use KI/+; −/− |
| PS1 L435F KI/fPS1; PS2 −/−; CaM-Cre | from KI/F; −/− crossed with KI/F; −/−; Cre |

Example 6: Determine whether AAV9/hPS1opti delivered in the adult brain can rescue phenotypes caused by loss of PS function (PS cDKO, FAD KI) in vivo Vectors are prepared as listed in Table 2 and injected into mice either via intra-CSF; via ICM using 50 ul Hamilton syringe to deliver a 10 ul injection into the cisterna magna $1 \times 10^{12}$ vg); via intraparenchymal delivery, or via intrathecal delivery using 10 ul $3.3 \times 10^{11}$ vg lumber puncture. The mice studied will include (i) PS cDKO; (ii)KI/+; (iii) KI/+; PS2−/−; and (iv) KI/fPS1; PS2−/−; Cre. We will perform the following analysis on the mice: Western analysis to measure PS1 and APP levels; in vitro γ-secretase assay; ELISA measurements of Aβ peptides, electrophysiological analysis at 6 months of age; behavior analysis at 6 and 12 months of age; a neuropath analysis at 6, 12, and 18 months of age.

Other Embodiments

It is to be understood that while the invention has been described in conjunction with the detailed description thereof, the foregoing description is intended to illustrate and not limit the scope of the invention; which is defined by the scope of the appended claims. Other aspects, advantages, and modifications are within the scope of the following claims.

What is claimed is:

1. A composition comprising a human codon-optimized polynucleotide encoding a human presenilin 1 (PSEN1), wherein the human codon-optimized polynucleotide encoding a human PSEN1 is at least 95% identical to SEQ ID NO:9, with at least one codon optimized with respect to wild type.

2. The composition claim 1, wherein the human codon-optimized polynucleotide encoding a human PSEN1 comprises SEQ ID NO:9.

3. The composition of claim 1, which is associated with an exosome or lipid-based nanoparticle (LNP).

4. A composition comprising a vector for expression of human PSEN1 in a cell, comprising the human codon-optimized polynucleotide of claim 1, operably linked to a promoter.

5. The composition of claim 4, wherein the vector is a viral vector.

6. The composition of claim 5, wherein the viral vector is an adeno-associated viral (AAV) vector.

7. The composition of claim 6, wherein the AAV vector is AAV9 or AAVrh10.

8. The composition of claim 5, wherein the viral vector is a lentiviral vector or a retroviral vector.

9. The composition of claim 4, wherein the promoter is a pan neuronal promoter.

10. The composition of claim 9, wherein the pan neuronal promoter is a synapsin I promoter.

11. The composition of claim 4, wherein the promoter is a neuron subtype-specific promoter.

12. The composition of claim 11, wherein the neuron subtype-specific promoter is an alpha-calcium/calmodulin kinase 2A promoter.

13. A method of treating a neurodegenerative disease, disorder, or condition, the method comprising administering to a human subject in need of treatment a composition of claim 1, wherein the subject has one or more mutations in at least one allele of PSEN1, wherein the neurodegenerative disease, disorder or condition is Alzheimer's disease.

14. The method of claim 13, wherein the Alzheimer's disease is familial Alzheimer's disease.

15. The method of claim 13, wherein the subject has a E280A, Y115H, L166P, C410Y, Aex9, G548, D257A, R278I, L435F, G384A, or L392Vmutation in the PSEN1 gene, or a N141I, G206A, H163R, A79V, S290C, A260P, A426P, A431E, R269H, L271V, C1410Y, E280G, P264L, E185D, L235V, or M146V mutation in the PSEN1 gene.

16. The method of claim 13, wherein the Alzheimer's disease is sporadic Alzheimer's disease.

17. The method of claim 13, wherein the Alzheimer's disease is late-onset or early-onset Alzheimer's disease.

18. The method of claim 13, wherein the neurodegenerative disease, disorder or condition is frontotemporal dementia, memory loss, cognitive decline or impairment.

19. The method of claim 18, wherein the cognitive impairment is mild cognitive impairment (MCI).

20. The method of claim 13, wherein the composition is administered to the CNS of the subject in need of treatment.

21. The method of claim 20, wherein the polynucleotide encoding PSEN1 and/or PSEN2 gene or mRNA is administered to the CNS via intravenous delivery, via intrathecal delivery, via intracisternal delivery, via intracerebroventricular delivery, or via stereotactic injection into certain areas of the brain, optionally into cisterna magna, cerebral ventricles, or lumbar intrathecal space, or via direct injection into hippocampus or cortical areas.

* * * * *